Nov. 5, 1963    R. N. KNOSP ETAL    3,109,329
MACHINE TOOL PROGRAMMING SYSTEM
Filed Jan. 13, 1959    32 Sheets-Sheet 8
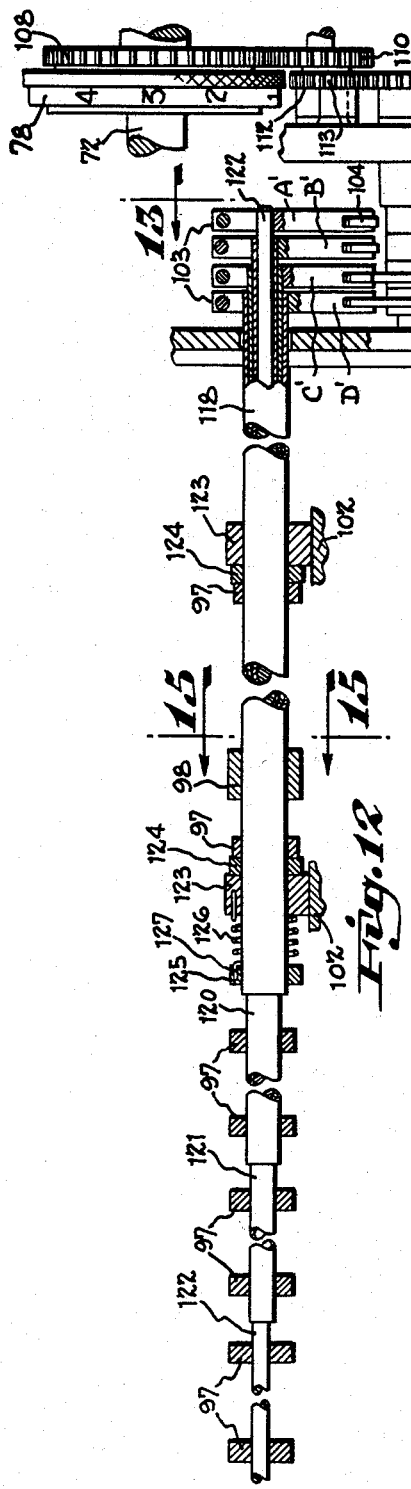
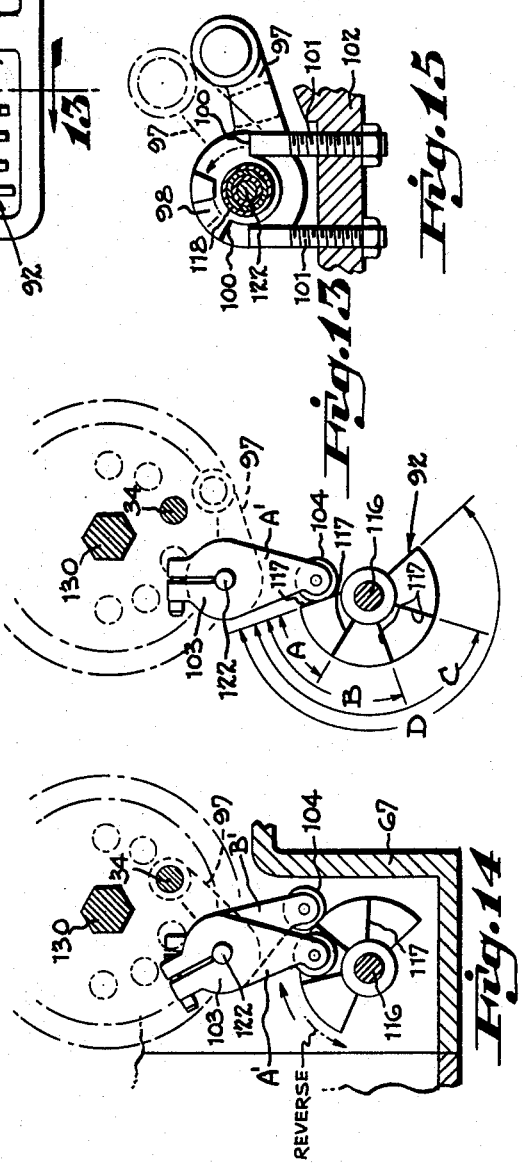
INVENTORS.
Robert N. Knosp.
Ronald L. Gecks.
BY Wood, Herron & Evans.
ATTORNEYS.

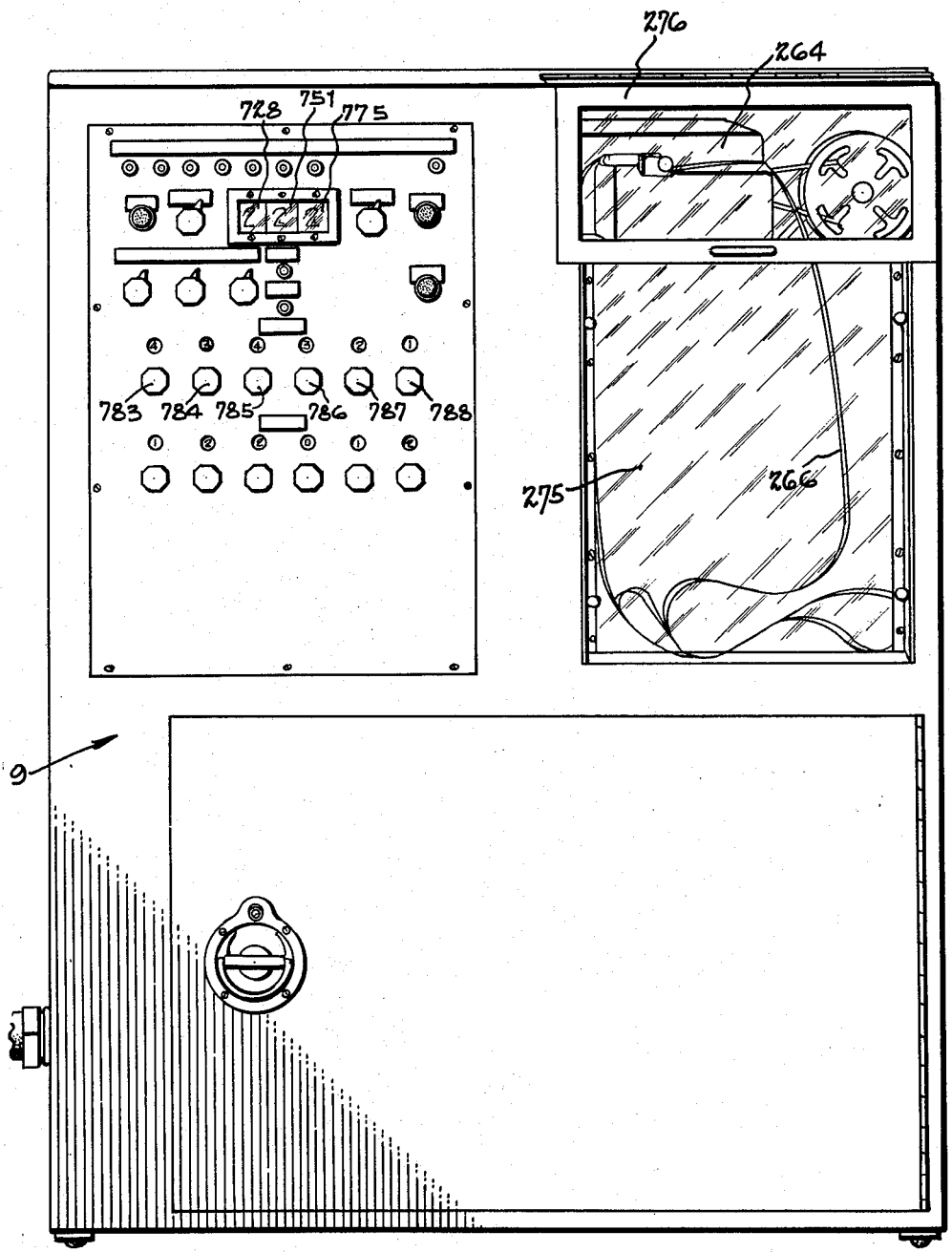

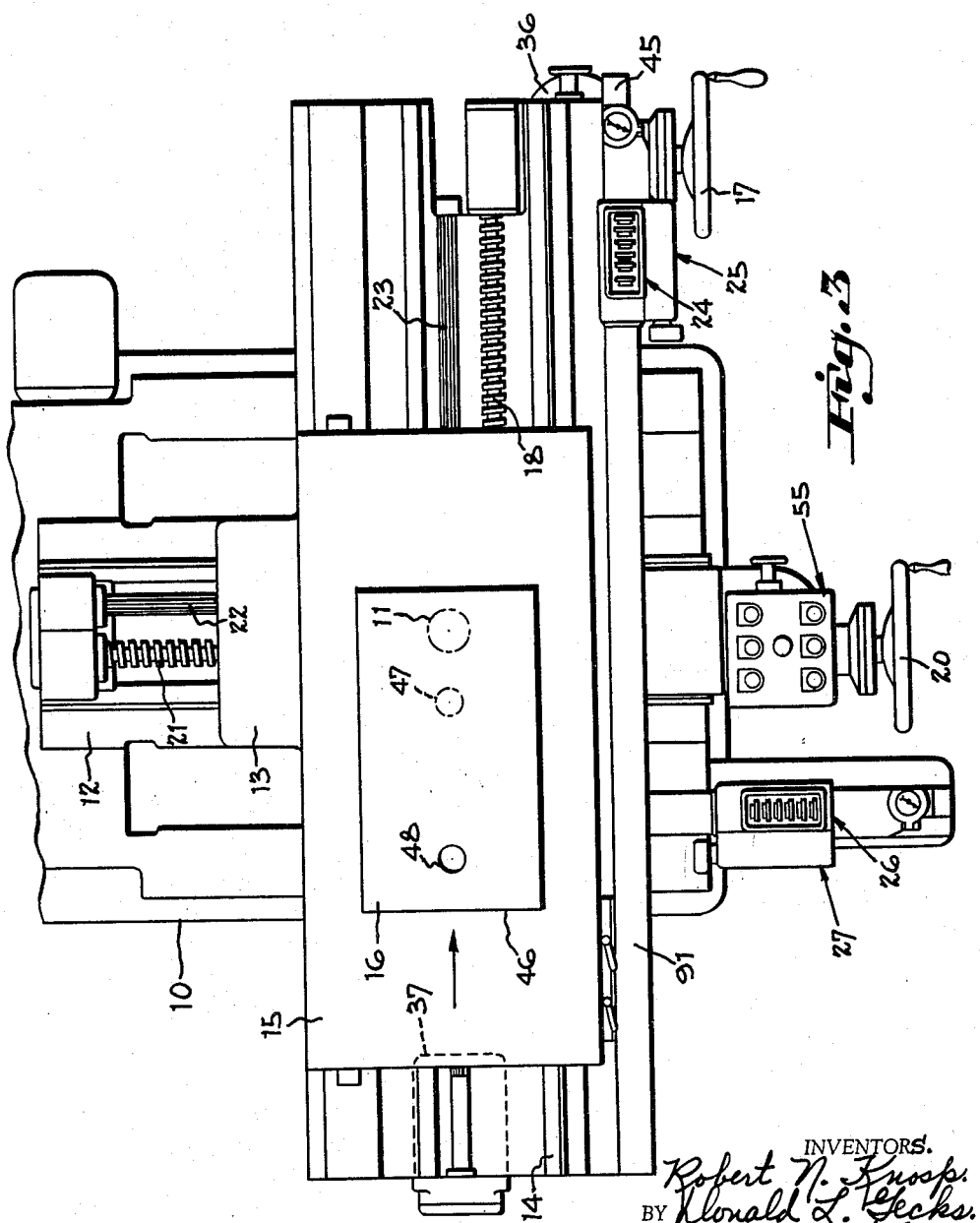

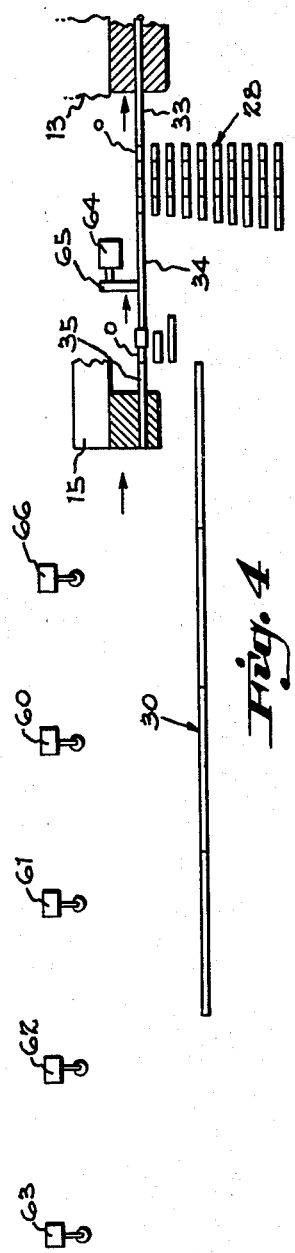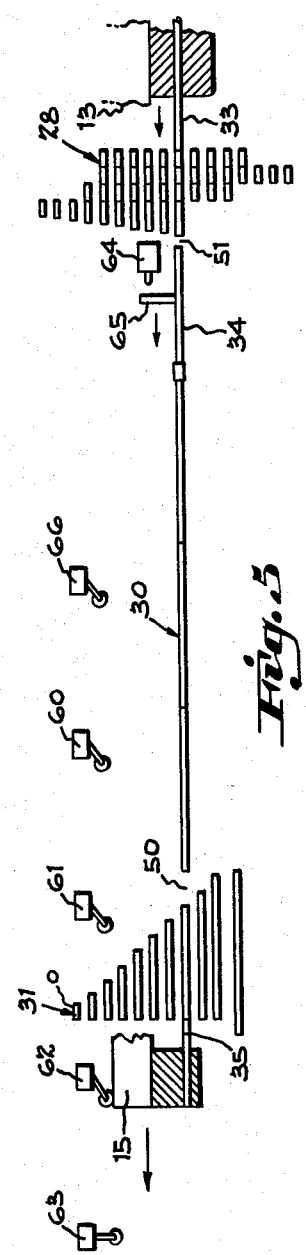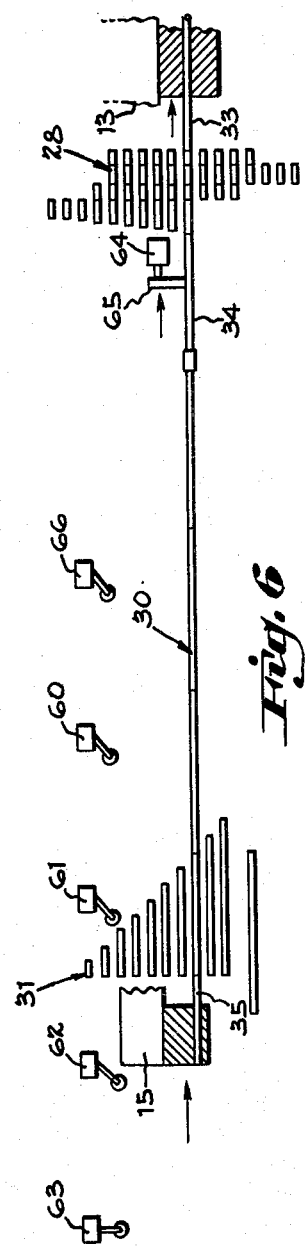

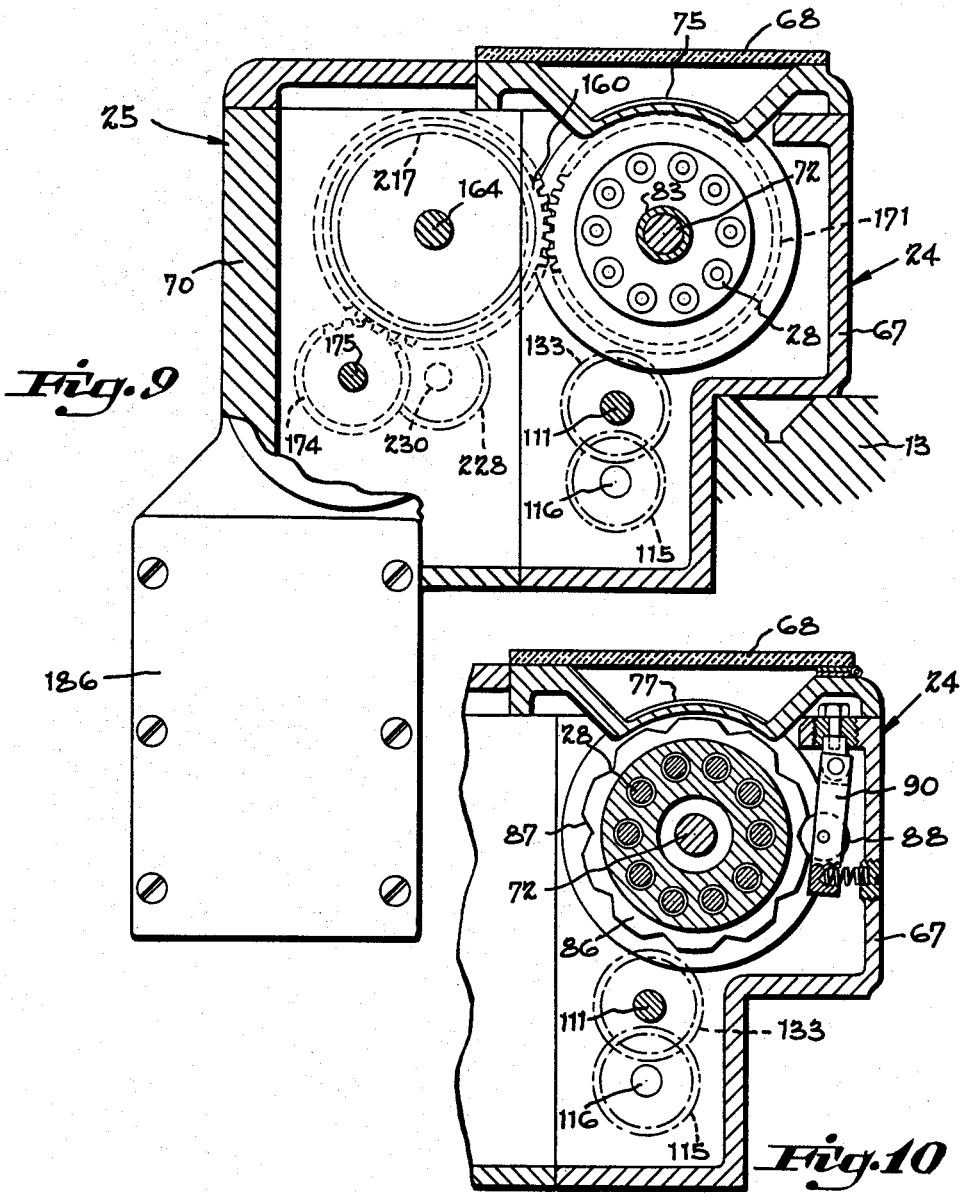

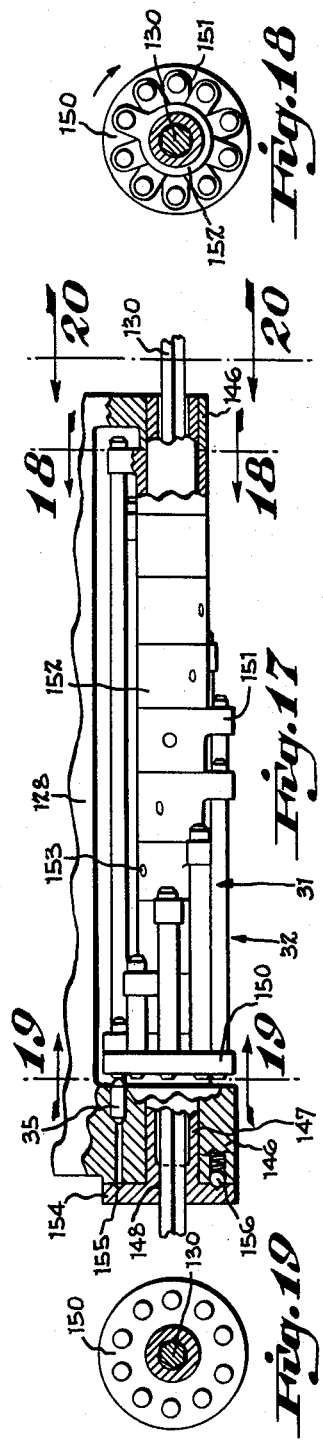
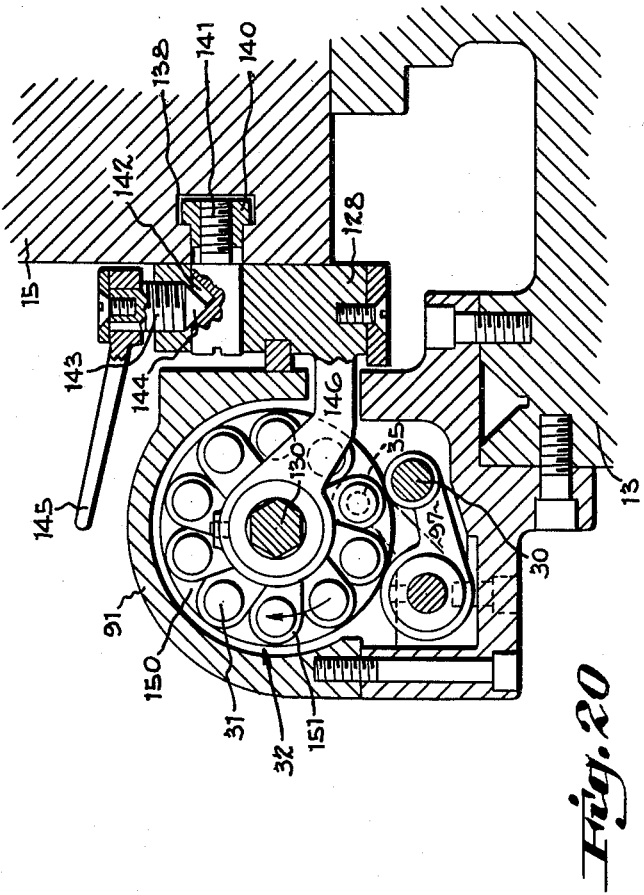

Nov. 5, 1963  R. N. KNOSP ETAL  3,109,329
MACHINE TOOL PROGRAMMING SYSTEM
Filed Jan. 13, 1959  32 Sheets-Sheet 10

INVENTORS.
Robert N. Knosp.
BY Donald L. Gecks.
Wood, Herron & Evans.
ATTORNEYS.

Nov. 5, 1963   R. N. KNOSP ETAL   3,109,329
MACHINE TOOL PROGRAMMING SYSTEM
Filed Jan. 13, 1959   32 Sheets-Sheet 11

INVENTORS.
Robert N. Knosp.
Donald L. Gecks.
BY Wood, Herron & Evans.
ATTORNEYS.

Nov. 5, 1963                R. N. KNOSP ETAL                3,109,329
                        MACHINE TOOL PROGRAMMING SYSTEM
Filed Jan. 13, 1959                                   32 Sheets-Sheet 12

OPERATION CHART

| NO. | SPEED | FEED  | TABLE  | SADDLE | S-f CODE | TOOL CHG. |
|-----|-------|-------|--------|--------|----------|-----------|
| 1   | 360   | .010  | 087414 | 030000 | 598      | *         |
| 2   | —     | —     | 157414 | —      | —        |           |
| 3   | 240   | .010  | 104975 | 074975 | 398      | *         |
| 4   | 360   | .0028 | 087414 | 030000 | 595      | *         |
| 5   | —     | —     | 157414 | —      | —        |           |
| 6   | 240   | .0028 | 104975 | 074975 | 395      |           |

TAPE CHECK READOUT a001 b 087414 c 030000 d 598, h
a002 b 157414 h
a003 b 104975 c 074975 d 398, h
a004 b 087414 c 030000 d 595, h
a005 b 157414 h
a006 b 104975 c 074975 d 395, h

INVENTORS.
Robert N. Knosp.
BY Ronald L. Gecks.
Wood, Herron & Evans.
ATTORNEYS.

INVENTORS.
Robert N. Knosp
Donald L. Gecks
BY Wood, Herron & Evans.
ATTORNEYS.

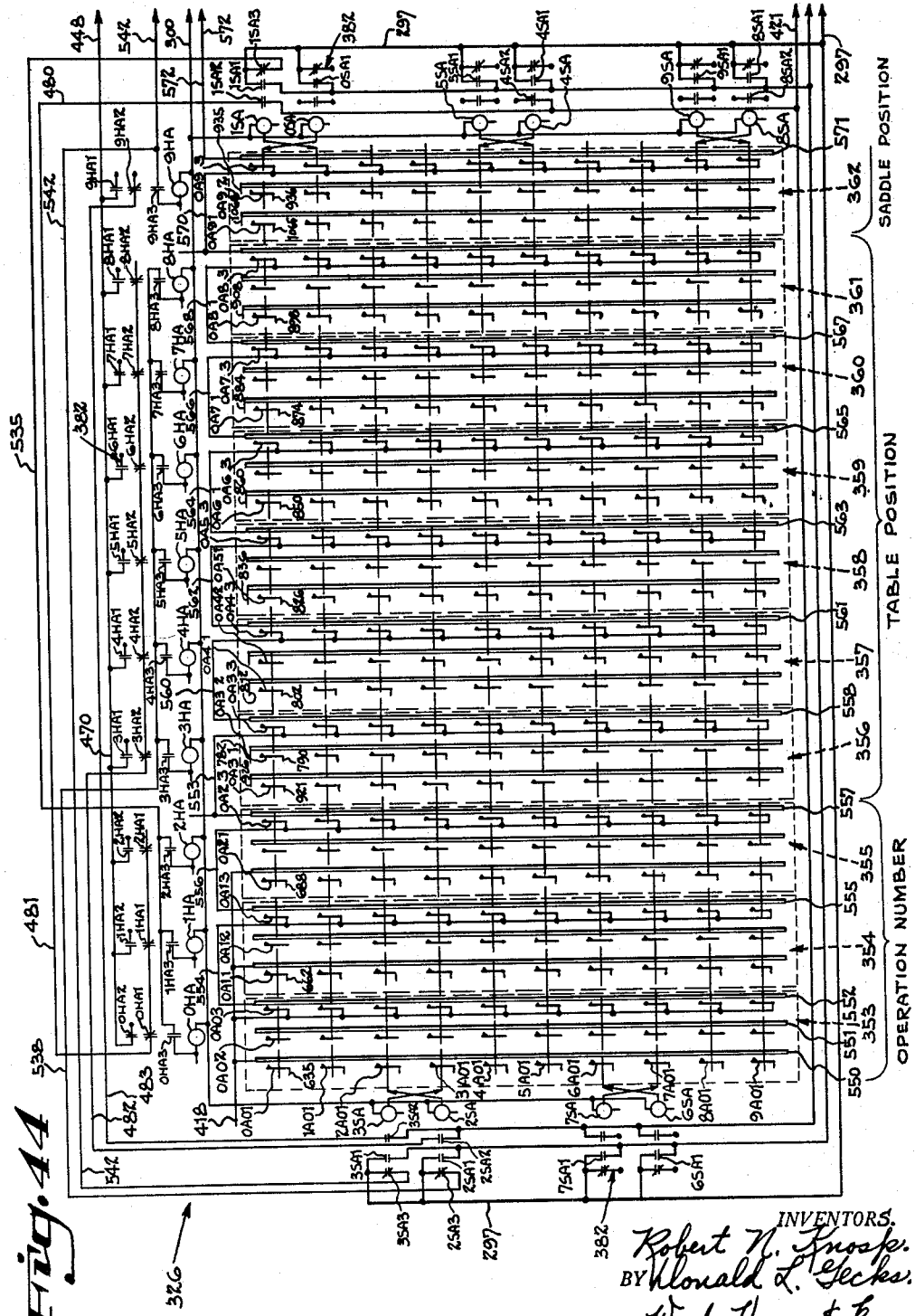

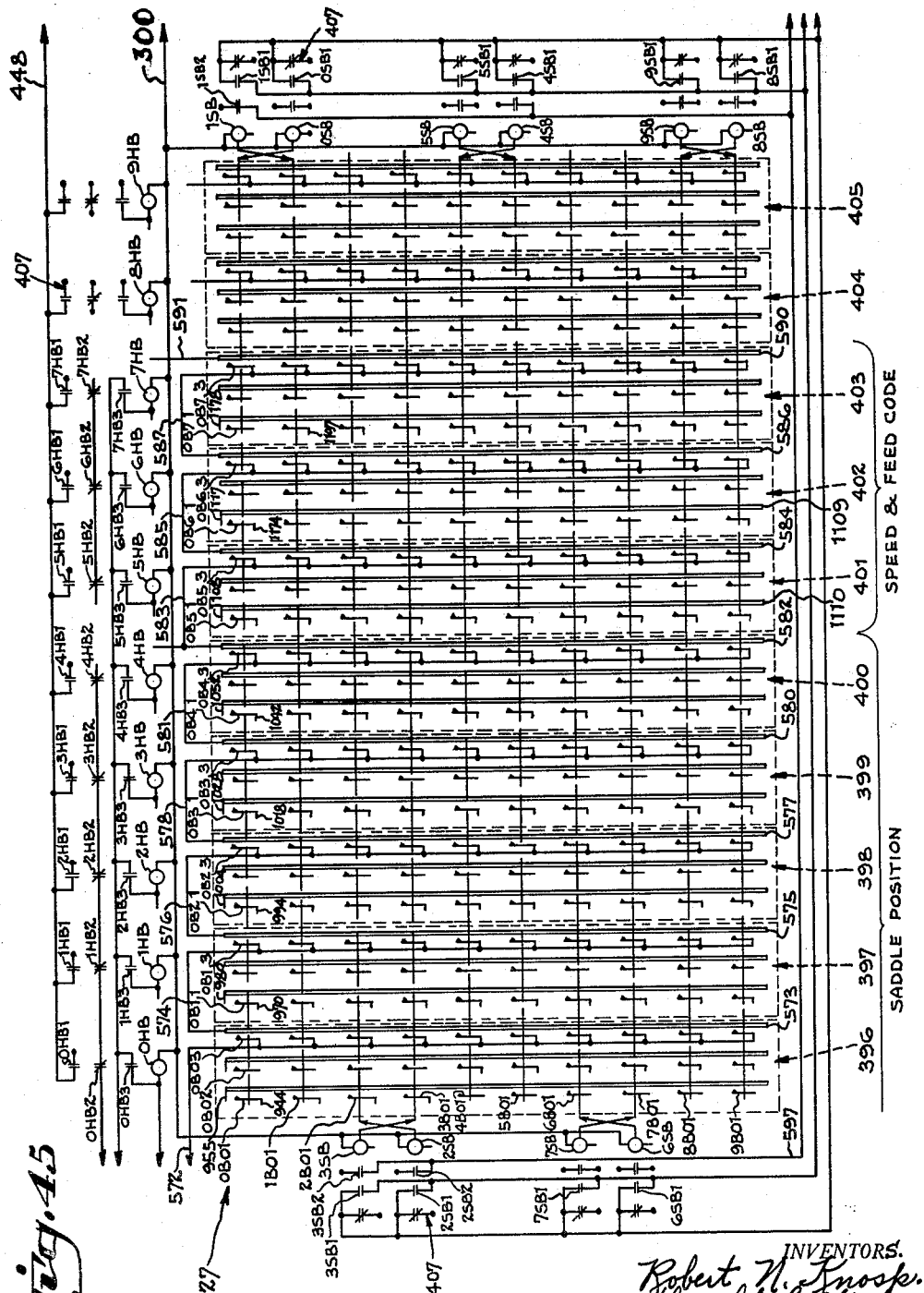

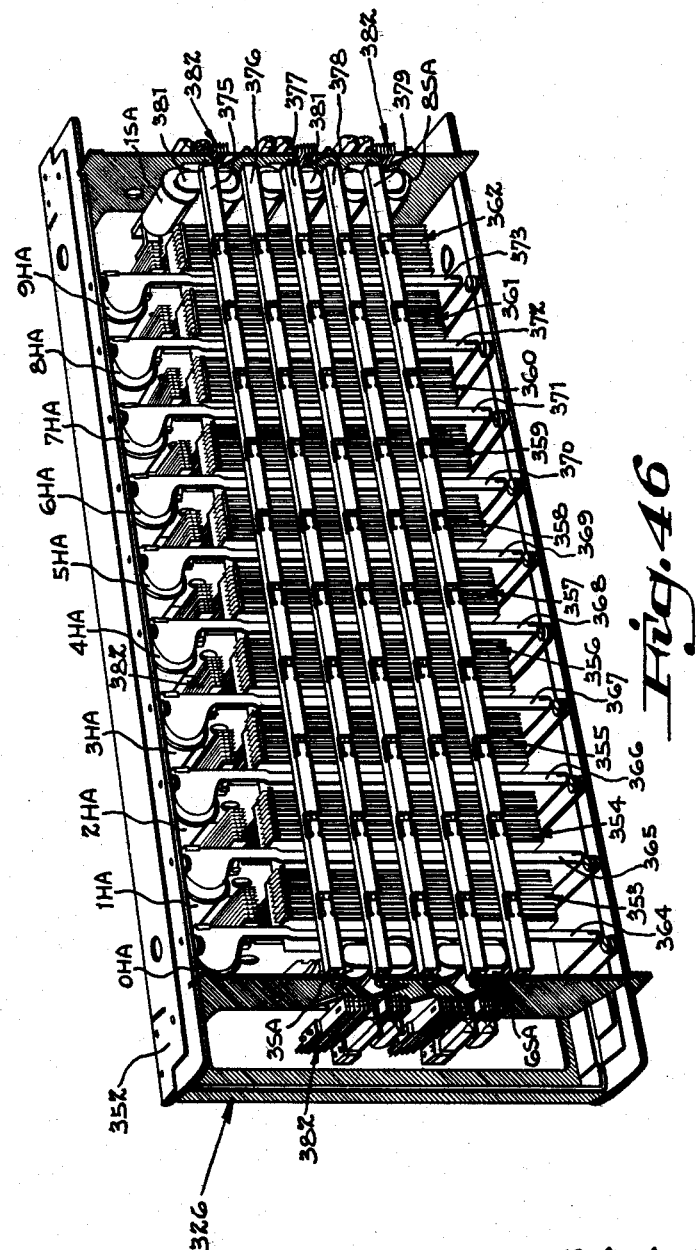

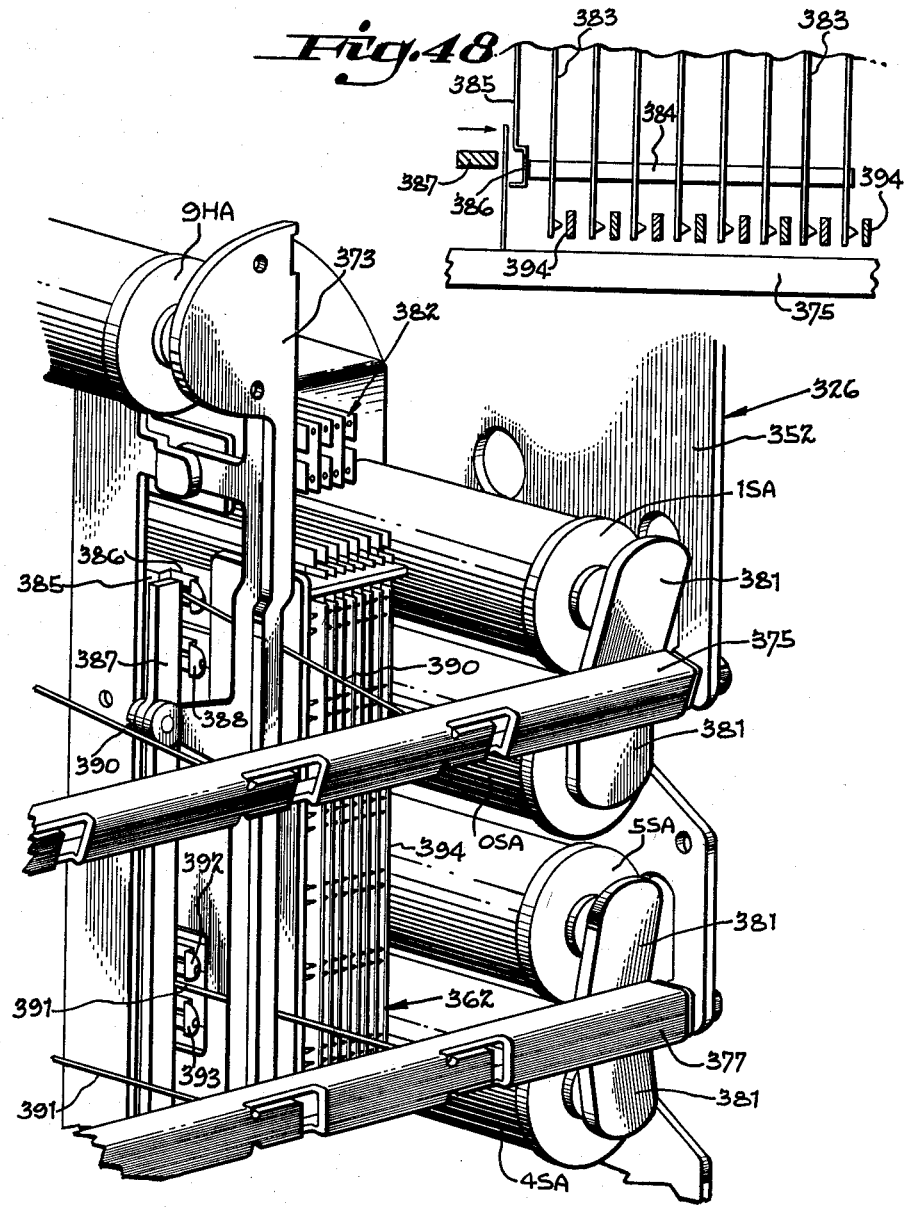

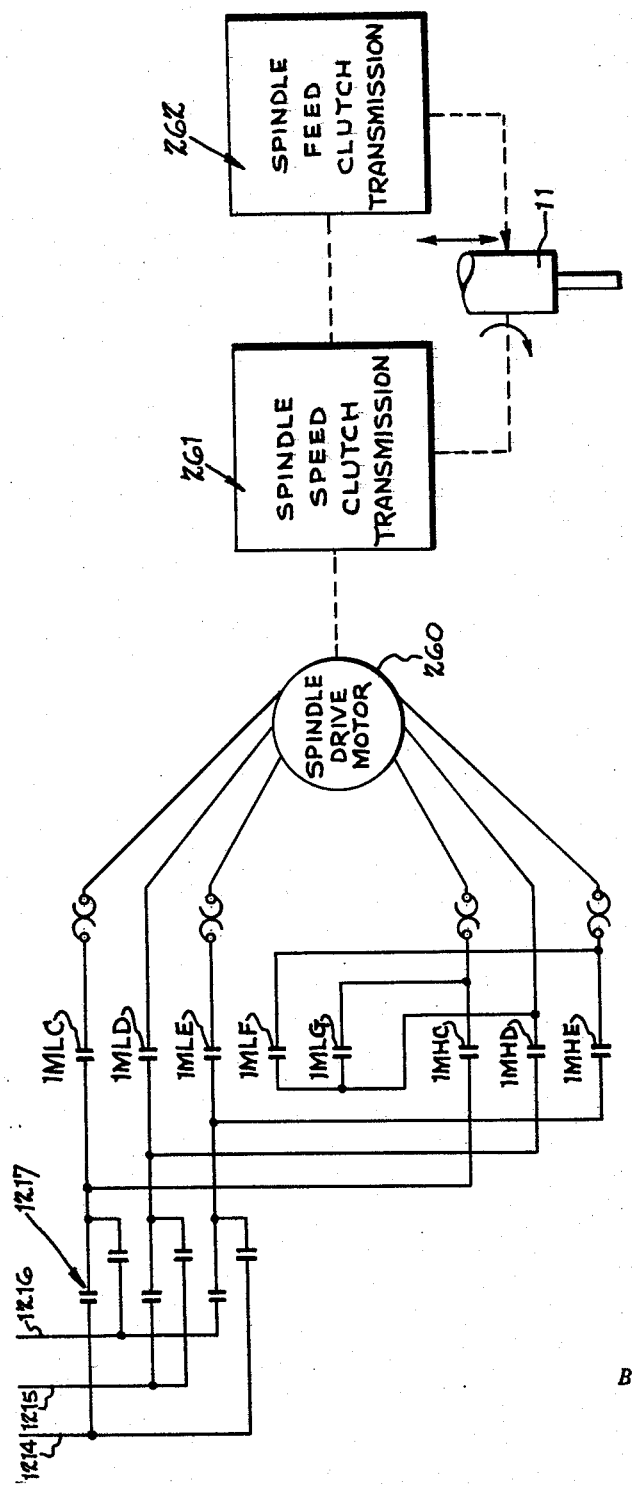

United States Patent Office 3,109,329
Patented Nov. 5, 1963

3,109,329
MACHINE TOOL PROGRAMMING SYSTEM
Robert N. Knosp, Ludlow, Ky., and Donald L. Gecks, Cincinnati, Ohio, assignors to The Fosdick Machine Tool Company, Cincinnati, Ohio, a corporation of Ohio
Filed Jan. 13, 1959, Ser. No. 786,589
13 Claims. (Cl. 77—4)

The present invention relates to automatic control systems and is particularly directed to a system of the numerical, or digital, type embodying novel means for storing coded data until the data is required to direct operation of the equipment being controlled. The invention is particularly useful for the control of machine tools, in which embodiment the invention is disclosed herein.

Automatic digital control systems of the present type are adapted to automatically control various types of equipment so that the equipment will operate in a predetermined manner either entirely without, or with a minimum amount of human supervision. In such a system, instructions for governing the equipment during its operation are initially placed upon a data record medium such as an elongated punched tape, magnetic tape, or the like. These instructions comprise a series of bits representing numbers, letters, or other code signals.

In the operation of the equipment being controlled, this information is first sensed or read by a tape reader or the like which is effective to transform the punched holes, magnetized areas, or the like, into electrical signals. Quite frequently, the equipment that is being controlled is not ready to receive these signals when the information is sensed by the reading device. Or, viewed differently, an appreciable amount of time is required to read all the instructions for a given operation, and this time is wasted, substantially lowering the efficiency of the machine, if the tape is not sensed until such time as the equipment is ready to receive the signals directly from the tape reader. For in this latter event, the machine must remain idle between each successive operation for the length of time consumed in reading the tape and transmitting appropriate control signals to the machine.

For this reason, it has previously been suggested to provide a system for reading the signals before they are needed and to provide some signal storage means for receiving the electrical signals from the tape reader and temporarily storing these signals until the equipment is in condition to receive and utilize the signals. This type of system is intended to eliminate the loss of time while the machine is awaiting operation of the tape reader. However, the only practical form of storage device which heretofore has been employed to perform the signal storage function consists of a large number of cascaded relays and cooperating stepping switches.

A data storage arrangement of this type is subject to several serious defects. For example, the large number of relays and stepping switches requires an excessive amount of space. Moreover, in such apparatus an appreciable amount of time is required for the stepping switches to complete their cycles; and if a machine performs the preceding operation in less time than the stepping switches can complete their cycles for the next successive operation, then the machine must remain idle. At times, these units are unable to read and store the necessary data before it is required by the machine or other equipment. In such a case, the machine must lie idle while the necessary information is read, stored, and fed to the machine. Under these circumstances, the data storage unit only partially solves the problem of eliminating idle time while the equipment awaits coded instructions. Relay stepping switch storage units are further disadvantageous in that their initial cost is very substantial and they likewise are expensive to maintain.

One important object of the present invention is to provide an automatic numerical control system embodying a novel data storage unit which eliminates any idle machine time caused by delays in reading and storing data. Thus, in the present system the instructions for one operation are completely read and stored while the equipment is performing the previous operation, so that when the equipment finishes that operation the new instructions can be fed to it immediately and the equipment can then be kept in substantially continuous production. Moreover, as will be explained below, the data storage unit forming part of the present system is vastly superior to previously proposed data storage units in each of the other respects mentioned above as well. Thus, the present memory storage unit is much more compact, is more rugged, is easier to repair, and is substantially lower in first cost.

The present invention contemplates an automatic digital type control system in which data, read by a reader, is converted to electrical signals which are stored in one or more cross bar switches. In accordance with this invention, a cross bar switch is utilized for the purpose of providing a novel memory storage function in contrast with the conventional transfer function of cross bar switches in automatic telephone switches. Otherwise expressed in accordance with the present invention a plurality of coded signals are received by the cross bar switch serially from a reader, stored, and subsequently simultaneously applied to the respective machine elements.

It is believed that the significance of the present invention will be more readily appreciated from a consideration of a specific control system embodying the invention. The specific embodiment chosen, by way of example, is a system for automatically controlling a precision jig borer. It is to be emphasized, however, that the present invention is equally adapted for use in the control of other machine tools, such as lathes, milling machines, and the like, as well as for the control of completely different types of apparatus, such as process control equipment, automatic material storage equipment, and the like.

Those skilled in the machine tool art will readily appreciate that each machine tool has several "machine functions" to be controlled. By way of example, in a jig borer, in order to bore a hole of predetermined size in a predetermined position in a workpiece, five different machine functions must be controlled. Specifically, the table must be positioned (in a precision jig borer this is done to within one ten thousandth of an inch), the saddle must be positioned to the same degree of precision, the rate of spindle feed must be controlled, and the rate of spindle rotation must be controlled. Finally, the proper tool of the correct size and type must be selected to perform the particular operation.

The present numerical control system is described with relation to an embodiment in which four of these functions; i.e., table position, saddle position, spindle feed, and spindle speed are automatically controlled and a visual indication is given to the operator when tool changes are required. As will be more readily apparent from the detailed description that follows, one of the important advantages of the present system is that it is highly flexible and can as readily control all of the functions of a machine as it can control any one of them. Or, on the other hand, if because of the particular equipment being controlled, it is desirable to automatically control several, but not all of the machine functions, this, too, can be readily accomplished.

To control a single operation of a precision jig borer having a table and saddle travel of less than one hundred inches along each of the coordinate directions of movement, at least fifteen bits of information (or digits) are required. Thus, six digits (e.g. 10.5976 inches) are required to describe the table position with reference to an arbitrary line constituting one of the coordinate axes. Similarly, six digits are required to describe the saddle position with reference to a second arbitrary reference line constituting the second coordinate axis. Finally, in the machine disclosed, three digits are required to control the spindle drive so that the spindle is rotated at a selected speed and is advanced toward the workpiece at a preselected feed rate.

In accordance with the present invention, these fifteen bits of information, hereinafter called digits, are combined with other bits of information described below and holes corresponding positionally to these digits are punched on a piece of tape. When the tape is used to control a jig borer, the tape is placed in a reader which senses the positions of the perforations in the tape and thereby provides suitable electrical signals corresponding to the bits of data stored on the tape. In further accord with the present invention, these signals are ultimately utilized to actuate components of a cross bar switch which, in turn, stores the signals until they are required by the machine.

Thus, in the operation of the present automatic control system, while the jig borer is performing one operation, which may take from a few seconds to several minutes depending on hole size, location relative to reference line, machine speed and feed rate, the instructions for the next operation are being read by the tape reader and are being applied to and stored by the cross bar switch. Because of the rapid operation of the cross bar switch, the complete set of instructions is read before the jig borer finishes its operation. When the jig borer finishes the first operation, it receives automatically the instructions for the second operation from the cross bar switch. Then, while the jig borer is performing the second operation, the reader is reading the instructions for the third operation and these instructions are stored in the cross bar switch, and so on. Consequently, a jig borer controlled by the present system is either being positioned or is performing a cutting operation during substantially all of its operating time. There is no time wasted while the tape reader reads the data from the tape.

It is considered that it will be helpful to briefly consider at this point the construction and operation of a typical cross bar switch. Essentially, a cross bar switch is a matrix type of switching unit. A cross bar switch includes a first plurality of vertical electrically responsive elements and a second plurality of horizontal electrically responsive elements having a large number of intersections with the vertical elements. One or more contacts is arranged at each of these intersections and is adapted to be closed by the cooperative action of the corresponding vertical and horizontal elements.

More particularly, one preferred form of cross bar switch comprises ten vertical hold bars, each of which is adapted to be actuated by an associated hold magnet and five double acting horizontal select bars, each of which is adapted to be actuated by either of two "select" magnets, there being ten select magnets in all. The cross bar switch further includes ten vertical contact units, one unit being associated with each of the vertical hold bars. Each vertical contact unit in turn includes ten vertically spaced horizontal contact sets corresponding to the ten select magnets and ten operative positions of the select bars. Thus, in the cross bar switch there is a group of contacts associated with each vertical hold bar and intersecting select bar. As is explained in detail below, a selected horizontal contact is closed only when its associated horizontal select bar and vertical hold bar are energized. In accordance with this invention, the contacts of each vertical contact unit are employed to represent one of the control function digits; for example, the first or "tens" inch digit of the saddle position. Additionally, within this vertical contact unit the ten horizontal sets of contacts represent the ten possible digits, 0–9.

The present invention is predicated in part upon the concept of providing a system for coding the instructions for performing a machine operation in such a manner that these instructions can be stored in matrix type units. The invention further comprehends the determination that a cross bar switch while it is used conventionally for an entirely different purpose can advantageously be employed as a matrix type storage unit. A still further aspect of the present invention, is the provision of means whereby the coded data can be transformed by the tape reader into signals suitable for storage in a cross bar switch and can be applied to the vertical hold magnets and select magnets of the cross bar switch to close suitable contacts for storing the control data.

To return to the specific example chosen as illustrative of a typical embodiment of the present control system, it will be recalled that the jig borer requires six digits for positioning the saddle, six digits for positioning the table, and three digits for controlling the spindle feed and speed. In addition to these fifteen bits of information, the present coding system includes three digits to indicate the number of the operation being performed.

The present coding system further includes a number of function indicator codes (letters for example). One of these function indicator codes precedes the digits of each particular machine function. Thus, the three digits of the operation number are preceded by a code letter "A," the six digits of the table information are preceded by code letter "B," the six digits of saddle information are preceded by a code letter "C," and the three digits of spindle speed and feed are preceded by a letter "D." An additional code signal, a comma, in the particular system described, is utilized to actuate a visual signal informing the operator that a tool change is necessary. Finally, a code letter "H" is used to indicate the completion of information. Thus, a single operation of the precision jig borer herein disclosed requires twenty-four bits of information.

In the specific embodiment described below, these bits of information are stored in binary coded form on an eight channel tape. The binary code punched holes are converted by the reader to signals representing decimal digits, and these digits are applied to a cross bar loading circuit including a single sequence stepping switch which is in turn effective to apply the signals to the correct hold and select magnets of the cross bar switch.

Thus, by way of example, the first three vertical contact units of the cross bar switch store the three digits of the operation number. As indicated above, these three operation number digits are preceded on the punched tape by a function code letter "A." When the tape reader senses an "A," the signal produced by a reader is effective to condition the first three vertical columns of the cross bar switch to receive the new operation number. When the first operation number is read, the first hold magnet and the particular 0–9 select magnet associated with the first digit of the operation number are energized. As explained in detail below, when these two magnets are energized, the particular horizontal contact set of the first vertical contact unit is closed to store the first digit of the operation number. The select magnet is then released, but the hold magnet remains energized to keep the actuated contact closed until the letter "A" is again read by the tape reader. The tape is then advanced in the reader to read the second operation number digit and this digit is stored in the second vertical contact unit in the manner described above. The third operation number is then stored in the third vertical contact unit.

Assuming that the tape reader then reads letter "B," the next six vertical contact units of the cross bar switch would be conditioned to receive new digits. These digits would be sequentially read by the tape and sequentially applied to the fourth through ninth vertical contact units of the cross bar switch. When a letter "C" is read, the six digits of the saddle number are stored in the next six vertical contact units of the cross bar switch (in the specific embodiment shown in the last vertical contact unit of one cross bar switch and the first five contact units of the second cross bar switch). When a letter "D" is encountered, the three digit speed and feed code is similarly stored in the three proper vertical contact units. The reading is completed when a letter "H" is sensed by the tape reader.

As was explained above, this reading and storing of information is rapidly accomplished and can readily be completed while the jig borer is completing its preceding operation. When the jig borer finishes its operation and is ready to receive the stored information, potentials are applied through the closed cross bar switches to appropriate input terminals of the jig borer table drive, saddle drive, and spindle drive to actuate these units for performing the operation in accordance with the data stored.

As soon as the jig borer table, saddle, and spindle control have been set up and the jig borer starts performing the operation, the tape proceeds to read the next set of directions and store these directions in the cross bar switches.

One of the principal advantages of the present cross bar switch memory storage unit and its associated loading circuit is that it is extremely rapid in operation. Thus, the twenty-four digits for completely controlling an operation of the precision jig borer can be read and stored in less than four seconds. This is a very small fraction of the time required to read and store a set of instructions for the same operation in other memory storage units.

Another important advantage of the present invention is that it is unnecessary to code on the tape any directions which remain unchanged. Thus, if the table seting remains unchanged from one operation to another, the table information can be completely eliminated from the coded directions punched for the second operation. For the cross bar switch will retain the previously stored table information can be completely eliminated from the coded table information will follow. This of course, greatly expedites the preparation, reading and storage of the coded instructions.

A still further advantage of the present invention is that the cross bar switches, employing only twenty magnets to control 100 sets of contacts (1,000 contacts in all), requires only a small fraction of the space required by relays and stepping switches adapted to store the same amount of information. Moreover, cross bar switches are extremely rugged and are adapted to provide long periods of trouble-free operation.

Additionally, cross bar switches and the present cross bar loading circuit are extremely well adapted for plug-in construction where the cross bar switches and other components can be plugged into suitable connectors and can be quickly withdrawn and replaced when trouble occurs. Thus, not only does the cross bar switch in the present loading circuit result in the elimination of a large number of individual components which results in a much lower initial cost, but the present system is easier and much less expensive to maintain.

While as previously explained, in its broadest aspects, the present control system is adapted to control the operation of many different types of machine tools and other equipment, the combination of the control system with the specific jig borer herein described provides additional and unique advantages. More particularly, the jig borer herein disclosed includes a unique dial drive mechanism utilized in positioning the table and saddle. These particular dial drive units together with the electrically responsive clutch units in the spindle drive perform a unique function in conjunction with the present control system since the dial drive units and clutches function as secondary data storage devices. In other words, in the present system, the instructions for an operation are transmitted directly from the data storage unit to the table dial drive, saddle dial drive, and spindle clutches. These units in turn function to store this information throughout the table and saddle positioning period and the actual boring operation. This eliminates any need for a second separate storage unit to hold the instructions for the current operation while the reader is read and stores directions for the next subsequent operation.

These and other objects and advantages of the present invention will be more readily apparent from the following detailed description of the drawings illustrating a preferred embodiment of the invention.

In the drawings:

FIGURE 2 is an elevational view of the memory storage system.

FIGURE 3 is a top plan view of the jig boring machine shown in FIGURE 1.

FIGURES 4, 5, and 6 are diagrammatic views illustrating the motions of the table in relation to the measuring rods during a typical positioning cycle.

Figure 7:
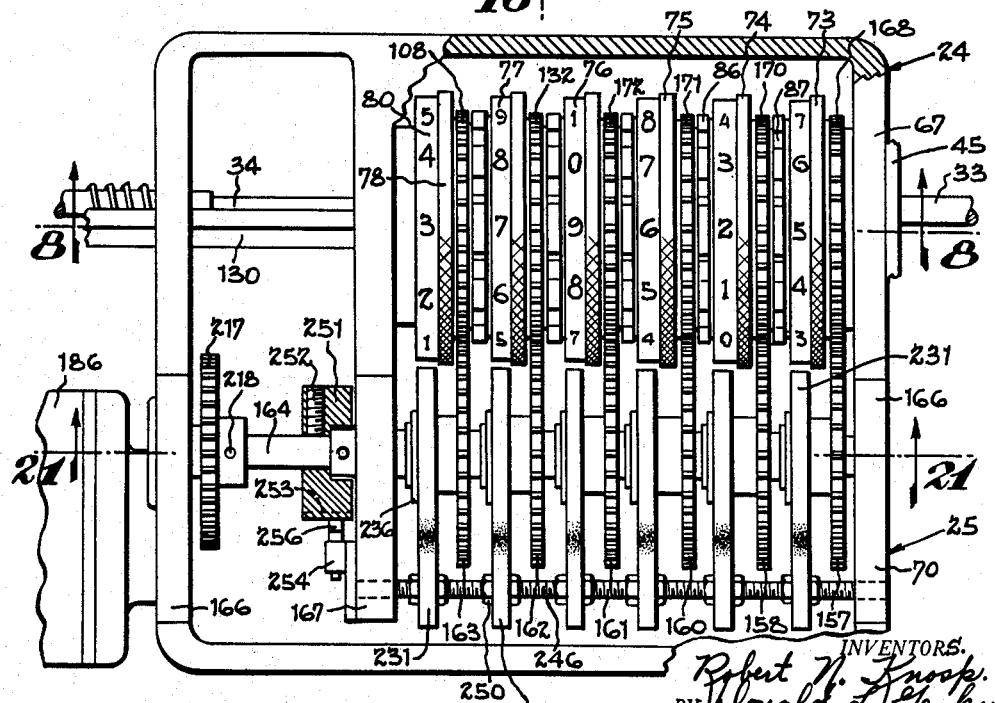

FIGURE 7 is an enlarged top plan view taken from FIGURE 3 showing the dial housing and selector mechanism with the cover removed.

Figure 8:
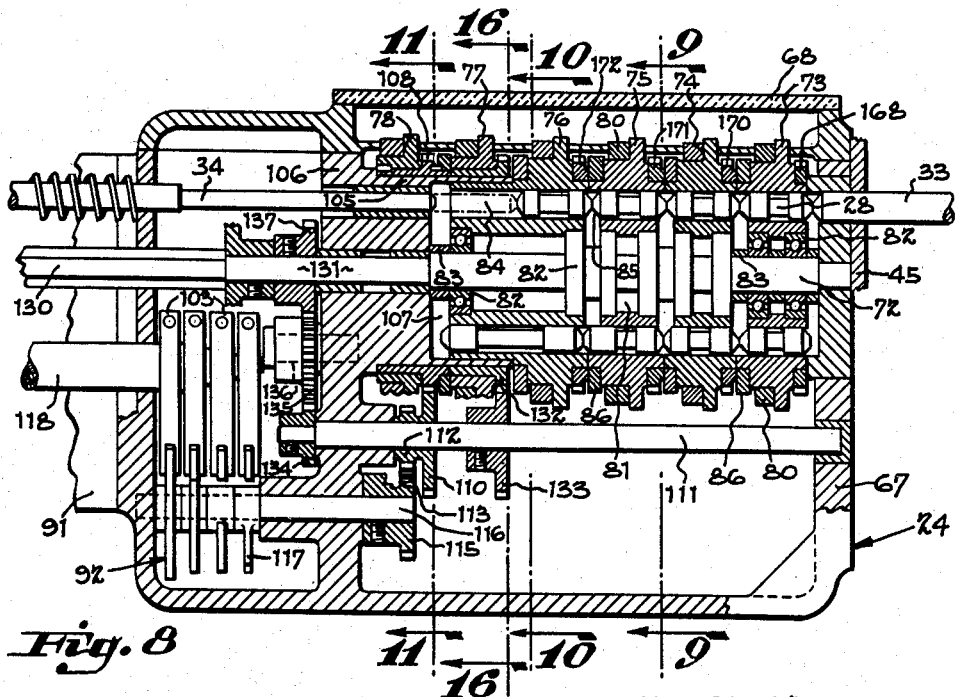

FIGURE 8 is a cross-sectional view taken along line 8—8 of FIGURE 7, detailing the construction of the selector dials of the measuring apparatus.

FIGURE 9 is a cross-sectional view taken along line 9—9 of FIGURE 8 illustrating the driving connection from one of the dial-setting gears to a selector dial.

FIGURE 10 is a cross-sectional view taken along line 10—10 of FIGURE 8 showing the detent mechanism of one of the dials.

Figure 11:
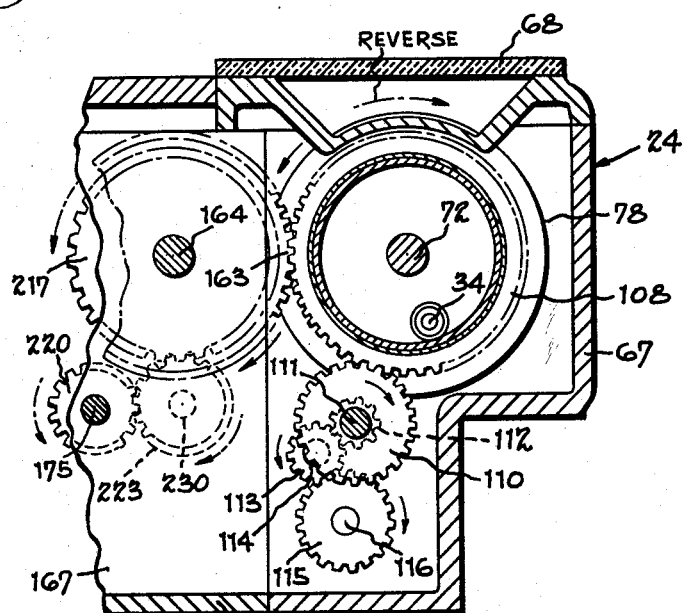

FIGURE 11 is a cross-sectional view take along line 11—11 of FIGURE 8 showing the gear train from the ten inch dial to the mechanism which shifts the ten inch rods.

FIGURE 12 is a fragmentary view showing the dial setting cams and actuating mechanism which shifts the ten inch measuring rods to active or inactive position.

FIGURE 13 is a cross-sectional view taken along line 13—13 of FIGURE 12 further illustrating the selector cams for the ten-inch rod mechanism, the cams being shown in a zero or inactive position.

FIGURE 14 is a cross-sectional view similar to FIGURE 13 showing the cams rotated to a position in which the selected ten inch rods are shifted to an active position.

FIGURE 15 is a cross-sectional view taken along line 15—15 of FIGURE 12 illustrating the stop mechanism which locates the ten inch rods in their active or inactive position, the rods being shown in their inactive or lowered position in full lines and in their active position in broken lines.

Figure 16:
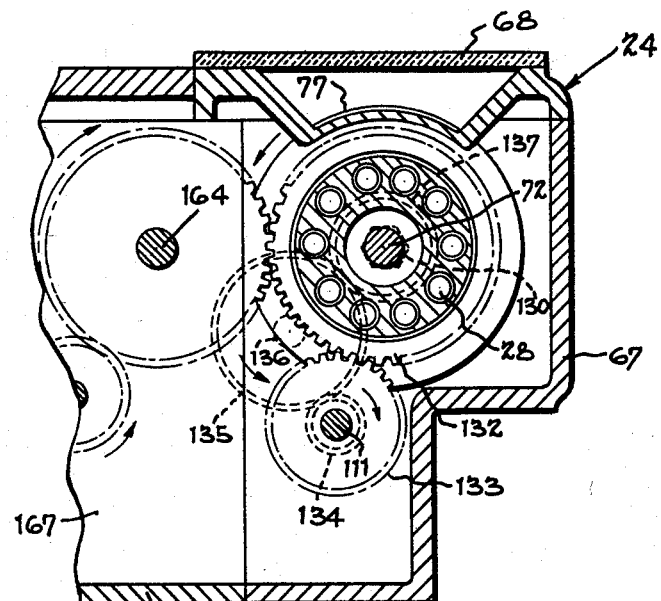

FIGURE 16 is a cross-sectional view taken along line 16—16 of FIGURE 8 showing the dial setting gear train from the turret selector dial to the shaft which rotates the turret measuring rods to selected positions.

FIGURE 17 is a fragmentary side elevational view of the turret.

FIGURE 18 is a cross-sectional view taken along line 18—18 of FIGURE 17 further illustrating the turret.

FIGURE 19 is a cross-sectional view taken along line 19—19 of FIGURE 17 illustrating the abutment end of the turret.

FIGURE 20 is an enlarged cross-sectional view taken along line 20—20 of FIGURE 17 detailing the turret and its clamping mechanism in relation to the ten inch rods.

Figure 21:
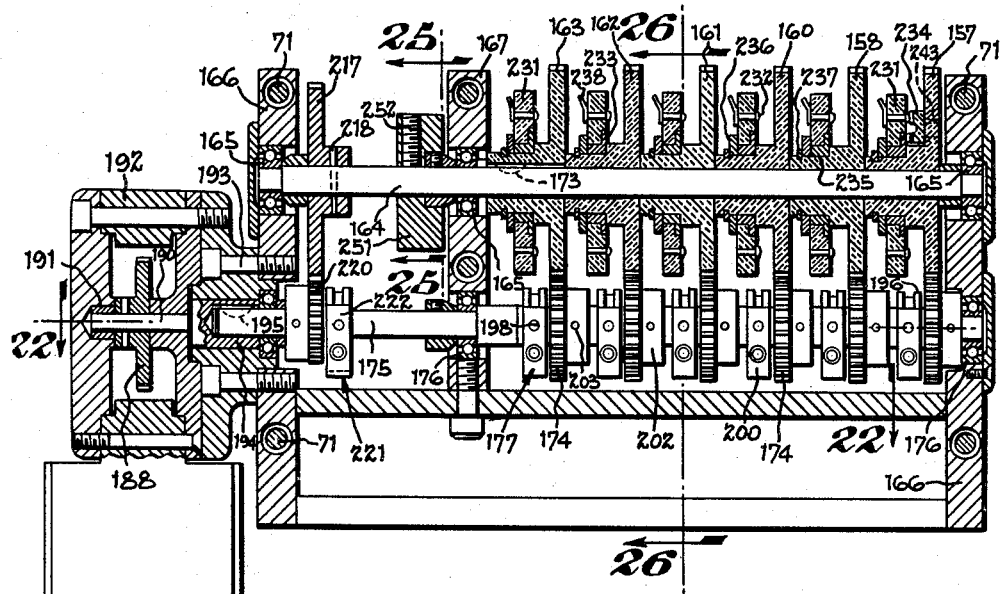

FIGURE 21 is a cross-sectional view taken along line 21—21 of FIGURE 7 detailing the dial setting gears and switches of the selector mechanism.

Figure 22:
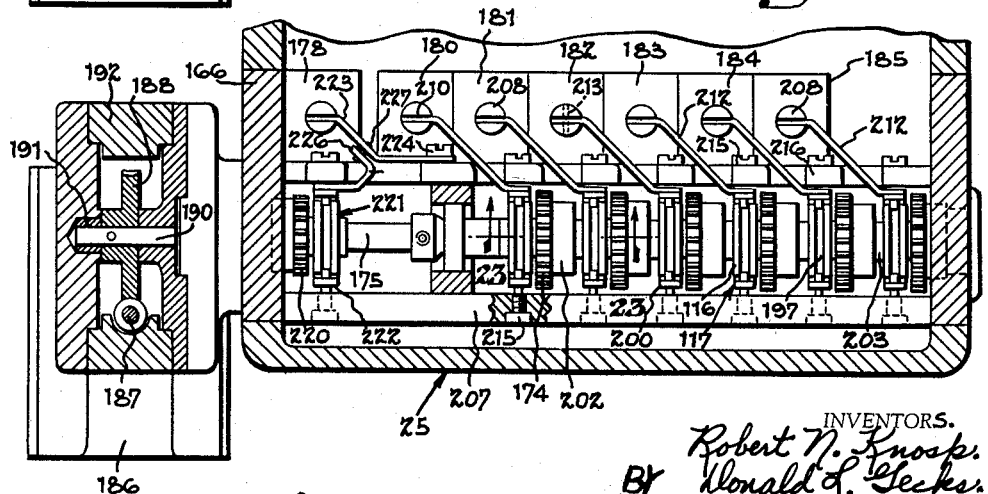

FIGURE 22 is a cross-sectional view taken along line

22—22 of FIGURE 21 showing the pinions, clutches, and actuating linkage of the dial selector mechanism.

Figure 23:
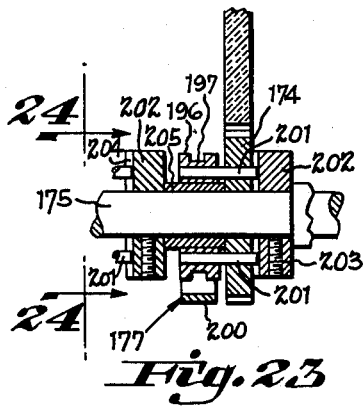

FIGURE 23 is an enlarged cross-sectional view taken along line 23—23 of FIGURE 22 detailing one of the clutches which controls the operation of the dial setting gears.

Figure 24:
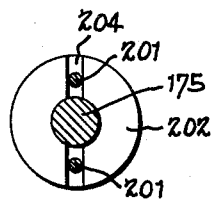

FIGURE 24 is a cross-sectional view taken along line 24—24 of FIGURE 23 further detailing the clutch.

Figure 25:
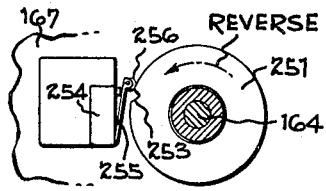

FIGURE 25 is a cross-sectional view taken along line 25—25 of FIGURE 21 illustrating the detent disk and directional switch which controls the reverse rotation of the ten inch dial at the start of a selecting cycle.

Figure 26:
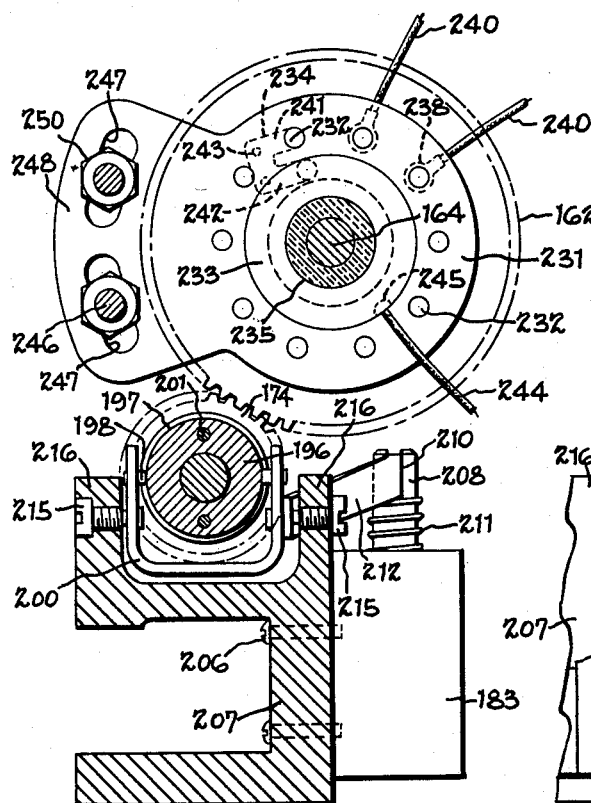

FIGURE 26 is a cross-sectional view taken along line 26—26 of FIGURE 21 further detailing one of the selector switches and clutch linkage.

Figure 27:
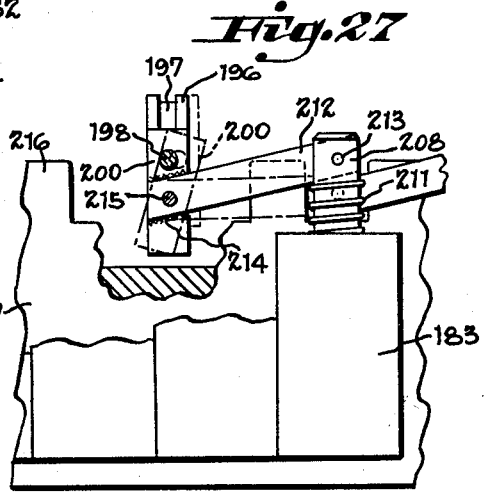

FIGURE 27 is a fragmentary view projected from FIGURE 26 further illustrating the clutch linkage.

Figure 28:
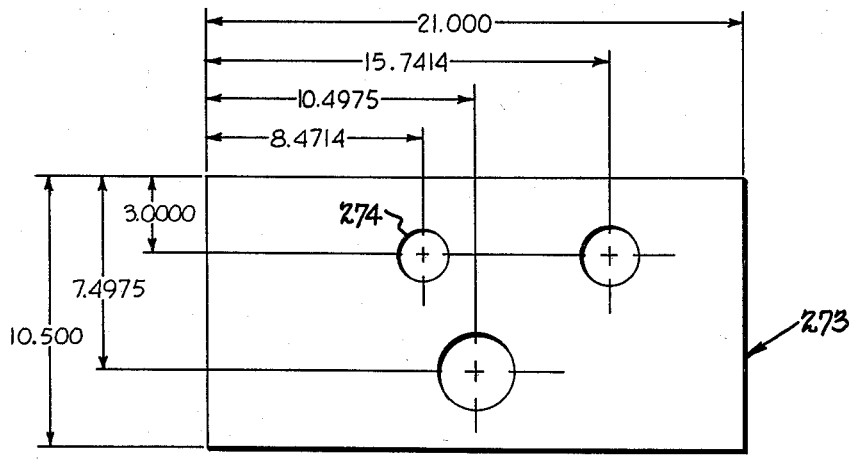

FIGURE 28 is a lay-out of a typical work piece.

Figure 29:
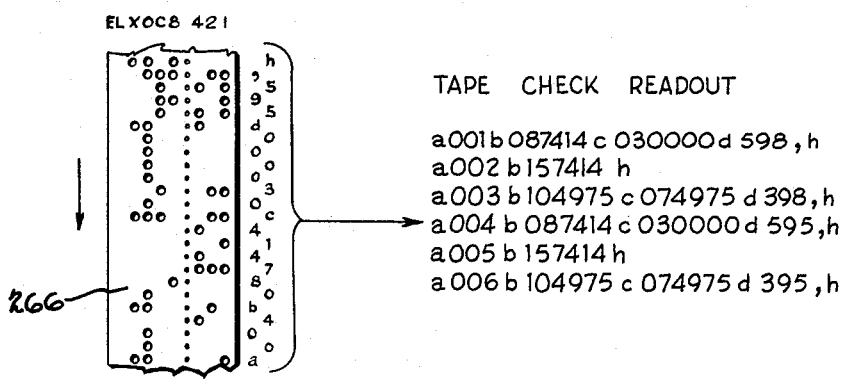

FIGURE 29 is an elevational view showing a section of punched tape for controlling a machine tool.

Figure 30:
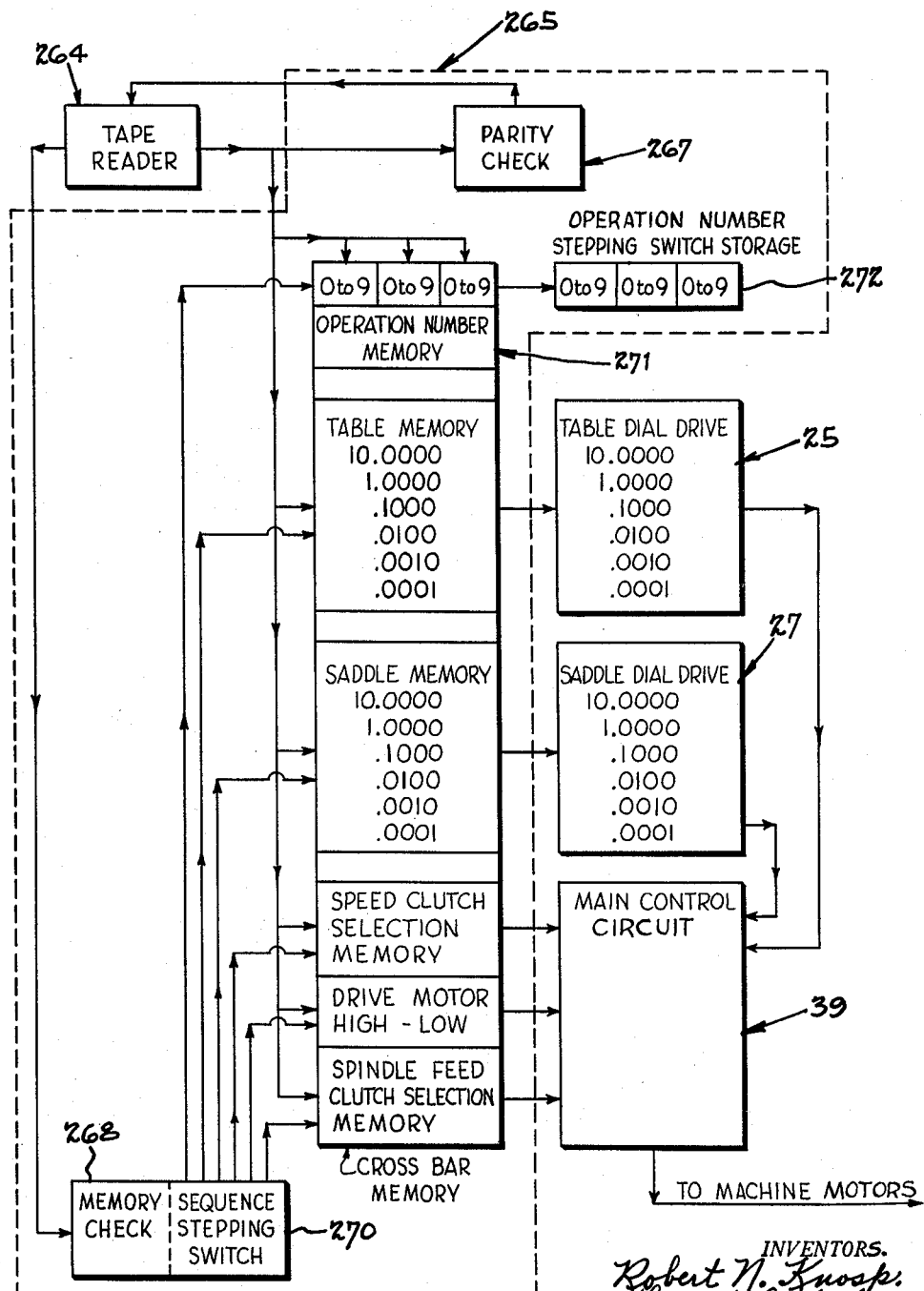

FIGURE 30 is a block diagram of the present control system.

Figure 31:
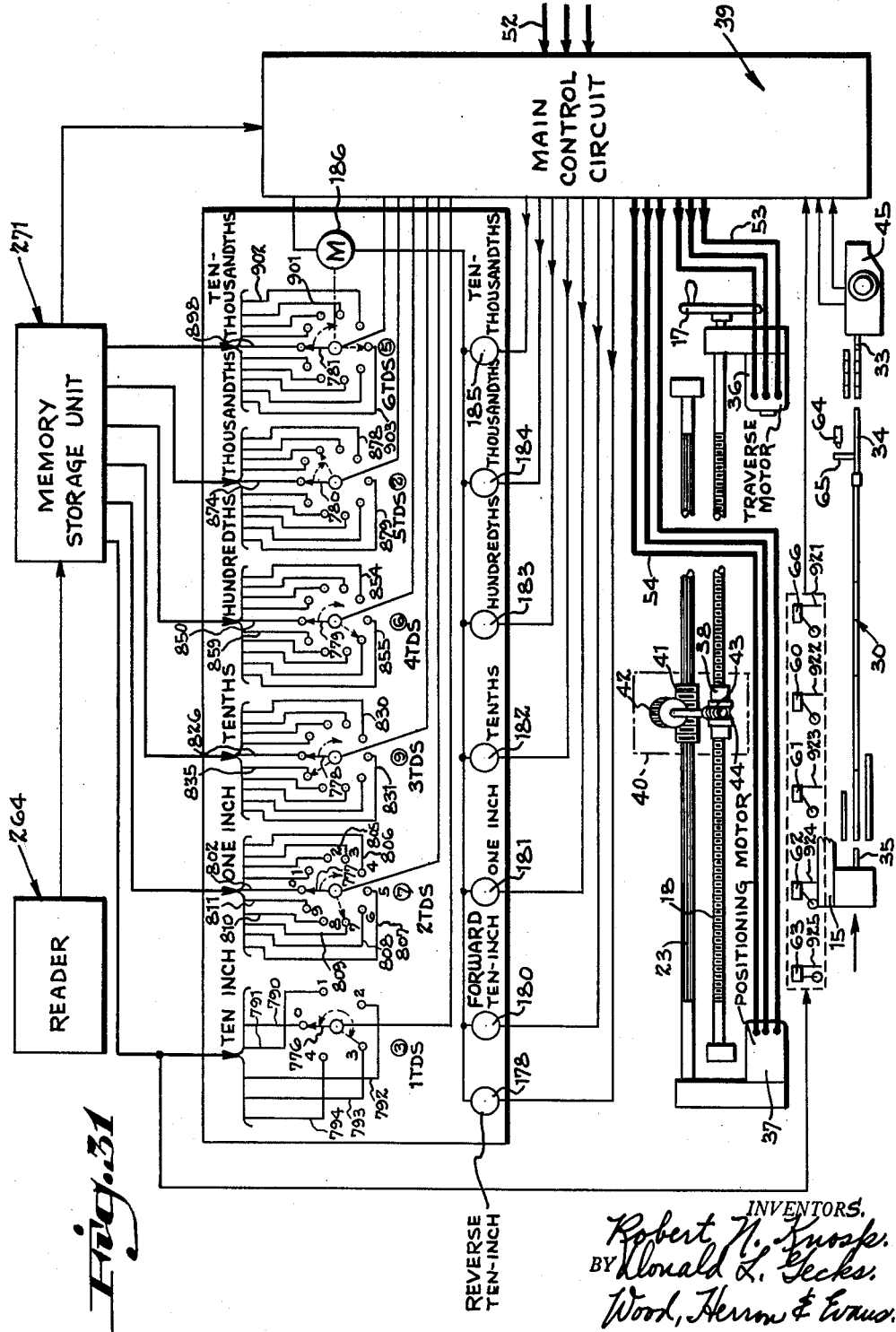

FIGURE 31 is a schematic circuit diagram showing the control of the table feed.

FIGURES 32–43 are schematic circuit diagrams showing various elements of the control system.

FIGURE 44 is a schematic circuit diagram of one of the cross bar switch units.

FIGURE 45 is a schematic circuit diagram showing the second cross bar switch unit.

FIGURE 46 is a perspective view of a cross bar switch.

FIGURE 47 is an enlarged perspective view showing details of construction of the cross bar switch.

FIGURE 48 is a diagrammatic sectional view of a compact unit of a cross bar switch.

Figure 49:
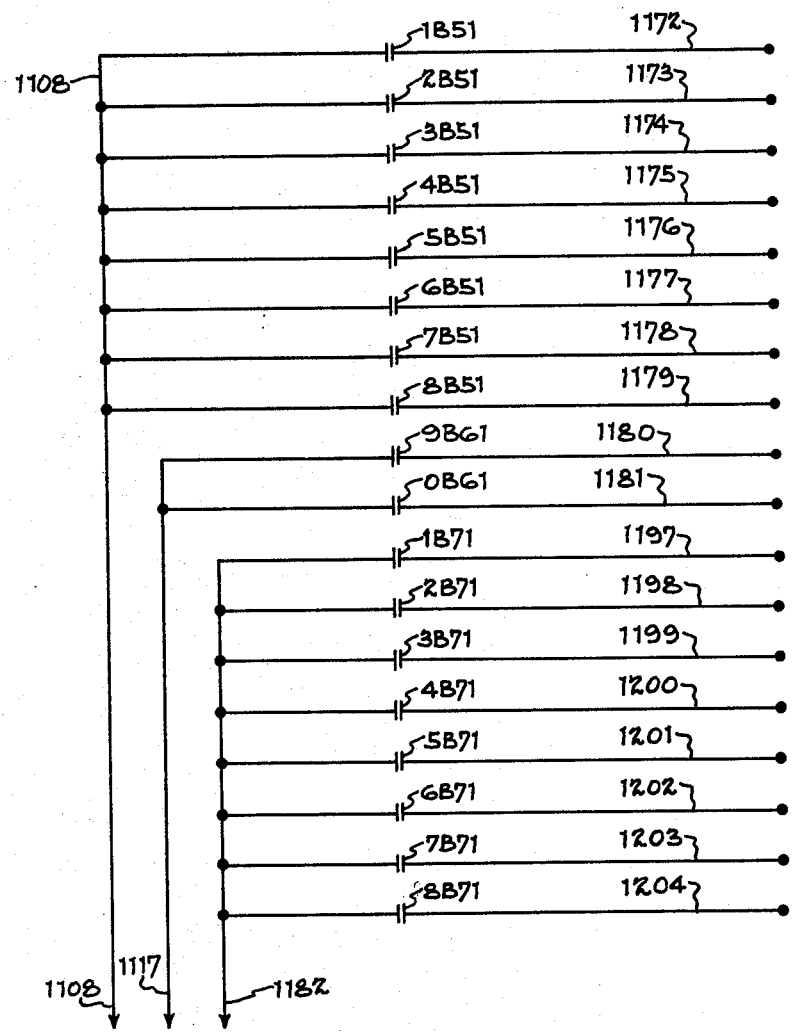

FIGURE 49 is a schematic circuit diagram.

FIGURE 50 is a diagrammatic view showing of the spindle drive.

GENERAL DESCRIPTION

The present programming and control system is disclosed in conjunction with a jig boring machine of the type shown in the copending application of Robert N. Knosp, Serial No. 656,322, filed May 1, 1957, issued as Patent No. 2,932,088, dated April 12, 1960, for "Programming Apparatus for Machine Tools." While the present invention is particularly advantageous for use with a jig borer of this type, it is to be understood that in its broadest aspects the present programming system can be employed in connection with other machine tools, such as milling machines, lathes, and the like, as well as machinery of other types.

In general, it will be appreciated that in most machine tools there are many functions to be controlled. Thus, in a jig borer these functions would include the table and saddle location, the spindle feeds and speeds, the spindle feed depth, the spindle head height, and tool changes. The present control system is adapted to provide a completely automatic control over all of these functions, over any single function, or over any group of functions.

In the present disclosure the control system automatically controls three functions; i.e., location of the table, location of the saddle, and the spindle feeds and speeds. However, it is to be emphasized that this is merely exemplary and the present system could be modified without departing in any manner from the principles of the invention so as to additionally control the spindle feed depth, spindle head height, and automatic tool changing if desired.

In a similar manner, the present control system could be employed to control other functions of other machine tools. Thus, by way of further example, the present control system could be employed with a shoulder turning lathe to control the position of the carriage and cross slide as well as the rates of advancement of these elements and rate of head stock rotation.

While the exact details of construction of the jig boring machine disclosed in the present application do not constitute part of the present invention, it is considered that a fuller understanding of the operation and significance of the present control system can best be had from a detailed description of its relation to the control of a specific machine. To this end, the present application contains a detailed disclosure of those components of the jig boring machine which are automatically controlled by the programming apparatus. Thus, the present application contains a disclosure of the means for positioning the table and saddle and for controlling the spindle feed and speed. The description of these components is broken down into sections generally in accord with the disclosure of the copending application of Robert N. Knosp, Serial No. 656,322 (Patent No. 2,932,088).

Figure 1:
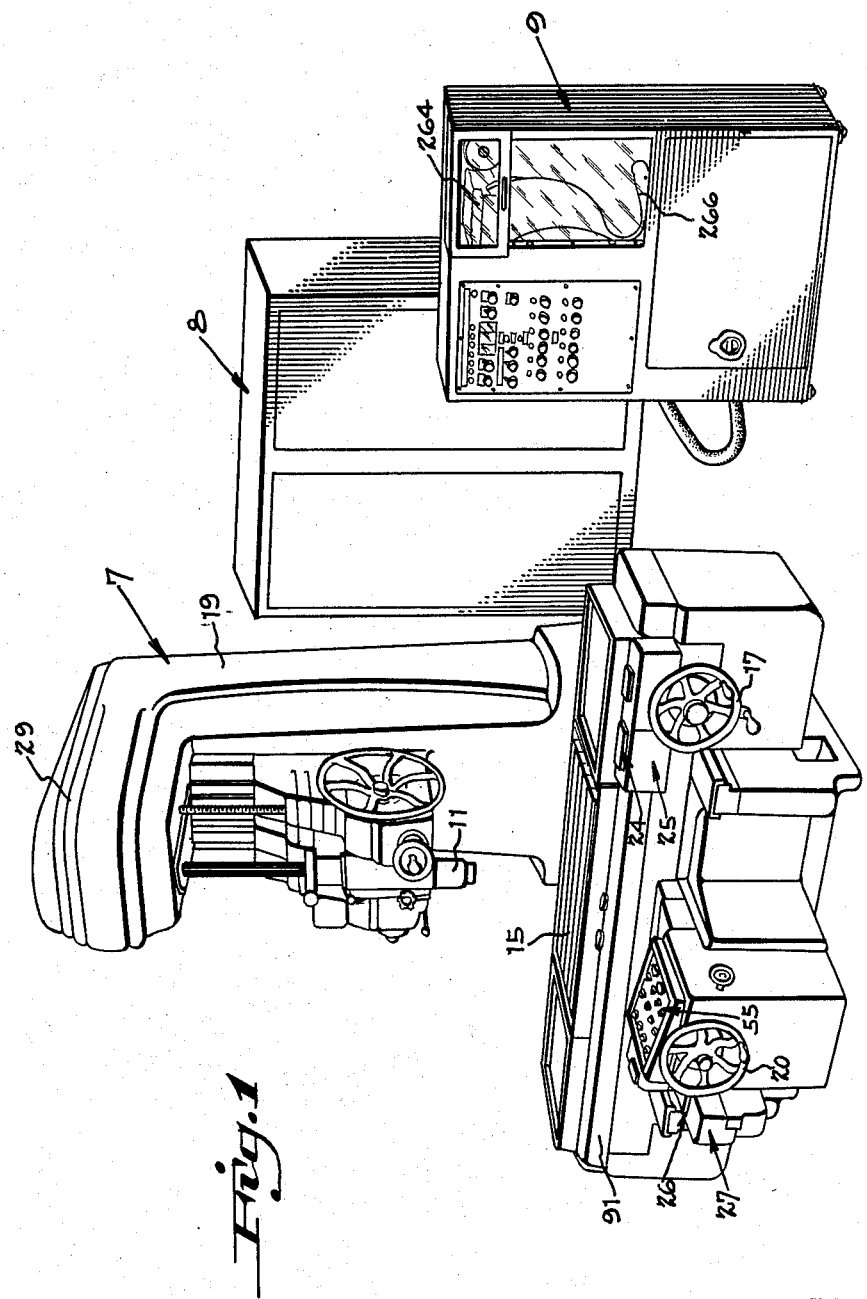
FIGURE 1 is a perspective view of the present memory storage system as it is used in conjunction with a jig boring machine.

Referring more specifically to the drawings and particularly to the general view of the machine and programming apparatus shown in FIGURE 1, an exemplary machine tool system constructed in accordance with the present invention comprises a jig boring machine 7, a main control panel 8, and a reader and data storage unit indicated generally at 9. These three main components are preferably, but not necessarily, disposed closely adjacent to one another and are interconnected by suitable electric cables.

Referring further to FIGURES 1 and 3, the jig boring machine comprises a bed 10 and a column 19 rising vertically from the rearward side of the bed. A speed gear housing 29 is mounted upon the column above the bed and includes a vertical spindle 11 (indicated diagrammatically in FIGURE 1), projecting downwardly toward the bed. The top surface of the bed includes transverse ways 12 slidably supporting a saddle or cross slide 13 for transverse motion across the bed; the upper surface of the cross slide includes longitudinal ways 14 upon which is slidably mounted a work table 15. The workpiece 16 is clamped upon the table and is shifted with respect to the spindle by the combined transverse and longitudinal motions of the saddle and table.

The table may be shifted longitudinally along the ways 14 of the saddle by operation of a hand wheel 17 which is connected through a gear train to a longitudinal lead screw 18. The saddle and table as a unit may be shifted transversely along the bed by operating a second hand wheel 20 which is connected through a similar gear train to a transverse lead screw 21. During an automatic cycle, the positioning apparatus shifts the slide and table by operation of the transverse and longitudinal splined shafts 22 and 23 of the saddle and table respectively, as explained later, with reference to the positioning mechanism.

The final position of the table relative to the saddle is governed by the measuring apparatus in accordance with the setting of the dials of the dial housing which is indicated generally at 24 in FIGURES 3 and 8. The dials are rotated to the required dimension by the selector mechanism indicated generally at 25, which is mounted directly on the dial housing 24. This selector mechanism is disclosed and claimed in application Serial No. 656,322 (Patent No. 2,932,088) noted above; and embodies certain features disclosed in Robert N. Knosp et al. application Serial No. 485,851, issued as Patent No. 2,908,978 for "Dial Operated Measuring Apparatus for Machine Tools," filed February 3, 1953, and Robert N. Knosp Patent No. 2,674,706. A similar dial housing 26 including an automatic selector 27 governs the position of the saddle with respect to the bed. The measuring devices of the table and slide are identical and for this reason, only the table apparatus is disclosed in detail.

MEASURING RODS

Described generally, the measuring apparatus comprises three groups of measuring rods or gauges of incremental length, the groups being indicated diagrammatically at 28, 30, and 31 in FIGURES 4 to 6. The rods indicated at 31 are arranged in length increments of one inch each and are identified in the specification as "one-inch rods." The rods indicated at 30 are arranged in increments of ten inches and are designated as "ten-inch rods." The four sets of rods, indicated collectively at 28 are arranged in decimal increments and are designated as "decimal rods." The rods of each group act as length gauges and their dimensions are held within the exceptionally close limits of standard gauge practice.

The decimal rods 28 provide additive measurements in the order of tenths, hundredths, thousandths, and ten-thousandths of an inch and carry a selected dimension to the fourth decimal place. Each set of decimal rods 28 is arranged in a series of ten rods and the shortest rod of each of the four sets represents zero, as indicated at "0" in FIGURE 4.

The one-inch rods 31 are also arranged in a series of ten, the shortest rod representing zero, the remaining rods increasing in steps of one inch, such that the longest rod provides a nine-inch measurement. When the selected one-inch rods and decimal rods are shifted into axial alignment, they provide in combination any selected length measurement from 0.0000″ to 9.9999″. In the present disclosure, the four ten-inch rods 30 provide ten-inch increments which are added to the decimal rods and one-inch rods, such that the combined rods provide any selected measurements from 0.0000″ to 49.9999″ in steps of one ten-thousandth of an inch.

The decimal rods 28 of the table are carried in respective dials which are mounted within the dial housing 24 as explained in detail later. The one-inch rods 31 are mounted within a turret 32 (FIGURE 17) which is carried by the table 15 such that the one-inch rods move with the table relative to the decimal rods of the dial housing (FIGURE 5). The ten-inch measuring rods 30 are mounted relative to the saddle 13, and in order to conserve space, they shift transversely from an inactive position to a measuring position in alignment between the selected decimal and one-inch rods (FIGURES 5 and 20). When in the inactive position, the ten-inch rods reside in alignment with one another but below the line of movement of the one-inch turret 32 to allow the turret to pass with the table above the ten-inch rods.

As described in greater detail later, the decimal dials and one-inch turret are mounted for rotation upon a common axis, such that the ten rods of the turret and dials are disposed in concentric circles to be rotated selectively into alignment with one another. The arrangement is such that the table may be shifted toward the right to bring the turret rods into endwise contact with the decimal rods of the dials when the ten-inch rods are in their inactive position (FIGURE 4).

In setting up the machine for boring a series of holes, the table is shifted to the right to locate the workpiece at a base reference position relative to the spindle. The measuring apparatus, as explained later, locates the hole centers in spaced relation to the base reference surface or point previously established. In the initial set-up operation, the measuring rods are shifted to a zero position as shown diagrammatically in FIGURE 4. In zero position, and in the subsequent measuring positions, the selected decimal and one-inch rods reside in axial alignment with one another between a spring loaded feeler rod 33 and a thrust rod 34, the aligned rods being shifted toward the right by an abutment rod 35 which is carried by the table. As shown in FIGURE 4, the abutment rod 35 contacts the selected one-inch rod, such that the motion of the table is transmitted from the abutment rod 35 through the selected one-inch and decimal rods and thrust rod 34, to the feeler rod 33. The feeler rod is arranged to stop the table at its selected position during the subsequent positioning operations as described later. In principle therefore, the measuring rods act as gauges or spacers between the table and saddle to locate the hole centers precisely with respect to the base reference point or surface.

AUTOMATIC POSITIONING MECHANISM

Referring to the lower portion of FIGURE 31, the positioning apparatus is shown diagrammatically in relation to the table and includes a reversible rapid traverse motor 36 and a positioning motor 37. When a positioning cycle is initiated, the traverse motor first shifts the table at a traverse rate to a back-up position to allow the measuring rods to be shifted to gauging position thereafter the traverse motor shifts the table toward the right at the traverse rate during the positioning cycle. As the final position is approached, the traverse motor 36 is de-energized and the positioning motor 37 is energized to inch the table slowly to its final position. The slow positioning rate makes it possible to stop the table precisely at its final position without danger of over-travel. As disclosed in Patent No. 2,674,706, the positioning motor is reversed momentarily after it stops the table at final position in order to relieve the drive system of any stresses between the motor and table, thereby to prevent minute shifting after the table is stopped.

As indicated in FIGURE 31, the traverse motor 36 is in driving connection with the lead screw 18 which, as indicated earlier, may also be rotated by the hand wheel 17. The lead screw 18 is threaded through a nut 38, the nut being confined endwise within a gear box 40 attached to the table as indicated in broken lines. Rotation of the traverse motor 36 in one direction thus rotates the lead screw to shift the table toward the left to its back-up position and reversal of the motor traverses the table toward the right. The traverse motor speeds up the positioning cycle since it shifts the table at a speed which is considerably greater than the positioning speed.

During the positioning motion, the lead screw 18 remains stationary and the nut 38 is rotated relative to the lead screw by the positioning motor 37. The positioning motor is in driving connection with the splined shaft 23 previously noted, the splined shaft being slidably keyed to a worm 41 meshing with the teeth of a worm wheel 42. Worm wheel 42 drives a second worm 43 which meshes with the worm wheel 44 of nut 38, thus providing a reduction drive for rotating the nut 38 at a slower positioning rate relative to the lead screw 18.

As shown in FIGURES 8 and 31, feeler rod 33 projects from a switch box 45 which is interconnected with the control circuit of the positioning apparatus. Since the control unit and its associated circuit does not form an essential part of this invention, this portion of the positioning apparatus has been omitted from the drawings, the complete apparatus being disclosed in the aforesaid Knosp patent.

In general, the switch box 45 comprises a housing which is attached directly to the dial housing (FIGURE 8), the outer end of the feeler rod 33 residing within the dial housing in alignment with the last decimal rod of the series. The feeler rod is spring biased toward the decimal rod and its movement toward the rod is limited by a stop element (not shown) such that the end of the rod does not interfere with normal rotation of the decimal rod dial. The control housing encloses a rapid traverse switch and a final positioning switch (not shown) both of which are in operative connection with the feeler rod.

In initially setting up the machine for boring a series of holes, the table is first shifted to a position to align the reference surface of the work precisely with the axis of the spindle as explained earlier. In the preferred mode of operation, the reference surface or point is located at the left end of the work, and the hole centers are measured from the reference point toward the right. By way of example, the edge 46 of the workpiece (FIGURE 3) may represent the reference plane, the table being shifted toward the right, as indicated, to locate the second hole 47 (broken lines) in alignment with spindle 11. In this example, the first hole 48, previously bored, also was measured from edge 46. In establishing the reference point, the table preferably is shifted to its zero position to the right as noted previously with respect to FIGURE 4. It will be understood at this point, that the turret is adjustable lengthwise relative to the table to bring the zero one-inch and decimal rods into endwise abutment between the abutment rod 35 and feeler rod 33 as indicated. At the initial zero setting, the adjustment is such that the spring loaded feeler rod is depressed slightly to a position in which it normally deenergizes the positioning motor at the final position of the table at the selected hole center.

After setting for the base reference point, the table is shifted toward the left as shown in full lines in FIGURE 5 to allow the selected measuring rods to be shifted to their measuring positions. This allows the spring loaded feeler rod to spring to the left to its normal position.

After the measuring rods are selected, the positioning cycle is initiated. At this point, the rapid traverse motor 36 is energized to shift the table toward the right at the traverse rate by rotation of lead screw 18. During the traverse portion of the positioning cycle, the table shifts abutment rod 35 and turret 32 toward the right, thus taking up the clearance 50 and 51 (FIGURE 5) which exist between the aligned measuring rods. As the table approaches final position, it begins to depress the feeler rod toward the right, causing the feeler rod to trip the rapid traverse switch. At this point, the control circuit plugs the rapid traverse motor 36 to a stop and energizes the positioning motor 37. The positioning motor now continues feeding the table toward the right at a slow positioning rate until the feeler rod trips the positioning switch at final position. This action deenergizes the positioning motor and stops the table at final position. It will be understood that the positioning switch trips when the feeler rod reaches the same preloaded pressure for which it was set initially at the reference position (FIGURE 4), hence the new position of the table and workpiece is determined precisely by the additive length of the selected measuring rods under the same preloaded pressure. It has been found in practice that the hole centers are located consistently within a tolerance of plus or minus .0001″ upon each operation. In its preferred embodiment, as disclosed in the patent, the table is traversed at the rate of 140 inches per minute toward the right until it displaces the measuring rods and feeler rods sufficiently to trip the rapid traverse switch. At this point, the positioning motor continues the advancement at the rate of .415 inch per minute until the table is inched to its final position.

As shown diagrammatically in FIGURE 31, electrical energy is supplied to the main control circuit 39 of the positioning apparatus by power lines 52, the traverse and positioning motors being energized by the power lines 53 and 54 which lead from the control circuit. The control circuit is shown in block form in FIGURE 31. It will be understood at this point that the control circuit includes the necessary relays and other components for providing the sequential operation of the traverse and positioning motors in response to the feeler rod 33.

Under manual control, the positioning cycles are governed by suitable push button switches as indicated diagrammatically in FIGURE 1. One of the push buttons indicated at 55 shifts the table toward the left and another of the push buttons shifts the table toward the right. A third push button initiates the positioning cycle after the table has been shifted to the left and the measuring rods selected. A stop button decommissions the entire apparatus upon being depressed. The saddle positioning apparatus is provided with a similar set of manual switches.

In the present disclosure, the programming apparatus governs the movements of the table and the selection of measuring rods in proper sequence. The manual switches are utilized only in the initial set-up operation, as described earlier. The table traversed toward the left is under control of the programming apparatus, through the medium of stationing switches mounted relative to the table and interconnected in the programming circuit. As indicated in FIGURES 4–6, the stationing switches 60 to 63 control the back-off position of the table, the switches being located in positions to be tripped by the table when it has been backed off a sufficient distance to allow the preselected ten-inch and one-inch rods to be shifted to their gauging position. In the present disclosure (FIGURE 5), the table is shown retracted to the stationing switch 62, allowing the first three ten-inch rods to be elevated, plus the longest rod of the turret.

In addition to the ten-inch stationing switches, there is also provided a back-off switch 64 which is actuated by a tripping element 65 mounted on thrust rod 34. This switch represents the zero position of the table and it is tripped when the pressure is applied to the thrust rod at the zero set-up position (FIGURE 4). The back-off switch 64 is interconnected in the control circuit to initiate the dial selecting cycle of the programming apparatus after the table has been shifted to a back-off position.

Adjacent the back-off switch 64, there is provided a zero to nine inch stationing switch 66. This switch is tripped by the table when the table has been shifted to a back-off position which is slightly greater than nine inches from the zero position to allow the one-inch turret to be rotated to bring the rods from one to nine inches into measuring position. In other words, this switch regulates the back-up position when no ten-inch rods are to be shifted.

It will be understood at this point, that the control circuit includes a "start shift switch" which is depressed by an operator to start the positioning cycle. When this button is depressed, the table is shifted toward the left (FIGURE 5), the back-off position being controlled by the programming apparatus which sends a signal to the stationing switches. In the present example, a signal is sent to stationing switch 62 to cause the table to be backed off until this switch is tripped, thus allowing the three ten-inch rods and the required one-inch and decimal rods to be shifted to measuring position as shown. The positioning cycle is described later in detail with reference to FIGURE 31.

DIAL MECHANISM

As noted earlier, the dial housing 24 and 26 for the slide and table respectively are disclosed in detail in co-pending application Serial No. 656,322 (Patent No. 2,932,088). The dials thereof are rotated by the present selector mechanisms 25 and 27 which are attached to the respective dial housings. The dial housing and its associated selector mechanism are identical for the table and saddle and the following description of the table apparatus also applies to the corresponding apparatus of the saddle. Since the exact details of the dial mechanism are not pertinent to the present invention, the following description has been limited to the essential features by which the dial housing coacts with the programming apparatus in selecting the measuring rods.

Referring to FIGURES 7–10, the dial housing comprises a box-like casting 67 secured to the saddle 13 and having a transparent cover or window 68 hinged to the top of the casting. In the present structure, the front cover of the housing, which is shown in the co-pending application, has been removed, and the housing 70 of the automatic selector mechanism is attached by bolts 71 (FIGURE 21) directly to the dial housing. As described later, the selector housing includes selector gears which are in driving connecting with the gears of the selector dials.

As shown in FIGURES 7 and 8, the dial housing encloses six selector dials which are rotatably journalled upon the axis of a dial shaft 72. The first four dials which are indicated at 73 to 76, carry the decimal measuring rods 28. The one-inch dial, indicated at 77, is in driving connection with the turret 32 and rotates the selected one-inch rod of the turret to its measuring position. The ten-inch dial, which is indicated at 78, is in driving connection with the ten-inch rods and serves to shift the selected ten-inch rods into measuring position.

Each dial is provided with a graduated ring 80 which indicates the order of length increments, such that the dials collectively provide direct reading of the selected dimensions through the transparent window 68. The decimal and one-inch dials have ten graduations indicating "0" to "9" and the ten-inch dials have five graduations indicating "0" to "4." As shown in FIGURE 7, the dials are rotated to the dimension 37.9625", the selected measuring rods for this dimension being shown diagrammatically in FIGURE 6. In this example, three of the ten-inch rods 30 and the seven-inch rod 31 of the turret have been shifted to measuring position in alignment to provide the 37" dimension. For the decimal measurement, selected decimal rods 28 providing the .9625" dimension have been shifted to measuring position.

Each decimal dial is in the form of a barrel having a central bore 81 rotatably journalled upon the dial shaft 72 by means of ball bearings 82. The ball bearings are located by suitable spacers 83 slipped upon the dial shaft 72 between the bearings. Each decimal dial includes a series of measuring rod bores spaced equally from one another in a circle which is concentric to the dial shaft such that the decimal rods 28 within the bores may be indexed in alignment with one another as indicated in FIGURE 8. As explained earlier, the four sets of decimal rods 28 provide the measurements in tenths, hundredths, thousandths, and ten-thousandths of an inch from the zero setting. The shortest rod of each of the decimal sets has a length of 1.000", the rods of each set increasing in the respective orders indicated above from this basic length.

It will be noted in FIGURE 8, that the inner end of the spring loaded thrust rod 34 normally resides in spaced relation to the zero measuring rod so as to provide the clearance 84 which allows the dials to be rotated, the clearance being sufficient to allow the longest decimal rods to reside endwisely between the feeler rod 33 and thrust rod 34. As explained earlier, after the base reference point on the work is established (FIGURE 4), the thrust rod 34 and turret 32 are adjusted relative to the table to depress the thrust rod into contact with the zero decimal rods. This setting is shown in broken lines in FIGURE 8. The adjustment is such that the feeler rod 33 is depressed to its tripping position; hence, it will be seen that the trust rod will spring to its normally extended position, as shown in full lines, when the table, together with abutment 35 and turret 32 are shifted to the left (FIGURE 5) for the selection of the measuring rods.

After the selection is made, the selected decimal rods 28 reside in alignment between the end of the thrust rod 34 and feeler rod 33, the spacing between the ends of the two rods being slightly greater than the additive length of the longest decimal rods of the series. To provide a camming action, the ends of each rod are tapered as at 85, allowing the rods to shift endwisely without interference during relative rotation of the dials. The tapered ends terminate in a flat anvil surface which provides a bearing area when the rods are in alignment. It will be understood that when the turret rod is depressed during the positioning cycle, the clearance between the rods, if any exists, is taken up as the feeler rod is depressed; consequently, the rods locate the table precisely at the dimension to which the dials are set. For purposes of illustration, the coaxial thrust rod 34 and feeler rod 33 are shown displaced from their true positions in FIGURE 8; the actual center of the rods 34 (and feeler rod 33) is shown in FIGURE 11.

In order to hold the dials in selected positions, the dials (excepting the ten-inch dial) includes a detent wheel 86 which is notched as at 87, the notches corresponding with the location of the dial graduations (FIGURE 10). Each detent wheel is engaged by a roller 88 carried on a spring loaded detent arm 90. When the roller is engaged in one of the notches of the detent wheel, the selected measuring rod is located in axial alignment with the rods 33 and 34 as indicated in FIGURE 11.

The turret 32 and the ten-inch rods 30 are located within an elongated housing 91 which extends from the dial housing 24 as shown in FIGURES 3 and 20. The ten-inch dial 78 shifts the four ten-inch rods successively from zero position to the measuring position as the dial is advanced from its zero graduation. As explained earlier, the turret and decimal dials are rotatable upon a common axis, the rods of the turret and dials being spaced in concentric circles for selective alignment. It will be observed in FIGURE 20 that the ten-inch rods 30 reside below the plane of movement of the turret when in their inactive position. When shifted to measuring position, the selected ten-inch rods reside along the same axis as the selected decimal and one-inch rods as shown in broken lines in FIGURE 20.

Referring to FIGURE 12, the ten-inch rods 30 are selected by respective cams indicated generally at 92 which are in driving connection with four rock shafts or tubes 118 to 122, telescopically interfitted for rotary motion relative to one another. The tubes are rotatably journalled within the elongated housing 91 as explained later, each rock shaft having a respective pair of rocker arms 97 secured thereto, the outer ends of which include bores slidably embracing the endwise portions of the respective ten-inch rods. Each ten-inch measuring rod is yieldably biased toward the left by a compression spring which urges the rods endwisely against a stop (not shown).

To control the position of the measuring rods, in their active or inactive position each of the rock shafts include a stop collar 98 (FIGURE 15) fixed to the shaft and provided with a pair of shoulders 100—100 which are engaged by stop screws 101—101 threaded through the bottom wall 102 of the elongated housing. When shifted to its active position, the left hand stop screw engages its shoulder with the measuring rod disposed in alignment with the selected one-inch rod of the turret as shown in broken lines in FIGURES 15 and 20.

The motion of the cams 92 is transmitted to the individual rock shaft tubes by a series of cam levers 103 (FIGURES 12–19), one for each tube, the levers being non-rotatably clamped to the respective tubes. Each lever includes a cam roller 104 tracking upon a respective cam. The cams are so arranged that the ten-inch rods sequentially are elevated to the active position of FIGURE 15, starting with the first measuring rod to the right.

Referring to FIGURE 8, the ten-inch dial 78 is rotatably journalled upon a boss 105 projecting from the intermediate wall 106 of the dial housing. Boss 105 has an internal bore 107 concentric with the dial shaft 72, the thrust rod 34 projecting into the bore for cooperation with the decimal measuring rods. The cams 92 are in driving connection with the ten-inch dial 78 by way of a gear train (FIGURE 11) consisting of a gear 108 secured to dial 78 and rotatably journalled on boss 105. A gear 110 meshes with dial gear 108 and is losely journalled on a counter shaft 111 which is rotatably journalled in the dial housing. Gear 110 includes a pinion 112 meshing with a reversing idler gear 113 journalled on a stub shaft 114 of the housing (FIGURE 8). The idler gear 113 meshes with a gear 115 non-rotatably secured to the cam shaft 116.

Referring to FIGURE 12, the four cams 92 are non-rotatably secured to shaft 116, the cams having leading edges 117 located in four angular positions, such that the four leading edges are advanced successively to the cam rollers as shaft 116 is rotated in the rod selecting direction indicated by the arrows in FIGURES 11 and 14. The tracking surface of the cams is concentric to shaft 116, the tracking surfaces having respective lengths as indicated by angles A to D (FIGURE 13) and have common trailing edges. The four cam levers 103, which correspond to the cams, are indicated at A' to D' and they are actuated in sequence by the leading cam edges 117.

Referring to FIGURE 13, the angles A to D, which indicate the increasing lengths of the cams, correspond to the degree of rotation imparted to the cams upon each stepwise advancement of the ten-inch dial from one graduation to the next. Thus, when dial 78 is advanced from zero to the first graduation in the direction indicated by the arrows in FIGURE 11, the leading edge 117 of the first cam engages the roller 104 of lever D' which is secured upon the tube 118. This shifts the cam lever as indicated at FIGURE 14, rotating tube 118 in a direction to elevate the first ten-inch rod to the position shown in broken lines in FIGURE 15. During the next stepwise advancement, the leading edge of the next cam engages the roller of lever C' in a similar manner to rotate tube 120 and elevate the second measuring rod. Stepwise rotation of the cam through the remaining angles is effective to rock in sequence the tube 121 and 122 to elevate the remaining rods of the series.

When the parts are rotated in the opposite direction, the measuring rods are shifted to their lowered positions in reverse order due to the arrangement of the cams. This motion is imparted by respective torsion springs 126 as explained below.

It will be noted, that for simplicity, the details are disclosed only in relation to the first tube 118, the structure being identical for several tubes. As shown, the first tube 118 is rotatably supported in a pair of spaced bearing blocks 123—123 secured to the bottom housing wall 102, with the rocker arms 97—97 residing between the bearings. The tube is confined against endwise or axial motion by the collars 124. To urge the measuring rods normally to their lowered or inactive position, each rock shaft includes a collar 125 secured to the tube adjacent the left bearing block 123. A torsion spring 126 has one end anchored to the collar 125 as at 127 and has its opposite end anchored in the bearing block 123. Each spring 126 is slightly preloaded to urge the tube in the rod lowering direction, such that the cam rollers 104 are urged by the springs against the tracking surfaces of the cams.

Referring to FIGURES 17–20, the one-inch turret 32 is rotatably supported by the slide block 128 which is clamped to the table for movement therewith; the slide block may be unclamped and shifted with respect to the table when the machine initially is set up as previously noted with respect to FIGURE 4. The turret is rotated by the hexagonal selector shaft 130 which is in driving connection with the one-inch dial 77 through a gear train as described below. The hexagonal shaft extends from the dial housing 24 and through the elongated housing 91 on an axis common to the axis of dial shaft 72. The turret is slidably keyed to the hexagonal shaft for rotation with the shaft in response to rotation of the one-inch dial 77.

Referring to FIGURE 8, the end portion of the hexagonal shaft includes a pilot shaft 131 rotatably journalled in the intermediate wall 106 of the dial housing. The one-inch dial 77 is keyed to the hub of the dial gear 132, the gear being rotatably journalled upon the boss 105.

Gear 132 is in mesh with a gear 133 which is secured to the counter shaft 111 and drives a pinion 134 fixed to the outer end of the counter shaft. As shown in FIGURE 16, pinion 134 meshes with an idler gear 135 rotatably journalled on stub shaft 136, the idler gear meshing the final drive gear 137 which is secured to the pilot shaft 131. The gear train from the dial rotates the hexagonal shaft at a one-to-one ratio in the direction indicated by the arrow in FIGURE 18.

As shown in FIGURE 20, the slide block 128, which carries the turret, is clamped in its adjusted position along the edge of the table by a T-nut 140 slidably engaged in a T-slot 138 of table 15 and threaded on a stud 141 which is carried by the slide block. The stud includes a tapered socket 142 and a clamp screw 143 includes a tapered end 144 which cams into the socket to draw the T-nut into clamping engagement. The clamping nut is rotated by means of the clamp handle 145 attached to clamp screw 143. The slide block is in permanent connection with the T-slot by a pair of similar T-nuts slidably confined in the slot and connected to the slide block by studs (not shown).

The turret 32 is rotatably confined endwisely between the arms 146—146 of the slide block 128 as shown in FIGURE 17. The turret is of sectional construction and includes a sleeve 147 journalled in the arms 146 and slidably keyed to the hexagonal shaft 130 as at 148. The one-inch measuring rods 31 have their left hand ends slidably carried in a head 150 which is attached to sleeve 147 for rotation with the selector shaft. The opposite ends of the rods are slidably carried by lugs 151 equally spaced apart and staggered along the length of the turret. Each lug includes a mounting collar 152 slipped on the sleeve and attached by respective set screws 153. As noted earlier, the one-inch measuring rods 31 are centered at spaced points which correspond with the centers of the decimal rods for selective alignment therewith.

The left end of the sleeve 147 which rotates the turret includes a head 154 having ten detent recesses 155 which correspond to the spacing of the measuring rods. The detent recesses are engaged by a ball 156 carried in the arm 146 of the slide block and urged toward the recesses by a compression spring. The detent recesses latch the turret in its selected rotary measuring positions. The abutment rod 35 also is mounted in the arm 146 and provides a gauge surface which contacts the end of the selected measuring rod.

It will be noted that the turret mounting arrangement above described, allows the turret to be shifted relative to the table to a zero position when the machine initially is set up, with the base reference point of the work aligned with the axis of the spindle. When the feeler rod 33 is depressed to its tripping position, then the clamp lever 145 may be actuated to clamp the slide block and turret in fixed position to the table. The apparatus is then in condition to be placed under the control of the programming apparatus for setting the measuring rods and positioning the table.

DIAL SELECTOR MECHANISM

Referring to FIGURES 7 and 8, the six dial setting gears 157 to 163, which rotate the dials, are mounted on a driven shaft 164 journalled as at 165 in the end walls 166, and intermediate wall 167 of the selector housing. These walls form continuations of the walls of the dial housing 24 to which they are bolted as at 71 as previously noted. The four decimal dials are provided with dial gears 168 to 172, which mesh with the setting gears 157 to 161. The setting gears 162 and 163 mesh with the gears 132 and 103 of the ten-inch dial 78 and one-inch dial 77. The dial gears 132 and 103 form a part of the gear trains of the ten-inch rods and turret as described earlier.

It will be understood at this point, that the five dial setting gears 157 to 162 are rotatably journalled upon the shaft 164, while the gear 163, which drives the ten-inch dial is keyed as at 173 to the shaft (FIGURE 21). This gear rotates the ten-inch dial in reverse as explained below. During the dial setting cycle, the six dial driving gears are rotated individually relative to one another to set the dials to their preselected positions in accordance with the electrical signals sent from the data storage unit 9.

The setting gears 157 to 163 are driven by respective pinions 174 which are loosely journalled on a drive shaft 175 rotatably journalled as at 176 in the walls of housing 25. The individual pinions 174 are coupled selectively to the drive shaft by individual clutches 177 which are normally spring-urged to coupling position. The pinions are uncoupled from the drive shaft by respective solenoids indicated at 178 to 185 which are linked to the clutches as described later. It will be understood at this point, that the clutches normally are spring biased to coupling position (FIGURE 26) and are shifted to uncoupled position when the solenoids individually are energized. This occurs when the dials have been rotated to their selected positions, the dial driving gears being provided each with a brush which completes the circuit when the preselected dial position is reached.

Referring to FIGURES 21 and 22, the drive shaft 175 is driven by a constant speed dial motor 186 having a worm 187 meshing with a worm wheel 188 attached to a stub shaft 190. The stub shaft is journalled as at 191 in a gear housing 192 which forms a part of the dial motor, the gear housing being secured by bolts 193 to the end wall 166 of the selector housing. Stub shaft 190 includes a sleeve 194 within which the end of the drive shaft 175 is keyed as at 195 on an axis common to the stub shaft axis for rotation therewith.

Described in detail with reference to FIGURES 23–26, each clutch 177 comprises a clutch spool 196 having a peripheral groove 197 which is engaged by the opposed pins 198—198 of a yoke 200, the spool being slidable upon drive shaft 175. Each clutch spool includes a pair of driving pins 201—201 projecting from the face of the spool and passing slidably through bores in the pinion 174 which it drives. A drive collar 202 which is attached to the drive shaft as at 203, provides a stop which locates the pinion along the shaft in alignment with the setting gear with which it meshes. The opposite side of each pinion is contacted by a spacer sleeve 205 slipped upon shaft 175. The clutch spools are slidably mounted on the spacer sleeves. The face of the collar, which contacts the side of the pinion, is provided with a slot 204 extending across its diameter, the slot having a width to receive the ends of the driving pins 201. When the clutch spool is shifted toward the pinion to its engaged position (FIGURE 23), the ends of the pins project into the slot of the driving collar. Since the driving collar is attached to the drive shaft, it provides a driving connecting on through the pins to the pinion 174. When in disengaged position, the spool is shifted away from the pinion a sufficient distance to withdraw the ends of the pins from the slot, thereby to disconnect the pinion from the driving collar. The spool is shown in its disengaged position in broken lines in FIGURE 27, as explained below.

Referring to FIGURE 26, the six clutch solenoids 180 to 185 are attached as at 206 to a wall 207 extending lengthwise within the selector housing. Each solenoid includes a vertical plunger 208 which is slotted as at 210. Each plunger is normally urged upwardly by a compression spring 211 having its lower end seated upon the top surface of the solenoid. A yoke-actuating lever 212 has an end fitted into the slot of the plunger and connected to it by a pivot pin 213 (FIGURE 27). The opposite end portion of the lever is attached as at 214 to the yoke 200. The yoke is pivotally supported by opposed shoulder screws 215 threaded through the flanges 216—216 of wall 207, the screws having endwise portions pivotally passing through the limbs of the yoke. It will be noted in FIGURE 27 that the screws 215 are located upon a common axis below the axis of the yoke pins 198 such that the yoke pins swing in an arc to shift the clutch spool along the drive shaft.

The normal position of the parts, with the solenoid deenergized, is shown in full lines in FIGURE 27, the solenoid plunger being biased by spring 211 to its extended position to swing lever 212 and yoke 200 to clutch engaging position. The parts swing to the position shown in broken lines in FIGURE 27 with the spring compressed, when the solenoid is energized. The above described structure is identical for the six clutches of the drive shaft.

The dial driving mechanism includes a reversing gear 217 which is pinned as at 218 to shaft 164 (FIGURE 21). The purpose of this gear is to rotate the setting gear 108 and ten-inch dial 78 back to a zero position at the start of the selecting cycle, thereby to lower the ten-inch measuring rods.

The reversing gear 217 is driven by a pinion 220 rotatably mounted on drive shaft 175 and controlled by a reversing clutch 221. The reversing clutch is identical to the structure described above except that the relationship of the parts is reversed. The reversing clutch is actuated by a reversing yoke 222 which shifts the clutch collar toward the left (as viewed in FIGURE 22) to an engaged position and toward the right to a disengaged position. The reversing yoke is actuated by a reversing solenoid previously indicated at 178 having a spring loaded plunger as described earlier. To reverse the direction of clutch motion, the plunger of the reversing solenoid is pivotally connected to a lever 223 having its outer end pivotally connected to a screw 224 attached to flange 216. The yoke is pivotally mounted by shoulder screws 215 as described above, and a yoke lever 225 is attached to the yoke at the axis of the shoulder screws. The yoke lever has an end portion 226 bent to reside parallel with lever 223. A pin 227 projecting from lever 223 pivotally connects the two levers. Accordingly, when the reversing solenoid is energized, its plunger swings lever 223 downwardly and this motion swings the yoke lever and yoke in a direction to shift the reversing clutch spool toward the right (away from pinion 220) to uncouple the reversing pinion 220 from drive shaft 175.

It will be understood at this point, that the ten-inch dial is rotatable only to the extent permitted by its cams 92; consequently, it is rotated back to zero at the start of a measurement selection cycle. In order to provide the reverse rotation of the setting gear 163 and ten-inch dial, the reversing pinion 220 meshes with a reverse idler gear 228 which is loosely journalled on a stub shaft 230 mounted in the end wall 166 of the housing (FIGURE 11). The reverse idler in turn meshes with the gear 217 which is pinned to the shaft 164, noted earlier. Accordingly, when the reversing clutch 221 is engaged, the reversing gears are driven in the direction shown by the reverse arrows (broken lines) in FIGURE 11, thereby rotating the driven shaft 164 and the setting gear 163, which is keyed to the shaft, in a reverse direction. Since the remaining five setting gears 157 to 162 are loosely journalled on the shaft 164, they remain stationary during the reversing cycle. The forward direction (dial setting) is shown in full line arrows in FIGURE 11.

The six setting gears 157 to 163 establish electrical circuits which energize their solenoids and cause the clutches to be disengaged after the gears have rotated their preselected positions as explained in detail later. The setting gears 157 to 163 are formed of a dielectric material, such as fiber composition. Mounted adjacent each gear is a stationary electrical contact ring 231, also formed of dielectric material and having contact buttons 232 corresponding in number to the digits on the dials (FIGURE 26). In other words, the contact rings of the five setting gears 157 to 162, which drive the one-inch dial and four decimal dials, each carry ten contact buttons corresponding to the digits zero to nine. The contact ring for the gear 163, which drives the ten-inch dial, is provided with five contact buttons corresponding to the digits zero to four.

The individual buttons of each contact ring are energized by the memory device of the programming apparatus in accordance with the selected position to which the dial is to be rotated, one button of each ring being energized during the selecting cycle, as described later. Each setting gear is provided with slip ring 233 formed of metal and each gear is provided with a brush or wiper 234 in wiping contact with the slip ring and having a portion traversing the contact buttons during rotation of the setting gears, as explained later in detail with reference to the control circuit. The arrangement is such that the gear rotates during the selecting cycle until the wiper reaches that contact which is energized, at which point an electrical circuit is completed to the solenoid which is associated with that gear. Upon being energized, the solenoid disengages the clutch, causing that particular gear and its dial to come to rest at the preselected position. This establishes the setting of that dial, and in a similar manner, the setting of all of the other dials individually.

Described in detail with reference to FIGURES 21 and 26, the hub of each setting gear is counter-turned as at 235 to receive the slip ring 233, which may be pressed or otherwise attached to the gear. A washer 236 is slipped upon the counter-turned hub and confines the contact ring in position, the washer being locked on by a snap ring 237. The contact buttons 232 are in the form of rivets passing through the contact ring 231 and engaging a terminal 238 to which the electrical lead wires 240 are attached. The brush or wiper 234 is formed of flexible sheet metal and is generally U-shaped as viewed in FIGURE 26 providing one limb 241 which serially engages the contact buttons and a second limb 242 which is in wiping engagement with the slip ring 233. The wiper 234 is attached to the gear by a pair of rivets 243. An electrical lead wire 244 is connected as at 245 to the slip ring, such that a circuit is established by way of the wiper between the slip ring and the selected contact button. The construction of the contact rings is identical for all the setting gears except that the ring which controls the ten-inch dial is provided with five contact buttons, as noted above.

In order to locate the contact buttons accurately in registry with the corresponding dial graduations, each ring is mounted for rotary movement with respect to the counter-turned gear hub 235 upon which it is journalled. For this purpose, a pair of threaded rods 246—246 extend lengthwise between the intermediate wall 167 and end wall 166 of the selector housing, the rods passing through respective arcuate slots 247—247 formed in the extended portions 248 of the contact rings. Each rod is provided with pair of nuts 250 which exert a clamping action against opposite sides of the dial ring portion 248.

Driven shaft 164 is provided with a detent disk 251 (FIGURE 25) secured by a set screw 252 and including a detent notch 253. A directional control switch 254 is mounted in stationary position upon intermediate wall 167 and its plunger is actuated by a yieldable arm 255 attached to the switch, the outer end of the arm having a roller 256 tracked against the disk. When the selecting cycle is initiated, the reversing clutch and gear train cause rotation of detent disk 251 in the direction indicated by the broken line in FIGURE 25. If the ten inch dial 78 is set at some graduation other than zero at this point, the reverse rotation drives the dial to its zero position (as in FIGURE 25) thereby to lower the ten-inch rods. As the notch 253 passes beneath the roller, the directional control switch is tripped momentarily, causing the reversing clutch to be disengaged, as explained later with respect to the electrical circuit. It will be understood at this point, that the relationship of the notch 253 and roller 256 represents the zero position of the dial. The momentum of rotating parts causes the notch to be advanced slightly beyond the roller at final position as indicated.

SPINDLE SPEED AND FEED CONTROL

The spindle of the present jig borer is of a generally conventional type and is shown in FIGURES 1 and 50. The spindle is mounted in a quill (not shown) and is adapted to be rotated by means of a spindle drive motor 260. As is diagrammatically shown in FIGURE 50, spindle drive motor 260 is connected to the input shaft of a spindle speed clutch transmission 261. The output shaft of this clutch transmission unit is in turn connected through suitable gearing to the spindle and is effective to impart a rotary movement thereto.

The details of the spindle speed clutch constitute no part of the present invention. In general, however, such a clutch comprises an input shaft, an output shaft, and one or more counter shafts. These shafts are adapted to be interconnected in several different ways through a series of gears and electrically responsive magnetic clutches. Consequently, the output shaft can be selectively rotated at any one of a desired number of speeds in accordance with the electrical signals applied to the magnetic speed transmission clutches. Suitable magnetic clutches, for use in transmissions of this type, are produced by I-T-E Circuit Breaker Company and are identified as their type EK and EKD electro clutches.

The same spindle drive motor is also effective to power feed the quill and spindle vertically relative to the workpiece. For this purpose, spindle drive motor 260 is mechanically interconnected with a spindle feed clutch transmission indicated at 262 in FIGURE 50. The spindle feed clutch transmission 262 is interconnected through a conventional gear drive (not shown) including a worm wheel, a meshing pinion and a rack pinion which is mounted for rotation in the head. This rack pinion is effective to drive rack teeth formed in the quill in a conventional manner.

Spindle feed clutch transmission unit 262 is similar to the spindle speed clutch transmission unit 261. That is, unit 262 comprises an input shaft, an output shaft, and one or more counter shafts carrying a plurality of cooperating gears. These gears are adapted to be brought into selective engagement to rotate the output shaft at a selected speed by means of a plurality of electric clutches, such as those referred to above.

Thus, when the output shaft of the speed feed clutch transmission unit is rotated it in turn drives the pinion and rack to shift the quill in a vertical direction relative to the workpiece. The quill is fed relative to the head of the jig boring machine at the selected feed rate and in turn carries the rotating spindle and tool.

In addition to the above described mechanism, the spindle feed includes a rapid traverse motor which is effective to raise and lower the spindle at a rapid rate whenever the tool is disengaged from the work. This rapid traverse motor constitutes no part of the present invention and the details of its interconnection with the quill are not shown.

GENERAL DESCRIPTION OF PROGRAMMING APPARATUS

As is best shown in FIGURES 1, 2, and 30, the main components of the present programming and control apparatus comprise a tape reader 264, a data storage device 265, which are mounted together in a unit identified by the numeral 9 in FIGURE 1, and a main control circuit 39 mounted in main control panel 8. Essentially, the tape reader is adapted to read, or sense, the perforations in a tape 266 upon which is stored in coded form the directions for each machine operation. Tape reader 264 decodes this information and provides electrical signals which are sent to a parity check circuit 267. The function of this latter circuit is to make certain that the tape reader has obtained a proper signal from the punched tape. The tape reader also provides signals to a memory check circuit 268 and sequence stepping switch 270 and to a cross bar memory unit 271. The memory check circuit and sequence stepping switch function to clear the cross bar memory unit of previously stored information and then to control the loading of data from the tape reader into the cross bar switches.

The output signals from the cross bar memory switches are in turn fed to operation number storage unit 272, to a table drive unit 25, a saddle drive unit 27, and main control circuit 39. The main control circuit is in turn in circuit controlling relationship with the motors of the jig borer which shift the table and saddle and rotate and drive the spindle.

As was indicated above, the present control system is adapted to automatically control table and saddle positioning, rate of spindle feed, and rate of spindle rotation. The present invention is not, however, limited to the control of these functions but could, if desired, be applied to such additional functions as automatic tool changes, and the like.

At this point, it is considered helpful to consider the data required for a typical machine positioning operation and the manner in which such data is stored on punched tape 266. FIGURE 28 shows, by way of example, a typical workpiece 273 adapted to be automatically machined on a jig borer controlled by means of the apparatus of the present invention. As shown in FIGURE 28 and the accompanying "Operation Chart", the workpiece is to have three holes bored in it. The centers of these holes are located from an arbitrary reference point at the upper left hand corner of the workpiece, the workpiece being oriented so that the workpiece table is shifted in accordance with the horizontal dimension of the hole and the saddle is shifted in accordance with the vertical dimension of the hole. Each hole is to be first drilled and then reamed so that altogether six operations are required to machine the workpiece 273.

The instructions and directions for performing a machining operation includes positional information for the table and saddle positions, and a code for indicating the rate of spindle speed and rate of spindle feed. Additionally, a signal is given if the operator is to change tools for the operation; and finally, each operation is sequentially numbered from 0 to 999. Part of the information coded for each operation is this operation number which, as explained below, appears on the panel of unit 9 so that the operator can tell what operation the machine is performing, a fact which would not readily be intelligible directly from the punched tape.

The present system of coding requires twenty-four bits of information to record a complete set of directions for an operation. These bits of information are stored on an eight channel punched tape which can be punched on any suitable punching mechanism, for example, a Commercial Controls Flexowriter Model FTC 8. The numerals are stored in the tape in binary form with a "parity check" hole being used in conjunction with any number having an even number of bits.

A length of tape punched with the information for carrying out operation No. 4 is shown in FIGURE 29. As is indicated above the tape, the right hand column of holes represents "1"; the next column, "2"; the third column, "4"; the fourth column, "8"; the fifth column, "CH" (parity check); the sixth column, "O"; the seventh column, "X"; and the eighth column, "EL".

The operation number is preceded by an indicator letter "a" while the table information is preceded by an indicator letter "b", and the saddle information is preceded by an indicator letter "c". In a similar manner, the spindle speed and feed information is preceded by an indicator letter "d". Three additional symbols are used as follows: "h" indicates the completion of information, a "comma" signals a necessary change of tools, and an "EL" causes the tape to feed automatically to the next code. The complete coding of the tape for each of the twenty-four bits, is as follows:

(1) "A" indicates beginning of operation number
(2) 100 digit—any number 0 thru 9
(3) 10 digit—any number 0 thru 9
(4) 1 digit—any number 0 thru 9
(5) "B" indicates beginning of table information
(6) 10.0—must not exceed numeral 4 (49 inch limit)
(7) 1.0—any number 0 thru 9
(8) 0.1—any number 0 thru 9
(9) 0.01—any number 0 thru 9
(10) 0.001—any number 0 thru 9
(11) 0.0001—any number 0 thru 9
(12) "C" indicates beginning of saddle information
(13) 10.0—must not exceed numeral 2 (23 inch limit)
(14) 1.0—any number 0 thru 9 (must not exceed 3 inches if above code is 20 inches)
(15) 0.1—any number 0 thru 9
(16) 0.01—any number 0 thru 9
(17) 0.001—any number 0 thru 9
(18) 0.0001—any number 0 thru 9
(19) "D" indicates beginning of speed and feed information
(20) Speed code—using numerals as follows (code 21 determines low or high range)

| | R.p.m. | | R.p.m. |
|---|---|---|---|
| 1 | 30 or 60 | 5 | 180 or 360 |
| 2 | 45 or 90 | 6 | 225 or 460 |
| 3 | 120 or 240 | 7 | 600 or 1200 |
| 4 | 150 or 295 | 8 | 900 or 1800 |

(21) Speed code—"0" low speed, "9" high speed
(22) Feed code—using numerals as follows

| 1 | .0005 | 5 | .0028 |
|---|---|---|---|
| 2 | .0008 | 6 | .0040 |
| 3 | .0012 | 7 | .0070 |
| 4 | .0019 | 8 | .0100 |

(23) Change tool signal ","
(24) "H" indicates completion of information

The holes punched for the individual letters and numbers is as follows:

| Numeral: | Holes in channel |
|---|---|
| 0 | "O." |
| 1 | "1." |
| 2 | "2." |
| 3 | "1", "2", and "CH." |
| 4 | "4." |
| 5 | "1", "4", and "CH." |
| 6 | "2", "4", and "CH." |
| 7 | "1", "2", and "4." |
| 8 | "8." |
| 9 | "1", "8", and "CH." |

| Letters: | |
|---|---|
| A | "X", "O", and "1." |
| B | "X", "O", and "2." |
| C | "X", "O", "CH", "2", and "1." |
| D | "X", "O", and "4." |
| H | "X", "O", and "8." |

The tape in FIGURE 29 is punched to provide the data for operation No. 4 shown in the operation chart above the table. It is to be understood that the tape is to be fed in a downward direction through the reader; and that the reader has eight transversely aligned contact pins adapted to complete circuits in accordance with the punched openings on the tape. It will be noted that the first piece of information to be recorded for an operation is the operation number, in this case 004. Consequently, the lowermost row of openings corresponds to the letter "a" which always precedes the operation, in this case number 4. Next there appears the letter "b" indicating that the subsequent information relates to the table position. Letter b is in turn followed by the digits "0" (indicating no tens of digits), 87414 giving to one-ten-thousandth of an inch the distance the table must be shifted to position the center line of hole 274. The tape next contains a letter "c" which indicates that the digits following relate to the saddle position. Following the letter "c" are the digits 030000 which indicate that the saddle must be shifted 3.0000 inches to complete the positioning of the center line of hole 274 relative to the spindle. After the saddle information, a letter "d" appears, the letter "d" indicating that the next numbers represent the core for the spindle speed and feed. The spindle speed and feed code numbers for this operation are 595 which indicate that the spindle speed is to be 360 r.p.m. and the spindle feed is to be .0028 inch per rotation of the spindle. After the spindle speed and feed code, the tape contains a comma, which operates a signal telling the operator that a tool change must be made. Finally, the tape contains an "h" which indicates that all of the information regarding that operation has been completed.

It is to be noted that whenever no change is to be made in a function of a machine; for example, the table or saddle position or the spindle speed and feed, all information regarding the unchanged function is eliminated from the data punched on the tape for the operation. Thus, by way of example, in operation No. 5 there is to be no change in the saddle position or in the speed and feed code. Consequently, the tape for operation No. 5 includes only an "a" followed by the operation number 005, a "b" followed by the table information 157414, and an "h" indicating the completion of information for the operation. It is also to be understood that the data for each operation can be punched on the tape in any order. Thus, the speed and feed code could be punched before the table information so long as the information for each function is preceded by its correct identifying letter; i.e., "d" for spindle speed and feed, and "b" for table positioning.

In accordance with the present invention, the tape reader reads the punched data for an operation, decodes this data, and provides signals to the data storage unit which stores those instructions while the machine is performing the preceding operation. The tape can be read and the complete information for an operation stored in a matter of a few seconds, while the machine operation may require upwards of a minute to complete. Thus, when the machine has completed a given operation, the reader and memory storage unit already has decoded and stored the instructions for the machine's next operation. These instructions are fed from the storage unit to the machine at the beginning of the operating cycle; and while the machine is performing the operation in accordance with the information so stored, the tape reader reads the information for the following operation and provides signals for storing that information in the storage unit. Consequently, in the present system, there is no time lost in reading the tape and decoding the data punched thereon.

Each of the components of the reading and data storage unit and certain cooperating elements of the main control circuit are described in detail below under separate headings.

TAPE READER

As explained above, the information for controlling the machine tool is stored on a punched tape. This tape is read by tape reader 264; more particularly, as is best shown in FIGURES 1 and 2, the tape reader 264 is mounted in cabinet 9, the cabinet preferably being provided with a compartment 275 for housing the reader and providing a storage space for the tape. This compartment is preferably enclosed by means of a transparent hinged cover 276.

Tape reader 264 can be of any suitable type for sensing perforations in punched tape. For example, one suitable form of reader is manufactured by Commercial Controls Corporation in general accordance with the disclosure of Blodgett Patent No. 2,700,446. While the precise details of this reader constitute no part of the present invention, its general construction will be briefly described.

As indicated above, the tape finger includes eight sensing fingers (not shown) which are disposed transversely of tape 266. Each of the fingers is adapted to engage the openings in one row, or channel, of the tape. Also, each pin or channel controls the opening and closing of one or more electrical contacts. The tape is fed through the reader by a suitable tape advancing mechanism including a motor 277 and a one-half revolution clutch, the coil of which is indicated at 278 in FIGURE 32. The reader also includes a conventional "read" switch 280, cam operated contacts 281, 282, 283, 284 and 285, normally closed "tape tight" switch 286 and normally closed "no tape" switch 287.

Figure 32:
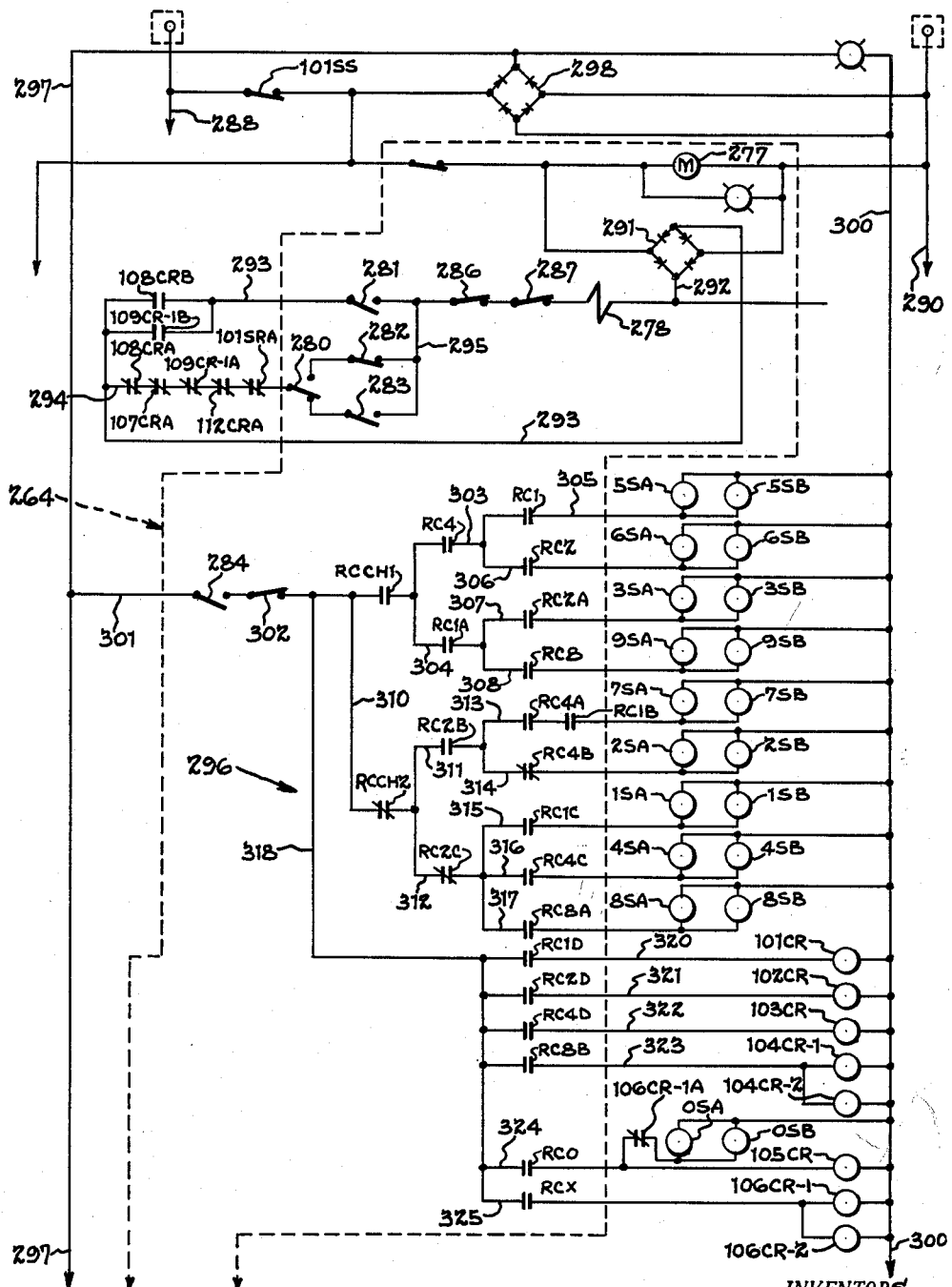

Power is supplied to the reader motor from line 288 through memory power switch 101SS, and through line 290 (FIGURE 32).

A rectifier 291 is also connected between lines 288 and 290. One output terminal of this rectifier is connected to one side of clutch coil 278 through lead 292 while the other side of the rectifier is connected to the opposite side through lead 293 and two parallel switching circuits. The first of these parallel circuits includes lead 294 and series connected normally closed contacts 108CRA, 107CRA, 109CR–1A, 112CRA, and 101SRA. (It is to be understood that all relay contacts will be identified by using the designation of the relay coil followed by a letter to identify which contact of the relay is being referred to. Thus, normally closed contact 108CRA is a contact actuated by relay coil 108CR. A table of all relays and their associated contacts is appended to the specification.)

Lead 294 is connected to double throw "read" switch 280. This switch is provided with two output terminals which are connected in parallel through cam operated contacts 282 and 283 and lead 295. Lead 295 is returned to the opposite side of clutch solenoid 278 from lead 292 through switches 286 and 287. Lead 293 is also connected to clutch coil 278 through contact 108CRB which is shunted by a contact 109CR–1B and is in series switch contacts 281, 286 and 287.

The contacts of the tape reader are connected to form a decoding circuit indicated generally at 296. This circuit is effective to decode the digits which are stored in the tape as binary bits to a single digit of the decimal system.

In the reader (FIGURE 32) contacts RC1, RC1A, RC1B, RC1C and RC1D are actuated by the pin in registry with the first, or "1," channel of the tape. Reader contacts RC2, RC2A, RC2B, RC2C and RC2D are actuated by the pin in registry with the second, or "2," channel in the tape. Contacts RC4, RC4A, RC4B, RC4C and RC4D are actuated by the pin in registry with the third, or "4," channel of the tape. Contacts RC8, RC8A and RC8B are actuated by the pin in registry with the fourth or "8" channel of the tape. Similarly, contacts RCCH, RCCH1, RCCH2 and RCCH3, contact RCO are respectively controlled by the pin in registry with the fifth or, "H" and sixth, or "O," channels of the tape. Finally, the RCX contact and RCEL contact are respectively actuated by pins in registry with the seventh, or "X," channel of the tape and the eighth, or "EL," channel of the tape.

DECODING AND PARITY CHECK CIRCUITS

The reader contacts (FIGURE 32) of the decoding portion of the circuit are energized from lead 297. This lead is in turn connected to one side of a rectifier 298, the other side of the rectifier being connected to line 300. The decoding circuit is connected to lead 297 through lead 301, contact 284 of the cam operated reader switch, and switch 302. Lead 301 is connected through contact RCCH1 to two parallel leads 303 and 304, these leads respectively containing contacts RC4 and RC1A. Lead 303 branches into two parallel output leads; i.e., lead 305 containing contact RC1 and lead 306 containing contact RC2. In a similar manner, lead 304 branches into two parallel output leads 307 and 308 which respectively contain contacts RC2A and RC8.

It will readily be appreciated that output lead 305 is energized when a "5" is sensed by the reader contacts. For when a "5" is punched in the tape, contact RC1 is closed by the reader pin in engagement with the "1" hole, contact RC4 is closed by the pin in registry with the "4" hole, and contact RCCH1 is closed by the pin in the ch hole in the tape. In a similar manner, output lines 306, 307, and 308 are energized when the tape is punched to represent a "6" (4, 5, and ch), a "3" (1, 2, and ch), a "9" (1,8, and ch). Another conductor 310 is joined to lead 301 and contains normally closed contact RCCH2. Conductor 310 branches into two conductors 311 and 312, these latter conductors respectively containing contacts RC2B and RC2C. Conductor 311 is in turn connected to two output leads 313 and 314. Output lead 313 contains series connected contacts RC4A and RC1B, while output lead 314 contains normally closed contact RC4B. In a similar manner, conductor 312 is connected to output leads 315, 316, and 317. Output lead 315 contains contact RC1C, while output lead 316 contains RC4C and output lead 317 contains output lead RC8A.

Output lead 313 is energized when a "7" (1, 2, 4) is punched in the tape while output lead 314 is energized when a "2" is punched in the tape. In a similar manner, output lead 315 is energized when a "1" is punched in the tape, output lead 316 is energized when a "4" is punched in the tape, and output lead 317 is energized when an "8" is punched in the tape. This decoding circuit is thus effective to convert the coded binary information stored in the tape to signals representative of decimal numbers.

The tape reader also is provided with several output leads to parity check circuit 267. More particularly, a conductor 318 is connected to lead 301 and to a series of parallel output lines 320, 321, 322, 323, 324, and 325. Output line 320 contains contact RC1D and consequently is energized when a "1" is read by the tape. Lead 321 contains contact RC2D and is energized when a "2" is read and output lead 322 contains contact RC4D and is energized when a "4" is read. In a similar manner, output leads 323, 324, and 325 respectively contain contacts RC8B, RCO, and RCX. These leads are thus respectively energized when an "8," "O," or "X" are read by the tape reader.

Output lead 320 is connected to the coil of relay 101CR, the other side of this relay being connected to power line 300. In a similar manner, output leads 321, 322, and 323 are respectively connected to the coils of relays 102CR, 103CR, 104CR-1, and 104CR-2. Output line 324 is connected to the coil of relay 105CR. This line is also connected, as explained in greater detail below, through the normally closed contact 106CR-1A (of relay 106CR-1) to zero select magnets 0SA and 0SB of cross bar switches 326 and 327. Output lead 325 is connected to the coils of relays 106CR-1 and 106CR-2.

Figure 33:
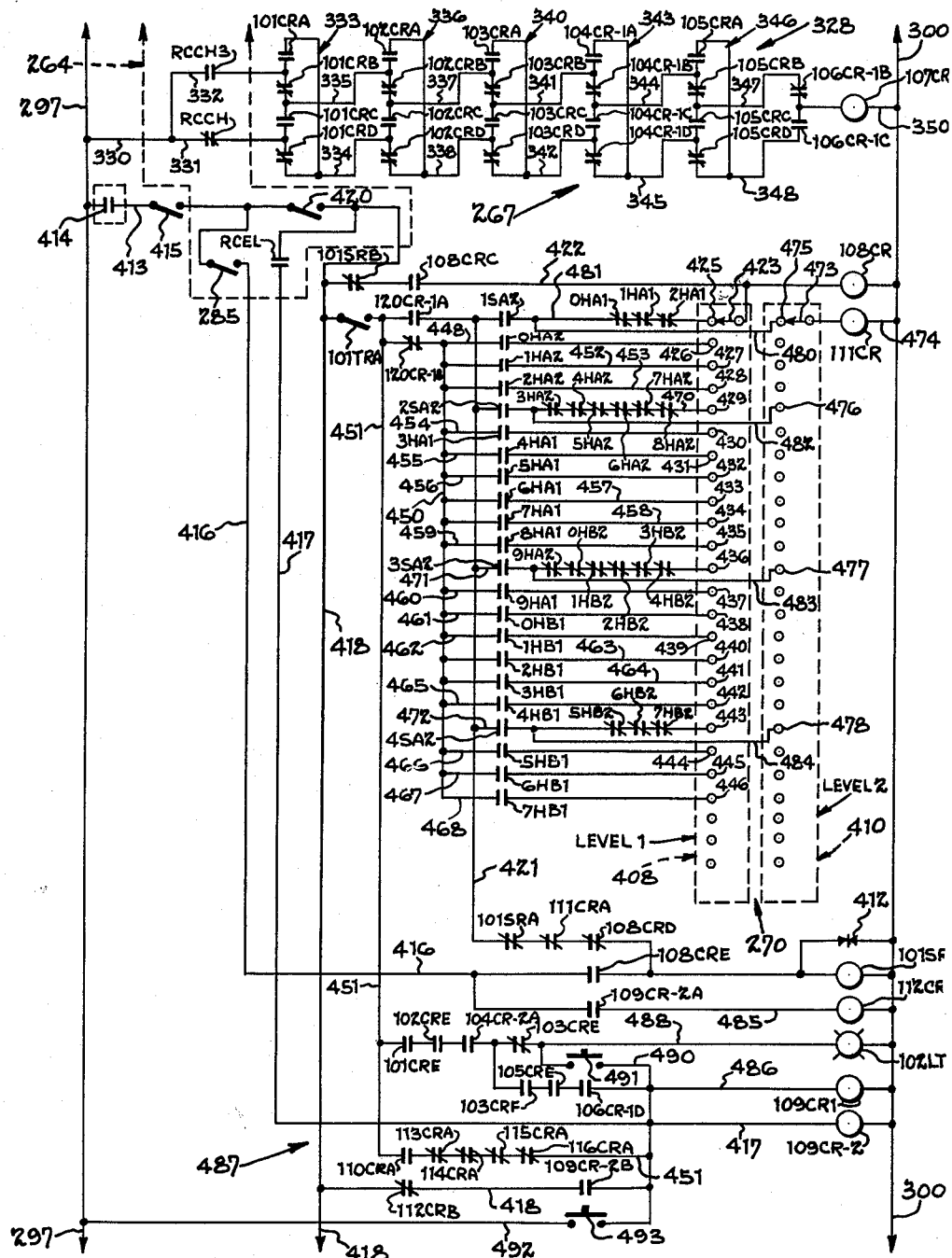

Parity check circuit 267 further includes a relay network indicated generally at 328 (FIGURE 33). This relay network is energized through a lead 330 connected to conductor 297. Lead 330 has two parallel branches 331 and 332 respectively containing normally closed contact RCCH and RCCH3. These two leads are connected to a loop 333 containing series connected contacts 101CRA, 101CRB, 101CRC, and 101CRD. One lead 334 from loop 333 is taken between the contacts 101CRA and 101CRD; a second lead 335 is taken from this loop between the contacts 101CRB and 101CRC. Leads 334 and 335 are in turn connected to a loop 336.

This loop 336 contains series connected contacts 102CRA, 102CRB, 102CRC, and 102CRD of relay 102CR. Two output leads are taken from loop 336, one lead 337 being connected between the contacts 102CRB and 102CRC, while a second output 338 is taken between the contacts 102CRA and 102CRD.

These output leads are connected to a loop 340 which contains series connected contacts 103CRA, 103CRB, 103CRC, and 103CRD of relay 103CR. Two output leads 341 and 342 are taken from loop 340 between the contacts 103CRB and contacts 103CRC and between the contacts 103CRA and 103CRD respectively. Leads 341 and 342 are connected to a fourth loop 343 containing series connected contacts 104CR-1A, 104CR-1B, 104CR-1C, and 104CR-1D of relay 104CR-1. Loop 343 is connected to two output leads 344 and 345 which interconnect loop 343 with a loop 346.

Loop 346 contains series connected contacts 105CRA, 105CRB, 105CRC, 105CRD of relay 105CR. Two output leads 347 and 348 are taken from this loop and are connected together through normally closed contact 106CR-1B and normally open contact 106CR-1C of relay 106CR-1. An output lead 350 is connected between these contacts and to the coil of parity check relay 107CR, the opposite end of the coil being connected to lead 300.

The parity check circuit functions so that parity check relay coil 107CR is energized only in response to the sensing of an odd number of holes. Thus, the parity check relay is closed in response to the sensing of holes in channels 1, 2, and 4 representing the number 7. However, the parity check relay is not energized in response to the sensing of holes in channels 2 and 4, representing 6, unless an opening is also sensed in the parity check channel CH.

Output leads 305, 306, 307, 308, 313, 314, 315, 316, and 317 are respectively connected to the select magnets 5SA and 5SB, 6SA and 6SB, 3SA and 3SB, 9SA and 9SB, 7SA and 7SB, 2SA and 2SB, 1SA and 1SB, 4SA and 4SB, 8SA and 8SB of cross bar switches 326 and 327. The function of these magnets and of the cross bar switches is explained below.

CROSS BAR SWITCHES

As has been indicated above, the numerical data read and decoded by tape reader 264 is fed to cross bar switches 326 and 327. It will be understood at this point, however, that while in the present unit two cross bar switches are employed, it is contemplated that a greater or lesser number can be utilized depending upon the number and complexity of the machine functions being controlled and the specific construction of the cross bar switches.

It is also to be understood that the particular mechanical construction of the cross bar switches is not an essential part of the present invention and while we have found that cross bar switches manufactured by North Electric Company, of the type known as RBD100-109 are particularly advantageous, it is definitely to be understood that other cross bar switches produced by other manufacturers can be employed without departing from the scope of the present invention.

The details of mechanical construction of one suitable form of cross bar switch are shown in FIGURES 46 and 47. The schematic circuit diagrams of the two switches are shown in FIGURES 44 and 45. It is to be understood that FIGURES 44 and 45 illustrate the manner in which the various magnets and contacts of the cross bar switches are grouped together for cooperative operation. However, these same contacts and magnets are duplicated in other diagrams in order to clarify their relationship with other components of the control system.

The mechanical construction of cross bar switch 326 will now be described in detail. This cross bar switch is identical with cross bar switch 327 and in a preferred embodiment is physically mounted above cross bar switch 326 in unit 9 as shown in FIGURES 1 and 2. In the following disclosure, the hold and select magnets of cross bar switch 326 will be distinguished from the hold and select magnets of cross bar switch 327 by the use of the letter "A" associated with the magnets of cross bar switch 326 and the use of the letter "B" associated with the corresponding magnets of cross bar switch 327.

As shown in FIGURES 46 and 47, in general cross bar switch 326 comprises a welded steel frame 352 which supports ten vertical groups of contacts. The contacts of each group, or vertical unit, are disposed in ten horizontal rows. A horizontal row or set of contacts of the cross bar unit contains eight or ten contacts. Each vertical unit also contains a plurality of fixed vertical strips of contact material, each strip being common to a vertical row of ten contacts for making electrical connections within the switch.

More particularly, ten vertical contact units 353, 354, 355, 356, 357, 358, 359, 360, 361, and 362 are mounted side-by-side in switch frame 352. Each vertical unit is equipped with a vertical hold bar 364–373. Each of the vertical hold bars is associated with and is adapted to be actuated by a vertical magnet, these magnets being respectively designated as 1HA, 2HA, 3HA, 4HA, 5HA, 6HA, 7HA, 8HA, and 9HA. It is to be understood that the vertical hold bar does not touch the contact sets either when the bar is in its actuated or when it is in its normal position.

On the front of the cross bar switch are five horizontal selection bars 375, 376, 377, 378, and 379. Each of these bars is located between adjacent horizontal sets of contacts. Each selection bar carries ten spaced spring fingers, each of the spring fingers being adapted for cooperation with one set of vertical contacts. Each of the horizontal selection bars 375–379 is pivotally mounted and carries adjacent to one end two transverse armatures 381. These armatures cooperate with associated select magnets in such a manner that when its associated select magnet is energized, a transverse armature is attracted to this magnet causing limited rotation of the horizontal select bar. Two select magnets are associated with each selection bar, one of the magnets being mounted slightly above the bar and one of the magnets being mounted slightly below the bar. Thus there are in all ten select magnets 0SA, 1SA, 2SA, 3SA, 4SA, 5SA, 6SA, 7SA, 8SA, and 9SA.

In addition to the vertical contact units, each cross bar switch includes a plurality of contacts directly associated with each hold magnet 0HA–9HA and a second plurality of contacts associated with each select magnet 0SA–9SA. These contacts are referred to a "off-normal" contacts and are indicated at 382 in FIGURE 46.

The details of construction of the cross bar switch can best be understood from a study of FIGURES 46 and 47. FIGURE 47 is a skeleton view of one end of cross bar switch 326. This skeleton view shows the uppermost six horizontal rows of contacts of vertical contact unit 362 associated with vertical hold bar 373 and hold magnet 9HA. The view also shows select magnets 0SA, 1SA, 4SA, and 5SA as well as select bars 375 and 377. It is to be understood that select bar 376 has been omitted from this view for purposes of clarity. Vertical contact unit 362 comprises a plurality of contact springs 383. Each contact spring carries twin contacts preferably formed of silver or the like. The contact springs are grouped into ten sets. The sets are vertically spaced from one another and each set comprises eight or ten contacts. As is best shown in FIGURE 48, each of the springs 383 of the top set is mechanically joined to the other springs of the set by means of an operating comb formed of non-conducting material. Consequently, the springs are shifted simultaneously when the comb is actuated. The operating comb 384 is controlled by an operating spring 385. This operating spring 385 for the top set of contacts is an elongated member having one end mounted adjacent to the rear part of the cross bar switch and having a forwardly extending free end. The free end of the operating spring is provided with a U-shaped channel 386. This U-shaped channel is adapted to receive a holding strip 387 carried by vertical hold bar 373.

Each of the other sets of contacts is constructed in a similar manner. Thus the second horizontal row of contacts are mechanically interconnected by a comb which is actuated by a second operating spring 388 mounted beneath operating spring 385. When horizontal bar 375 is in its neutral position (to which it is normally spring urged), finger 390 carried by the selection bar 375 is disposed between the U-shaped channels of operating springs 385 and 388. This is more clearly illustrated by the manner in which finger 391 of selection bar 377 (which is shown in its neutral position in FIGURE 47) is disposed between the U-shaped ends of operating springs 392 and 393. However, when one of the select magnets, such as 0SA, is energized, the select bar is pivoted through a select magnet so that its spring fingers 390, extend across the U-shaped openings of all of the operating springs (such as springs 385 in a horizontal row).

Hold bar 373 is pivotally mounted so that it rotates through a small arc when hold magnet 9HA is energized. When this hold magnet is energized and hold bar 373 rotates, hold strip 387 is shifted and enters the U-shaped channels of the operating springs. So long as the operating fingers 391 are disposed between the adjacent sets of operating springs, the hold strip enters the U-shaped channels of the springs and does not shift the operating springs or combs and does not effect closure of the associated contacts. However, when a finger, such as finger 390, is shifted across the U-shaped channel opening of an operating spring, such as spring 385, the finger is wedged across the channel by the hold strip and since there is no clearance for the hold strip, the hold strip shifts the operating spring (to the right in FIGURE 47) closing all the contacts of the horizontal set. When the contact springs are shifted, they make contact with the stationary contact strips 394 which are interleaved between the contact springs and are normally spaced from the spring contacts.

It is to be understood that cross bar switch 327 is identical in construction with cross bar switch 326. More particularly, cross bar switch 327 comprises ten vertical hold magnets 0HB, 1HB, 2HB, 3HB, 4HB, 5HB, 6HB, 7HB, 8HB, and 9HB. Each of these hold magnets operates a hold bar, the hold bars being respectively associated with ten vertical contact units 396, 397, 398, 399, 400, 401, 402, 403, 404, and 405. Cross bar switch 327 is also provided with ten select magnets effective to operate horizontal selection bars. These select magnets are identified as 0SB, 1SB, 2SB, 3SB, 4SB, 5SB, 6SB, 7SB, 8SB, and 9SB. These select magnets and the five selection bars associated therewith cooperate with the hold bars and hold magnets in exactly the same manner as in cross bar switch 326, explained in detail above. In addition to the vertical contact units, cross bar switch 327 is provided with a plurality of off-normal contacts number 407, one group of off-normal contacts being associated with each hold magnet and with each select magnet.

It can thus be appreciated that for each cross bar switch, there are one hundred sets of contacts, each set of contacts being in effect disposed at the juncture of a vertical hold bar and a horizontal select bar and being adapted for closure by the cooperating actuation of the vertical hold bar and horizontal select bar at whose intersection the contacts are disposed. It will further be appreciated that the sets of contacts in each cross bar switch are disposed in ten vertical rows, each of the vertical rows comprising ten horizontal sets of contacts.

In accordance with the present invention, each vertical contact unit is utilized to represent one of the digits; i.e., the first digit of the table position, required for directing the machine to perform a given operation and the particular horizontal set of contacts of the vertical set which are closed determines which of the ten possible digits, 0–9, is stored.

More particularly, with reference to the description of FIGURES 28 and 29, the operation chart and tape check read-out chart shown in conjunction with those figures, it will be appreciated that 18 digits are required in the instructions for one operation of the disclosed jig borer. The first three digits represent the operation number (004 in the example disclosed). The next six digits represents the table position (087414 in the example), the next six digits represent the saddle position (030000 in the example); and the final three digits represent the spindle speed and feed code.

In accordance with this invention, vertical contact unit 353 is used to store the first digit of the operation number, vertical contact unit 354 is employed to store the second digit of the operation number, and vertical contact unit 355 is used to store the third digit of the operation number. The top set of horizontal contacts in each of these vertical contact units (and in all of the other vertical contact units as well) represents the digit "0." The next lower set of contacts represents the digit "1," the third set of contacts represents the digit "2," and so forth, so that the bottom set of contacts represents the digit 9. Thus, the operation number "004" would be stored in cross bar switch 326 by the actuation of the top row of contacts (0) in contact unit 353, the top row of contacts (0) in vertical contact unit 354, and the fifth row of contacts (4) in vertical contact unit 355.

In a similar manner, the six digits of the table position are respectively stored in vertical contact units 356, 357, 358, 359, 360, and 361. The six digits of the saddle position are stored in vertical contact units 362, 396, 397, 398, 399, and 400. Finally, the three digits of the speed and feed code are respectively stored in vertical contact unit 401, 402, and 403. In the present embodiment, vertical contact units 404 and 405 are not utilized, but it is to be understood that these vertical contact units or even additional vertical contact units of another cross bar switch could be used to store additional information in the event that a machine tool is to be more extensively programmed than the jig borer described herein.

It is believed that a brief description of the manner in which the uppermost set of contacts of vertical unit 362 (corresponding to 0 in the first digit of the saddle position) are actuated will help to clarify the description of the mechanical construction of the cross bar switches. The first occurrence in the closing of these contacts is the energization of select magnet 0SO. This magnet attracts the lower armature 381 carried by selection bar 375 and causes that bar to rotate slightly through an amount determined by the gap between the armature and magnet core. When selection bar 375 rotates, its ten selecting fingers move across the U-shaped channel portions of the operating springs (including spring 385) of the top horizontal row of each of the ten vertical contact units.

While the select magnet 0SA is still energized, a circuit is closed to hold magnet 9HA. This magnet, when energized, attracts the armature of hold bar 373 causing this hold bar to pivot about a vertical axis. If none of the select magnets were energized, the hold strip 387 would enter the U-shaped recesses of the ten operating springs of vertical switch unit 616 and none of these operating springs would be displaced. However, since finger 390 has been shifted, due to the rotation of horizontal selection bar 375, across the U-shaped opening of spring 385, when strip 387 is shifted to the right upon rotation of the hold bar, it engages finger 390 which bridges the U-shaped portion of operating spring 385. The finger and operating spring are thus shifted to the right and the operating spring engages comb 384 causing all of the contacts of the set to be shifted to the right into engagement with the stationary contact strips 394.

When the select magnet 0SA is deenergized, the select bar 375 returns under the influence of its centering spring to its neutral position (like the position of bar 377 in FIGURE 47) with its fingers disposed between adjacent sets of operating springs. The bar is thus conditioned to be rotated again in the same or opposite direction so that the unoccupied selecting fingers can be utilized to engage other multiple spring sets associated with other vertical units of the switch. However, any selecting finger, such as select finger 390, previously clamped between hold strip of an energized hold magnet which remains energized is frictionally held in place to hold the contact set closed until the associated hold magnet is released.

It will also be appreciated that so long as a hold magnet, such as 9HA, remains energized, a subsequent rotation of the select bars cannot cause other select fingers to be engaged with this vertical unit since the movements of the select fingers into bridging relationship with the operating springs is stopped between sides of the U-shaped channels in the operating springs. However, when a vertical hold magnet, such as 9HA, is deenergized, the vertical hold bar associated with the magnet hold bar 373, in this case, pivots due to its bias spring (not shown) disengaging hold strip 387 from the previously engaged finger and thereby opening the previously closed set of contacts. The actuating finger returns under its own spring force to its "home" or neutral position between the adjacent operating fingers, in this case fingers 390 and 391.

It will further be appreciated that if magnet 1SA had been energized instead of magnet 0SA, selection bar 375 would have been rotated in the opposite direction so that finger 390 would have moved downwardly across the U-shaped channel of operating spring 388. Consequently, when hold magnet 9HA was energized and hold strip 387 shifted, the contacts of the second set would have been closed instead of the contacts in the uppermost set. In a similar manner, the set of contacts associated with any hold magnet and any select magnet can be closed and held closed for the duration of energization of the hold magnet.

With regard to the schematic circuit diagrams of these cross bar switches, i.e., FIGURES 44 and 45, it will be noted that in general not more than three contacts of each set are employed. Most of the unused contacts of each set have been eliminated from FIGURES 44 and 45 in order to simplify the drawings.

CROSS BAR LOADING CIRCUIT

The cross bar loading circuit essentially comprises those components which are effective to cause the various digits to be stored in the correct vertical switch units of the cross bar switch. In this regard, it will be noted in FIGURE 32 that the select magnets of cross bar switches 326 and 327 are connected directly to the output terminals of tape reader 264.

More particularly, select magnets 5SA and 5SB are connected in parallel between output lead 305 of the reader and common line 360. Thus, these select magnets are energized when the reader contacts register with a "5" reading on the tape. In a similar manner, select magnets 6SA and 6SB are connected to output lead 306, select magnets 3SA and 3SB are connected to output lead 307, and select magnets 9SA and 9SB are connected to output lead 308. Additionally, select magnets 7SA and 7SB, 2SA and 2SB, 1SA and 1SB, 4SA and 4SB, and 8SA and 8SB are respectively connected to output leads 313, 314, 315, 316, and 317.

Figure 35:
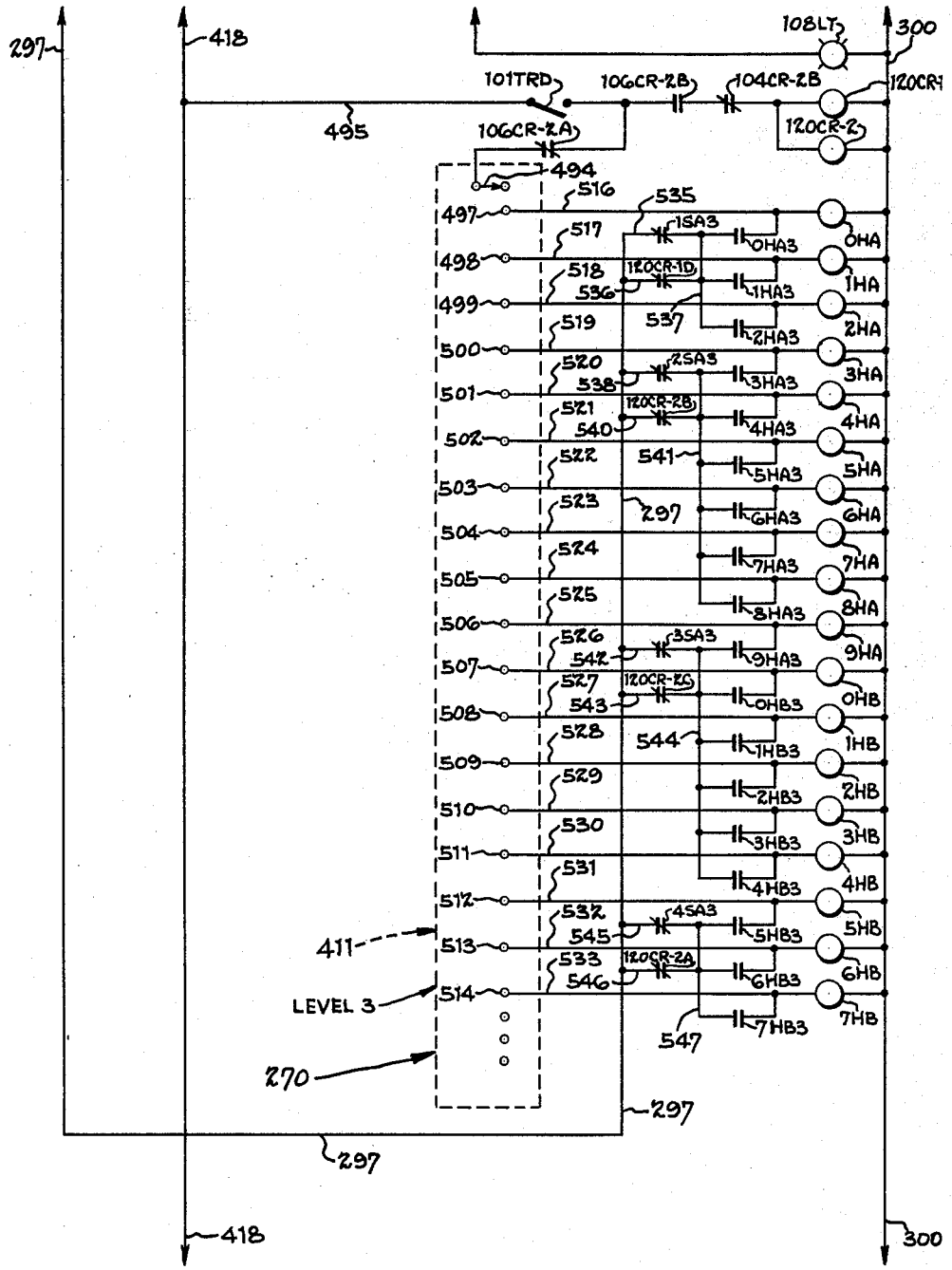

However, as will be apparent from the above description of the cross bar switches, energization of the select magnets alone will not affect closure of the cross bar contacts since the select magnets must be energized in connection with the hold magnets. The hold magnets of the cross bar switches are shown in FIGURE 35. The energization of these hold magnets is controlled through a circuit including sequencing stepping switch 270 and its associated memory check circuit 268.

Sequence stepping switch 270 is a three level magnetic stepping switch including a checking level indicated by dotted lines 408 in FIGURE 33, a code skipping level indicated by dotted lines 410 in FIGURE 33 and sequencing level indicated by dotted lines 411 in FIGURE 35. The sequencing switch also includes self-interrupted stepping magnet 101SR (FIGURE 33), the magnet being shunted by arc suppressor 412. Power for this portion of the cross bar loading circuit is taken from common line 297 and line 300.

More particularly, as shown in FIGURE 33, a line 413 is connected to power line 297 through contacts 414 and contacts 415 of the reader switch. Line 413 in turn branches into three parallel lines 416, 417, and 418. Line 416 contains contacts 285 of a cam operated switch in the reader. Line 417 is connected to line 413 through the contacts of reader switch 420 and contains reader contact RCEL operated by the pin in registry with the EL channel of the tape.

Line 416 is connected to magnet 101SR of stepping switch 285 through contact 108CRA of relay 108CR. A second connection is made to the magnet of the stepping switch through conductor 421. Conductor 421 is joined to lead line 418 through contact 101TRA of time delay relay 101TR and contact 120CR-1A of relay 120CR-1. Line 421 also includes the self-interrupting spring contacts 101SRA of stepping switch 101SR, normally closed contacts 111CRA of relay 111CR, and normally closed contacts 108CRD of relay 108CR. Another lead 422 is taken from line 418; lead 422 contains self-interrupter contact 101SRB and contact 108CRE and is connected to the coil of relay 108CR. Lead 422 is also connected to the wiper 423 of the checking level of stepping switch 101SR.

The checking level of the stepping switch is provided with twenty-two active contacts. These contacts are sequentially numbered 425 through 446. Contact 425 is connected to line 418 through contacts 101TRA, 120CR-1A, 1SA1 (off-normal contact of select magnet 1SA), 0HA1 (off-normal contact of select hold magnet 0HA), and off-normal contacts 1HA1 and 2HA1. Contact 426 of the stepping switch check level is joined through leads 448 and off-normal contact 0HA2 to a common conductor 450, this conductor in turn being joined through contact 120CR-1B to line 451 and through that line and contact 101TRA to line 418.

In a similar manner, contacts 427 and 428 are connected to line 450 through leads 452 and off-normal contact 1HA2 and lead 453 and off-normal contact 2HA2 respectively. Also, contacts 430, 431, 432, 433, 434, 435, 437, 438, 439, 440, 441, 442, 444, 445, and 446 are respectively connected to line 450 through leads 454 and off-normal contact 3HA1, lead 455 and off-normal contact 4HA1, lead 456 and off-normal contact 5HA1, lead 457 and off-normal contact 6HA1, lead 458 and off-normal contact 7HA1, lead 459 and off-normal contact 8HA1, lead 460 and off-normal contact 9HA1, lead 461 and off-normal contact 0HB1, lead 462 and off-normal contact 1HB1, lead 463 and off-normal contact 2HB1, lead 464 and off-normal contact 3HB1, lead 465 and off-normal contact 4HB1, lead 466 and off-normal contact 5HB1, lead 467 and off-normal contact 6HB1, and lead 468 and off-normal contact 7HB1 respectively.

Contact 429 of the checking level is connected to conductor 421 through lead 470 and series connected off-normal contacts 2SA1, 3HA2, 4HA2, 5HA2, 6HA2, 7HA2, and 8HA2. Contact 436 of the checking level is similarly connected to conductor 421 through lead 471 and is series connected to off-normal contacts 3SA2, 9HA2, 0HB2, 1HB2, 2HB2, 3HB2, and 4HB2. Finally, contact 443 of the checking level is connected to conductor 421 through lead 472 and off-normal contacts 4SA2, 5HB2, 6HB2, and 7HB2.

The code skipping level 410 of the sequencing switch includes a wiper 473 which is connected through lead 474 to the coil of relay 111CR. The code skipping level of sequencing stepping switch 101SR utilizes four contacts; i.e., contacts 475, 476, 477, and 478, positioned in respective correspondence with contacts 425, 429, 436, and 443 of checking level 408. Contact 475 is connected through conductor 480 to lead 481 between off-normal contacts 1SA2, and 0HA1. Contact 476 is similarly connected through lead 482 to lead 470 between contacts 2SA1 and 3HA2. Contact 477 is connected through lead 483 to lead 471 between off-normal contacts 3SA1 and 9HA2. Finally contact 478 is connected through lead 484 to lead 472 between off-normal contacts 4SA1 and 5HB2.

As shown in FIGURE 33, the cross bar switch loading circuit also comprises a series of relays having contacts which function to control the feeding and reading of the tape in the reader in proper sequence with the storage of information in the cross bar switch. More particularly, these reader relays include relay 112CR which is connected to line 416 through contact 109CR-2A and lead 485. Relays 109CR1 and 109CR2 are connected through lead 486 to a contact network indicated generally at 487 in FIGURE 33.

This contact network includes lead 488 joined to conductor 451 and containing contacts 101CRE, 102CRE, 104CR-2A, and 103CRE. Lead 488 is connected to a "tool change" light 102LT and to a lead 490 containing "tool change" switch 491. Lead 490 is also connected to lead 486, line 417, line 451, line 418, and line 492 for energizing 109CR-1 and lead 492 in series with the coil of relay 109CR-2.

Contacts 103CRE and the "tool change" switch are shunted by series connected contacts 103CRF, 105CRE, and 106CR-1D.

Line 417 is connected in series with the coil of relay 109CR-2, the other lead of this coil being connected to line 300 in the same manner as the coils of relay 108CR, 111CR, 112CR, and 109CR-1. Conductor 451 between its juncture with leads 488 and 490 contains series connected contacts 110CRA, 113CRA, 114CRA, 115CRA, and 116CRA. Lead 418 contains series connected contacts 112CRA and 109CR-2B. Line 492 is connected to line 297 and includes "tape move" switch 493.

The third or sequencing level of stepping switch 101SR is shown in FIGURE 35. As there shown, this sequencing level 411 of the stepping switch includes a wiper 494 which is connected to line 418 through contacts 106CR-2A and 101TRD, and lead 495. Lead 495 is also connected through contacts 106CR-2B and 104CR-2B to the parallel connected coils of relays 120CR-1 and 120CR-2.

The sequencing level 411 of the stepping switch has eighteen active contacts 497-514. Contacts 497-514 are connected to the coils of hold magnets 0HA-9HA and 0HB-7HB respectively through leads 516 through 533. The off-normal contacts of these magnets function to hold in, or lock in, the magnets when energized.

More particularly, parallel energization circuits to the hold magnets are provided from power line 297 as follows: Lead 535 is connected through off-normal contact 1SA3 and 0HA3 to hold magnet 0HA. Power line 297 is similarly connected through lead 536 and normally closed contacts 120CR-1D and 1HA3 to hold magnet 1HA. A lead 537 is connected to lead 535 and 536. This lead contains off-normal contact 2HA3 and is connected to hold magnet 2HA.

Power line 297 is also connected through lead 538 and series connected contacts 2SA3 and 3HA3 to hold magnet 3HA. Lead 540 connects hold magnet 4HA with power line 297 through contacts 120CR–2B and 4HA3. A conductor 541 is connected to lead 538 and 540. Conductor 541 is also connected to hold magnets 5HA, 6HA, 7HA, and 8HA through off-normal contacts 5HA3, 6HA3, 7HA3, and 8HA3, respectively.

Lead 542 containing off-normal contacts 3SA3 and 9HA3 interconnects power line 297 and hold magnet 9HA. In a similar manner, lead 543 containing contacts 120CR–2C and 0HB3 is joined to power line 297 and hold magnet 0HB. A conductor 544 is joined to leads 542 and 543 and is interconnected to hold magnets 1HB, 2HB, 3HB, and 4HB through off-normal contacts 1HB3, 2HB3, 3HB3, and 4HB3, respectively.

Lead 545 is connected between power line 297 and hold magnet 5HB. This lead contains off-normal contacts 4SA3 and 5HB3. Lead 546 similarly interconnects hold magnet 6HB with power line 297 through contacts 120CR–2A and 6HB3. Lead 547 is joined to lead 545 and 546 and is connected to hold magnet 7HB through contact 7HB3.

Before continuing with the description of the cross bar loading circuit, it will be helpful to describe briefly the notation which will be applied to the main contacts of the cross bar switch. Consider, for example, the contacts of vertical unit 356 of cross bar switch 326. It will be recalled that cross bar switch 326 has ten hold magnets designated 0HA, 1HA ... 9HA. The contacts of vertical switch unit 356 are all adapted to be operated by the vertical hold bar actuated by hold magnet 0HA.

It will be seen from FIGURE 44 that the contacts of vertical contact unit 356 are arranged in three vertical rows and that the contacts in these three vertical rows are respectively adapted to engage stationary contact strips 550, 551, and 552. It will also be recalled that the top horizontal contacts correspond to the digit "0," the second row of horizontal contacts correspond to the digit "1," and so forth. The numbering system of these contacts is as follows: The contacts in the left hand vertical row are designated 0A01, 1A01, 2A01 ... 9A01. The first digit corresponds to the digit value of the contact, the letter indicates that it is the "A" cross bar switch numbered 326 in the drawings. The second "0" indicates that the contact is associated with the zero hold magnet of that cross bar switch; and the final number "1" indicates that the contact is in the first vertical row of the set of contacts controlled by the hold magnet.

The second vertical row of contacts which engage contact strip 551 are designated 0A02–9A02. The third vertical row of contacts associated with hold magnet 0HA are numbered 0A03–9A03. In a similar manner, the three vertical rows of contacts associated with hold magnet 1HA are designated 0A11–9A11, 0A12–9A12, and 0A13–9A13. The remaining contacts of cross bar 326 are similarly numbered.

The contacts of the "B" cross bar switch; i.e., cross bar switch 327, are also numbered in the same way except that these contacts are distinguished from the corresponding contacts of cross bar switch 326 by the use of the identifying letter "B." Thus, the three rows of contacts associated with hold magnet 0HB are designated 0B01–9B01, 0B02–9B02, and 0B03–9B03.

In addition to the elements described above, the cross bar switch loading circuit comprises a plurality of interlocking contacts and lock-out relays. The circuit also includes a series of indicator lights mounted upon panel 9 to provide the operator with a visual indication of the status of the programming operation.

One of the relays of this portion of the circuit (FIGURE 34) is "reading complete relay" 110CR. One lead of this relay is connected to power line 300. The other terminal of this relay is connected to power line 418 through a series of contacts which function to energize the "reading complete" relay only after a letter "h" has been read and the eighteen digits corresponding to the operation indicator, table position, saddle position, and speed and feed code have been stored in the cross bar switches.

More particularly, the circuit to relay coil 110CR is taken from power line 418 through lead 553. Lead 553 contains parallel connected contacts 0A03–9A03. As is shown in FIGURES 35 and 44, this is accomplished in the cross bar switch by connecting the contacts 0A03–9A03 in parallel with line 418. The contact strip 552 of this row of contacts is then connected through lead 554 to movable contacts 0A13–9A13. These contacts of vertical contact unit 354 are also connected in parallel. The stationary contact strip 555 associated with contacts 0A13–9A13 is in turn connected through lead 556 to contacts 0A23–9A23 of vertical contact unit 355 associated with vertical hold magnet 2HA. Again these contacts are placed in parallel electrical connection and their stationary contact bar 557 is connected to conductor 553. This conductor is joined to one lead of operation indicator lamp 103LT. It will be appreciated that conductor 556 is energized only when one contact is energized in each of the vertical contact units 353, 354, and 355, indicating that a three digit operation number has been stored.

Lead 553 is connected to parallel contacts 0A33–9A33 of vertical contact unit 356. These contacts cooperate with a stationary contact strip 558 which is in turn connected through lead 560 to parallel contacts 0A43–9A43 of vertical contact unit 356. The contact strip 561 associated with these contacts is joined through conductor 562 to parallel contacts 0A53–9A53 of vertical contact unit 358. These contacts cooperate with stationary contact bar 563, this bar being joined through conductor 564 to parallel contacts 0A63–9A63 of vertical contact unit 359.

The stationary conductor strip which cooperates with these contacts is numbered 565 and is joined through lead 566 to parallel contacts 0A73–9A73 of vertical contact unit 360. These last named contacts are disposed to engage a stationary contact strip 567 which is connected through lead 568 to parallel connected contacts 0A83–9A83 of vertical contact unit 361. These last contacts are connected to output lead 570 which is joined to one lead of table light 104LT. It will be appreciated that lead 570 is energized only when the three digit operation number has been stored and a six digit table position number has been stored.

Lead 570 is also connected to the parallel connected contacts 0A93–9A93 of vertical contact unit 362. The stationary contact strip 571 associated with these contacts is joined to a lead 572 interconnected to parallel connected contacts 0B03–9B03 of vertical contact unit 396 of "B" cross bar switch 327. The stationary contact strip 573 associated with these contacts is connected through lead 574 through parallel contacts 0B13–9B13 of vertical contact unit 397. These contacts cooperate with stationary contact strip 575 which is connected through lead 576 to parallel connected contacts 0B23–9B23 of vertical switch unit 398. These contacts cooperate with stationary contact strip 577 which is joined through conductor 578 to parallel connected contacts 0B33–9B33 of vertical contact unit 399. Stationary contact strip 580 which cooperates with these contacts is connected through lead 581 to parallel connected contacts 0B43–9B43 of vertical contact unit 400. These contacts are adapted to engage a stationary contact strip 582 which is joined to lead 583. Lead 583 is in turn connected to one lead of "saddle position" lamp 105LT. It will be appreciated that this lamp is lit and lead 583 is energized only when the three digit operation number, a six digit table position number, and a six digit saddle position number have been stored.

Lead 583 is also connected to parallel contacts 0B53–9B53 of vertical contact unit 401. The stationary contact strip 584 associated with these contacts is joined through lead 585 to parallel connected contacts 0B63–9B63 of vertical contact unit 402. These contacts cooperate with a stationary contact strip 586 which is connected through lead 587 to parallel contacts 0B73–9B73 of vertical contact unit 403. A stationary contact strip 590 cooperates with these contacts and is connected to a lead 591. Lead 591 is energized only when a three digit operation number, a six digit table position number, a six digit saddle position number, and a three digit speed and feed code have been stored.

Lead 591 is connected to "speed and feed code" lamp 106LT. This lead is also connected through off-normal contact 8SA2 of select magnet 8SA and contact 106CR–2C of relay 106CR to the coil of "reading complete" relay 110CR and "reading complete" lamp 107LT. Since contacts 8SA1 and 106CR–2C are closed whenever a letter "h" (the reading complete hole) is read in the tape, relay 110CR is energized only when the operation indicator table position, saddle position, and speed and feed code digits have been stored and the letter "h" has been read by the reader.

The circuit further includes several lock-out relays including operation indicator lock-out relay 113CR. This relay is energized by a letter "a" code being read by the reader; and when energized causes the operation indicator read out lights to pick up stored information from the cross bar switch when the machine picks up new information. Relay 113CR becomes deenergized when the operation indicator stepping switches arrive at their proper position.

Table position lock-out relay 114CR is energized when a leter "b" code is read. When this relay is energized it causes the table to pick up stored table information from the cross bar switch when the machine picks up new information. Relay 114CR becomes deenergized when the table starts into position.

Saddle position lock-out relay 115CR is energized when a code letter "c" is read. When this relay is energized it will cause the saddle to pick up stored information when the machine picks up new information. This relay also becomes deenergized when the table starts into position.

The last lock-out relay is relay 116CR. This relay is the "speed and feed" lock-out relay and is energized by a letter "d" being read. When energized, this lock-out relay will cause the speed and feed to be changed in accordance with the information stored at the time the machine picks up new information. The relay becomes deenergized when the speed and feed information is picked up.

The above described lock-out relays are energized from power line 297 as follows: The coil of relay 113CR is connected to lead 297 through contact 120CR–1C and off-normal contact 1SB2 of select magnet 1SB and lead 592. Lead 592 is connected through lead 593 and contact 113CRB to five parallel connected relay contacts. These contacts are normally closed contacts 121CRB, 122CRB, 123CRB, and 102TRB. This latter contact is a contact of digit stepping switch safety timer 102TRA.

A lead 594 is taken between contacts 120CR–1C and 15B2; lead 594 is connected through lead 595 containing off-normal contact 2SB2 of select magnet 2SB to lockout relay 114CR. Lead 595 is also connected to a lead 596 through the parallel combination of hold-in contact 114CRB and contact 61CRTA of relay 61CRT. The coil of relay 61CRTA is not shown. It is to be understood, however, that this relay is in the dial drive circuit and is energized whenever the dial drive circuit is energized.

Lead 596 is connected to power line 297 through the parallel connection of normally closed contact 11CRA and normally closed contact 52TRT. Contact 11CRA is a contact of relay 11CR (not shown), while contact 52TRT is a contact of time delay relay 52TRTA (not shown). Relay 52TRT is energized when the dials of the table dial drive have reached their proper position. Relay 11CR is also energized when the table positioning circuit is initiated.

In a similar manner, the saddle position lock-out relay 115CR is energized through lead 597 which is connected to lead 594 through off-normal contact 3SB2. Lead 597 is also connected to lead 598 through the parallel connection of hold-in contact 115CRB and contact 61CRSA of relays 115CR and 61CRS. The coil of relay 61CRS is not shown but this relay is energized whenever the saddle dial drive circuit is energized. Lead 598 is connected to power line 297 through normally closed contacts 15CRA of relay 15CR. The coil of this relay is not shown but is energized when the saddle positioning circuit is initiated. Normally closed contact 15CRA is shunted by contact 52TRSA of time delay relay 52TRS which relay is not shown but is energized when the saddle dial drive has completely positioned the saddle dials.

Speed and feed change lock-out relay 116CR is energized through lead 600 which is in turn connected to lead 594 through off-normal contact 4SB2. Relay 116CR can also be energized through lead 601 containing contact 116CRB of relay 116CR and contact TM4. This contact is opened at the completion of the shifting of the speed and feed clutches.

The circuit further includes a time delay relay 101TR. One lead of this relay is connected to power line 300. The other lead of the relay is connected through suitable resistors 602 and 603 to lead 604 containing contact 107CRB of relay 107CR. Lead 604 is connected to power line 297 through two series connected groups of contacts 605 and 606, the contacts in each of the groups 605 and 606 being connected in parallel with one another. The contacts of groups 606 are off-normal contacts 0SA1, 1SA1, 2SA1, 3SA1, 4SA1, 5SA1, 6SA1, 7SA1, 8SA1, and 9SA1 associated with the select magnets 0SA–9SA of cross bar switch 326. In a similar manner, the contacts of group 605 are off-normal contacts 0SB1, 1SB1, 2SB1, 3SB1, 4SB1, 5SB1, 6SB1, 7SB1, 8SB1, and 9SB1 of select magnets 0SB–9SB of cross bar magnet 327.

The coil of time delay relay 101TR is shunted by contact 101TRB which is in series with capacitors 607, the capacitors 607 in turn being in parallel connection with contact 101TRC and resistor 608.

OPERATION NUMBER REGISTER

Figure 36:
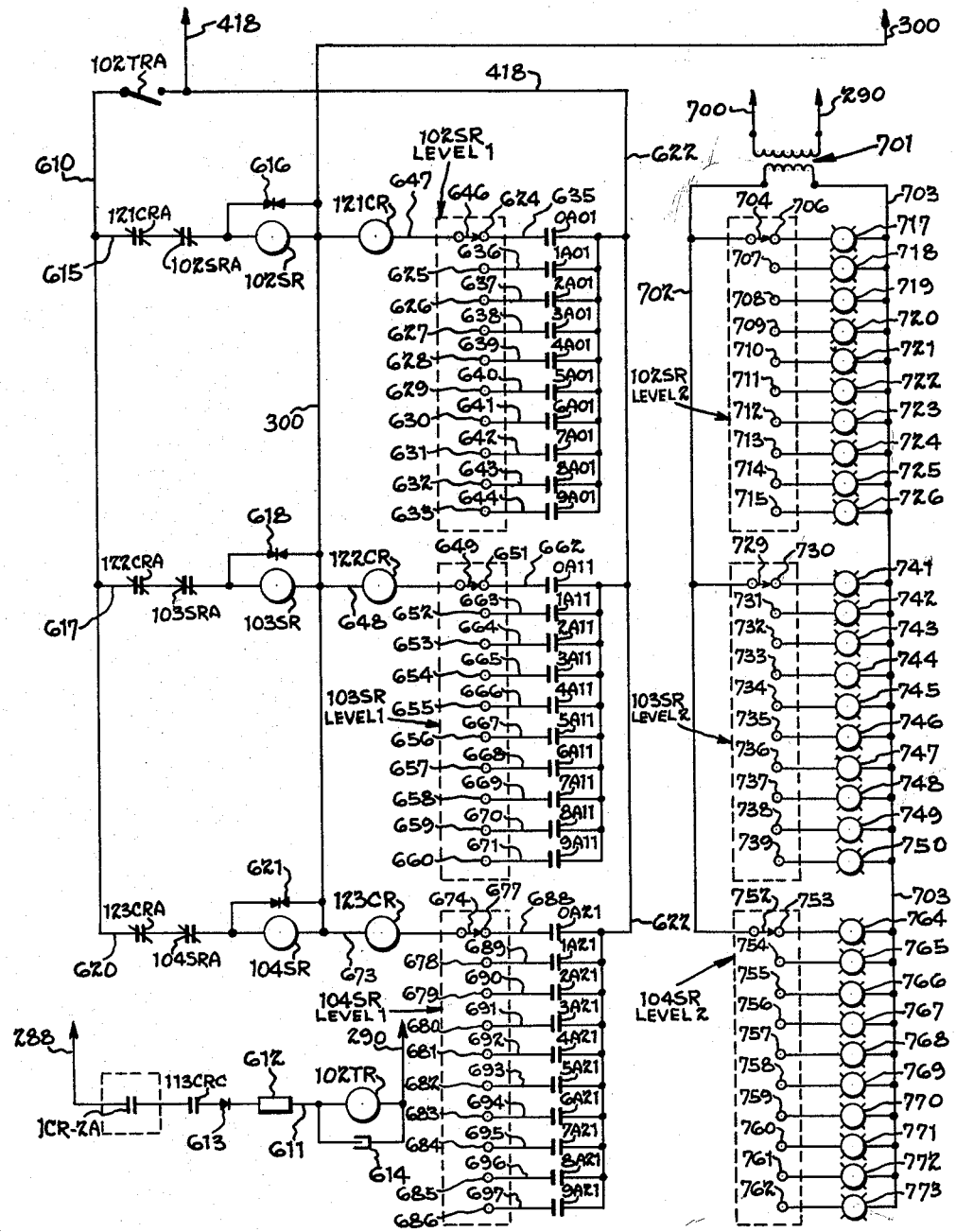

The operation number register is best shown in FIGURE 36. This portion of the unit functions to provide a visual record of the operation number stored in the cross bar switches. Power for this portion of the circuit is taken from lines 418 and 300. Line 418 is connected to lead 610 through contact 102TRA of digit stepping switches safety timer 102TR. This timer functions to permit the digit stepping switches to pick up stored information and after a delay the timer drops out to prevent continuous cycling of the switches if information is not picked up.

The circuit to safety timer 102TR is also shown in FIGURE 36. More particularly, the coil of safety timer 102TR is energized through lead 611. This lead contains a resistor 612, rectifier 613, and contacts 113CRC and 1CR–2A. The coil of safety relay 102TR is shunted by a capacitor 614. A units digit stepping switch coil 102SR is connected through lead 615 and normally closed contacts 121CRA and 102SRA to lead 610. The opposite lead of stepping switch magnet 102SR is connected to lead 300, the coil of this stepping switch is shunted by arc suppressor 616.

In a similar manner, a tens digit stepping switch 103SR is connected through lead 617 to line 610. Lead 617 contains normally closed contacts 122CRA and 103SRA.

The coil of stepping switch 103SRA is shunted by arc suppressor 618. In the same way, a hundreds digit stepping switch 104SR is connected through lead 620 and normally closed contacts 123CRA and 104SRA to lines 610. The coil of this hundreds digit stepping switch is shunted by arc suppressor 621.

Line 418 is connected to a second branch line 622. Level 1 of stepping switch 102SR is provided with ten contacts 624–633. These contacts are respectively connected to line 622 through contacts 0A01–9A01 of cross bar switch 326 and leads 635–644. Contacts 624–633 cooperate with a wiper 646 connected through lead 647 to relay 121CR, the opposite lead of this relay being returned to line 300.

In a similar manner, relay coil 122CR is connected through lead 648 to line 300 and wiper 649 of level 1 of stepping switch 103SR. The level 1 of this stepping switch cooperates with contacts 651–660. These contacts are respectively connected through leads 662–671 and contacts 0A11–9A11 of cross bar switch 326 of line 622.

A third relay 123CR is connected to line 300 through lead 673. Lead 673 is joined to wiper 674 of level 1 of stepping switch 104SR. Level 1 of stepping switch 104SR has ten contacts 677–686. These contacts are respectively connected through leads 688–697 and contacts 0A21–9A21 to lead 622. Each of the stepping switches 102SR, 103SR, and 104SR have second levels which directly control the indication of the operation numbers. More particularly, power for the operation number indicator is taken from leads 700 and 290 through a step down transformer 701, the output terminals of which are connected to leads 702 and 703. Lead 702 is connected to wiper 704 of level 2 of stepping switch 102SR. This wiper cooperates with ten contacts 706–715, these contacts being respectively connected to bulbs 717–726 of the units digit number indicator. The mechanical details of construction of this indicator does not constitute a part of the present invention. Generally, the indicator comprises a strip of ground glass behind which is mounted a piece of photographic film and ten bulbs 717–726. Each of the bulbs, when energized, is respectively adapted to project one of the digits 0–9 onto the ground glass. These digits appear at 728 in FIGURES 1 and 2.

In a similar manner, lead 702 is connected to a wiper 729 of level 2 of stepping switch 103SR. This wiper cooperates with contacts 730–739 of the stepping switch. Contacts 730–739 are respectively connected to bulbs 741–750 of the tens digit operation indicator. These bulbs cooperate with a film strip to project one of the digits 0–9 as indicated at 751 in FIGURES 1 and 2.

Lead 702 is also connected to a wiper 752 of level 2 of stepping switch 104SR. Level 2 of this stepping switch is provided with contacts 753–762. These contacts are respectively connected to bulbs 764–773. Bulbs 764–773 cooperate with a film of the hundreds digit indicator to respectively project the digits 0–9, the digits being indicated at 775 in FIGURES 1 and 2.

TABLE DIAL DRIVE INPUT

Figure 42:
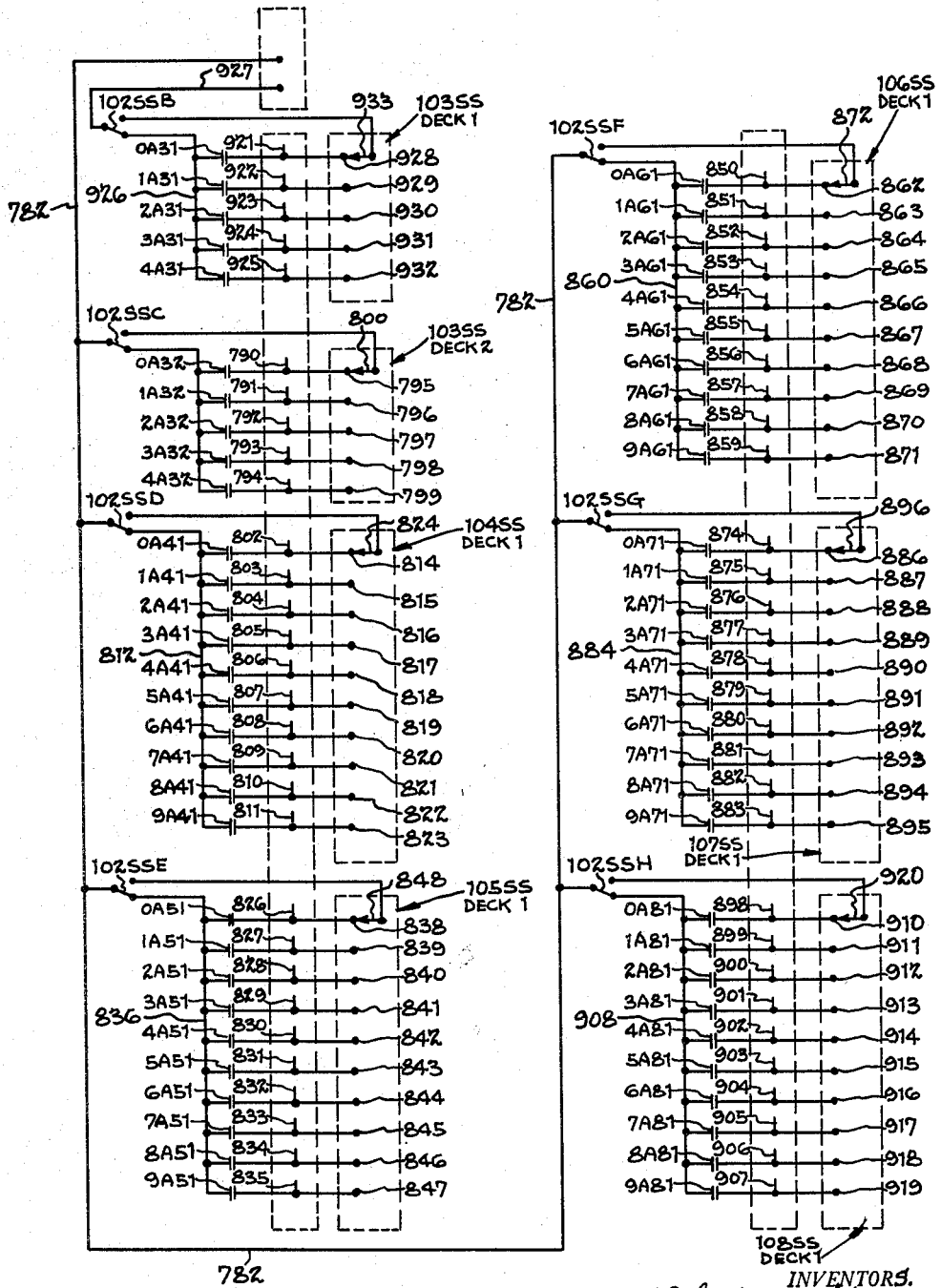
Figure 43:
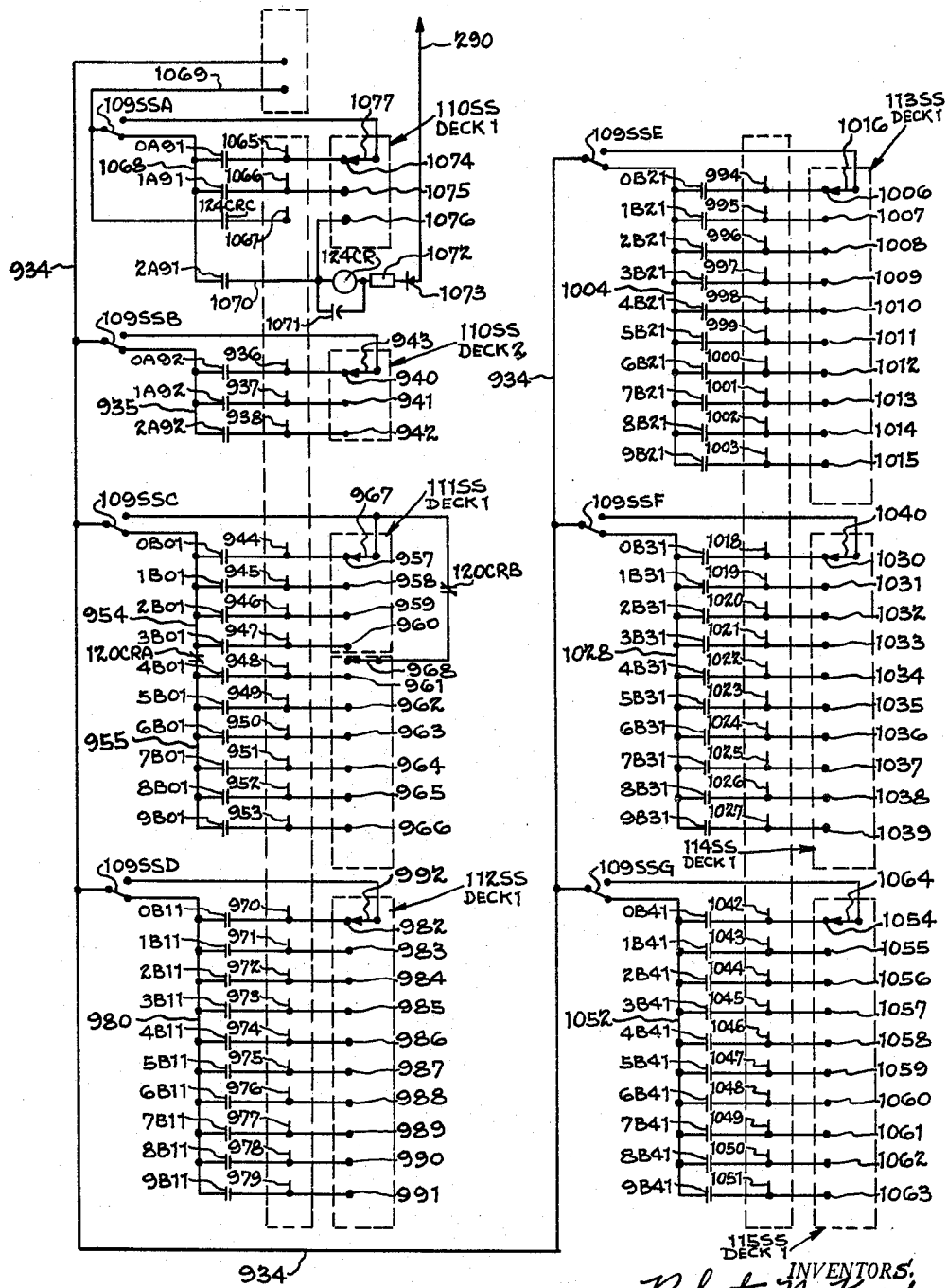

The details of the table dial drive input are best shown in FIGURES 31, 42, and 43. As previously explained, the table dial drive unit includes six setting gears mounted adjacent to six stationary contact rings numbered 231 in the description of the mechanical construction of the device. The contact rings are provided with a plurality of spaced contacts corresponding in number to the digits on the dials.

Each of the contact rings constitutes an element of a commutator switch in which one contact is energized during the select cycle and a cooperating wiping contact is shifted until it is brought into engagement with the "hot" or energized contact. When the wiper reaches this contact, an electrical circuit is completed to the solenoid associated with the adjacent gear, the solenoid being effective to disengage a clutch causing the gear and its dial to come to rest at a preselected position.

More particularly, six commutator switches are provided in the table dial drive. These commutator switches are switch 1TDS associated with the ten inch dial, 2TDS associated with the one inch dial, 3TDS associated with the .1 inch dial, 4TDS associated with the .01 inch dial, 5TDS associated with the .001 inch dial, and 6TDS associated with the .0001 inch dial.

These switches are indicated diagrammatically in FIGURE 31 as receiving signals from memory storage unit 271. Each of these switches is provided with a wiper numbered 776, 777, 778, 779, 780, and 781 respectively. These wipers are adapted to be driven by motor 186 through electrically responsive clutches actuated by solenoids 178–185.

The detailed circuits for energizing switches 1TDS–6TDS are best shown in FIGURE 42. As there shown, power is supplied to the switches from line 782. This line contains selector switch contacts 102SSC. Switch 102SSC is positioned as shown in FIGURE 42 when the machine is to be tape controlled and the arm of the switch is shifted to the opposite contact when the machine is to be controlled by means of panel knobs 783–788. It will be pointed out at this time that knobs 783–788 respectively control selector switches 103SS–108SS, the position of the individual knobs being shown by numerals appearing in the windows appearing above the respective knobs.

Lead 782 has five parallel branches respectively connected to contacts 0A32, 1A32, 2A32, 3A32, and 4A32 of cross bar switch 326. These contacts are respectively connected to leads 790, 791, 792, 793, and 794, these leads in turn being respectively joined to the 0–4 contacts of ten inch commutator 1TDS. Leads 790–794 are also respectively joined to contacts 795–799 of deck 1 of ten inch selector switch 103SS. This switch has a wiper 800 connected to power line 782 through a second contact associated with movable contact 102SSC.

One inch commutator switch 2TDS also has ten contacts corresponding to digits 0–9. These contacts are respectively connected to leads 802–811. Leads 802–811 are respectively connected through cross bar contacts 0A41–9A41 and common lead 812 and selector switch contact 102SSD to line 782. Leads 802–811 are also respectively connected to contacts 814–823 of one inch selector switch 104SS. This switch has a wiper 824 connected to power line 782 through a second contact associated with movable selector switch contact 102SSD.

In a similar manner, the 0–9 contacts of dial switch 3TDS are connected to leads 826–835. Leads 826–835 are respectively connected through cross bar contacts 0A51–9A51 to power line 782 through common lead 836 and selector switch contacts 102SSE. Leads 826–835 are also respectively connected to contacts 838–847 of a .1 inch selector switch 105SS. This selector switch has a wiper 848 which is connected to power line 782 through a second contact associated with movable contact switch 102SSE. Contacts 0–9 of the .01 inch selector switch 4TDS are joined to leads 850–859 respectively. These leads are in turn respectively connected to power line 782 through contact 102SSF of selector switch 102SF, common lead 860, and cross bar switch contacts 0A61–9A61 of cross bar switch 326. Leads 850–859 can also be energized through the .01 inch selector switch 106SS. More particularly, each of the leads 850–859 are respectively connected to a contact 862–871 of selector switch 106SS. This selector switch is provided with a wiper 872 which is connected through a second contact associated with contact 102SSF through power line 782.

The .001 inch commutator switch 5TDS also includes ten contacts corresponding to the digits 0–9. These contacts are respectively connected to leads 874–883. Leads 874–883 are in turn connected through contact 102SG, common lead 884 and cross bar contact 0A71–9A71 to power line 782. Leads 874–883 are also respectively joined to contacts 886–895 of the .001 inch selector switch 107SS. This switch has a wiper 896 which is also adapted to be connected to power line 782 through a second contact associated with movable contact 102SSG.

The last commutator switch 6TDS is associated with the .001 inch dial and includes 0–9 contacts respectively connected to leads 898–907. These leads in turn are respectively connected to cross bar contacts 0A81–9A81 and through these contacts to a common lead 908. Common lead 908 is connected to a contact 102SSH and through that contact to power line 782. Leads 898–907 are also respectively joined to contacts 910–919 of the .001 inch selector swich 108SS. This switch has a wiper 920 adapted to be connected to power line 782 through movable contact 102SAH.

The table positioning unit further includes connections to stationing switches 60, 61, 62, 63, and 66. More particularly, switch 66 is provided with an input lead 921, switch 60 with a lead 922, switch 61 with a lead 923, switch 62 with a lead 924, and switch 63 with a lead 925. Leads 921–925 are respectively connected to cross bar contacts 0A31–4A31 and through these contacts to a common lead 926 which is connected to contact 102SSB of selector switch 102SS. This contact is also connected to power line 927. Switch leads 921–925 are also respectively connected to contacts 928, 929, 930, 931, and 932 of a second deck of ten inch selector switch 103SS. This deck of switch 103SS is provided with a wiper 933 which is also connected to power line 927 through switch 102SSB.

SADDLE DIAL DRIVE INPUT

It is to be understood that the mechanical details of construction of saddle drive dials are the same as those of the table drive dials. Consequently, the saddle dials are not shown in detail. Essentially, however, the saddle drive dial unit comprises six selector dials respectively adapted to position ten inch rods, one inch rods, tenth inch rods, one hundredths inch rods, one thousandths inch rods, and ten thousandths inch roads. Each dial also includes commutator switch similar to commutator switches 1TDS–6TDS of the table dial drive unit. Again these commutator switches have not been shown since they are like the switches previously described in detail. However, the circuit connections to these switches are shown in FIGURE 43.

As there shown, power for the saddle dial drive unit is taken from lead 934. This lead is connected to the three contacts of the ten inch saddle commutator switch through a contact 109SSB of selector switch 109SS. This switch is connected to common conductor 935 which is in turn joined to contacts 0A92, 1A92, and 2A92 of cross bar switch 326. These cross bar contacts are respectively connected to leads 936, 937, 938. Leads 936, 937 and 938 are respectively joined to the 0, 1, and 2 contacts of the ten inch saddle dial commutator switch (not shown). Leads 936, 937 and 938 are also connected to contacts 940, 941 and 942 of one deck of the ten inch selector switch 110SS. This deck of switch 110SS includes a wiper 943 adapted to be connected to power line 934 through selector switch 109SSB.

The one inch commutator switch of the saddle dial drive has contacts corresponding to the digits 0–9. These contacts (not shown) are respectively connected to leads 944–953. Leads 944–953 are in turn respectively joined to cross bar contacts 0B01–3B01 and 4B02–9B02. Cross bar switch contacts 0B01–3B01 are connected to common lead 954 and through this lead and through selector switch 109SSC to power line 934, while contact 4B02–9B02 are joined to lead 954 through common lead 955 and normally closed contact 124CRA of relay 124CR. Leads 944–953 are also respectively connected to contacts 957–966 of one inch selector switch 111SS. This switch is a two deck switch having a wiper 967 adapted to co-operate with contacts 957, 958, 959, and 960 and a second wiper 968 adapted to cooperate with contacts 961–966. Wipers 967 and 968 are joined through normally closed contact 124CRB of relay 124CR and are adapted for connection through selector switch 109SS to power line 934.

The commutator switch associated with the .1 inch dial has ten contacts corresponding to the digits 0–9. These contacts are respectively connected to leads 970–979. Leads 970–979 are respectively joined to cross bar contacts 0B11–9B11 of cross bar switch 327. These contacts are in turn joined to a common line 980 and through that line and selector switch contact 109SSD to power line 934. Leads 970–979 are also respectively connected through contacts 982–991 of the tenths inch selector switch 112SS. This switch is provided with a wiper 992 which is adapted to be connected to power line 934 through contact 109SSD.

The saddle dial drive also includes a one hundredths inch dial having contacts corresponding to the digits 0–9. These contacts are respectively connected to leads 994–1003 and through these leads to cross bar switch contacts 0B21–9B21. Cross bar switch contacts 0B21–9B21 of cross bar switch 327 are joined to a common lead 1004 and through that lead and selector switch 109SSE and connected to power line 934. Leads 994–1003 are also respectively connected to contacts 1006–1015 of one hundredths inch selector switch 113SS. This switch is provided with a wiper 1016 which can also be connected to power line 934 through selector switch contact 109SSE.

The one thousandths dial unit similarly includes commutator switch having 0–9 contacts respectively connected to leads 1018–1027. These leads are in turn respectively connected to contacts 0B31–9B31 of cross bar switch 327. These contacts of the cross bar switch are connected to common conductor 1028 and selector switch contact 109SSF which is in turn joined to power line 934. Leads 1018–1027 are also respectively joined to contacts 1030–1039 of the one thousandths inch selector switch 114SS. Commutator 1040 of this switch is connected to selector switch contact 109SSF.

The last of the saddle dials, the ten thousandths dial, also includes a commutator switch having ten contacts corresponding to the digits 0–9. These contacts are joined to leads 1042–1051. These leads are in turn respectively connected to cross bar switch contacts 0B41–9B41 of cross bar switch 327. Cross bar contacts 0B41–9B41 are joined to common lead 1052 and this is in turn connected to power line 934 through selector switch 109SSG. Leads 1042–1051 are also respectively connected to contacts 1054–1063 of ten thousandths inch selector switch 115SS. This switch has a wiper 1064 adapted to be connected to power line 934 through selector switch contact 109SSG. The saddle drive unit further includes three positioning switches 60, 61, and 62 of the table drive unit. These positioning switches are not shown but the 0–9 inch positioning switch is connected to lead 1065 while the 10–19 inch positioning switch is connected to lead 1066 and the 20–29 inch positioning switch is connected to the lead 1067 (FIGURE 42). Leads 1065 and 1066 are respectively connected to cross bar contact switches 0A91 and 1A91 and relay contact 124CRC. Cross bar switch contacts 0A91 and 1A91 are joined to lead 1068 and through that lead and selector switch contact 109SSA to power line 1069. Power line 1069 is also connected to one terminal of relay contact 124CRC. Lead 1068 is also joined to cross bar contact 2A91 while the other terminal of that contact is connected to lead 1070. Lead 1070 is connected to relay coil 124CR which is shunted by capacitor 1071 and is connected in series with resistor 1072 and rectifier 1073 to power line 290.

Switch lead 1065 is also connected to a contact 1074 of another deck of ten inch selector switch 110SS. Switch lead 1066 is connected to a second contact 1075 of this deck of switch 110SS and a contact 1076 is connected to line 1070. This selector switch 110SS is provided with a wiper 1077 which is adapted to be connected through selector switch contact 109SSA to power line 1069.

It is to be understood that the dial drive motor solenoids as well as the saddle positioning motors and other components of the saddle drive (which are not shown) function in the same manner as the corresponding elements of the table drive.

SPEED AND FEED INPUT

The speed and feed input circuit is best shown in FIGURES 37, 38, 39, 40, 41, 49 and 50. As there shown, the speed and feed is adapted to be controlled either manually from a feed selector switch FSW and a speed selector switch SSW mounted on the machine; or automatically under the control of signals received from the cross bar switch. It will be recalled from the preceding description of the spindle drive that the electrical signals for controlling the spindle feed and speed actuate suitable clutches in spindle speed clutch transmission 261 and spindle feed clutch transmission 262.

More particularly, power for the speed and feed control circuit (FIGURE 37) is taken from power lines 1078 and 1080, these power lines being connected across the primary of a step-down transformer 1081. The secondary winding of this transformer is connected through suitable fuses 1082 to lines 1083 and 1084. One lead 1085 is connected across lines 1083 and 1084. This lead contains a contact of stop push button switch 1086 and a contact of start shift push button swich 1087. Lead 1085 also contains a contact 110CRB of relay 110CR. This lead is connected to one terminal of the coil of relay 1CR-1, the other terminal of this relay being connected to lead 1084 through normally closed contacts HOLA and HOLB of "high-speed" thermal overload relay HOL and contacts LOLA and LOLB of "low speed" thermal overload relay. Two parallel leads 1088 and 1090 are taken from line 1085 on opposite sides of relay contact 110CRC. These leads are respectively interconnected by a lead 1091 containing a contact of manual and automatic selector switch 116SS and by a lead 1092 containing a contact of reader "on-off" switch 118SS. Lead 1090 also contains second contacts of switches 116SS and 118SS. This lead is connected to relay coil 1CR-2, the second lead of the relay being connected to line 1093 which is returned to line 1085 through overload contacts HOLA, HOLB, LOLA, and LOLB.

Another lead 1094 is connected between lines 1088 and 1093. Lead 1094 contains contact TM3 of time delay relay TM and contact 26CRA of relay 26CR. Lead 1094 is connected to one lead of the coil of relay TM, the opposite lead being connected to line 1093. Another lead 1095 is joined to line 1088 and is connected through a contact of feed and speed pick up switch 1096 to lead 1097 which is in turn connected to lead 1094 and 1098. Lead 1098 contains contact 1CR-1A of relay 1CR-1 and a contact of the speed and feed selector switch 117SS. Lead 1098 is also connected to the coil of relay 26CR, the other lead of this relay coil being connected to line 1093.

The contact of switch 117SS in line 1098 is shunted by lead 1100 containing contact 116CRC of relay 116CR. Another lead 1101 is connected to line 1088 through lead 1095. Lead 1101 contains normally closed contact 116CRD, a contact of selector switch 117SS and a contact of the speed and feed pick up push button switch 1096. A line 1102 containing a second contact of "start-shift" push button switch 1087 is shunted across normally closed contact 116CRC and the last named contact of switch 117SS. Lead 1101 is joined through parallel conductors 1103 and 1104.

Conductors 1103 contains a contact 1MHA of relay 1MH. This lead is also connected to a signal lamp 1105 and is joined to conductor 1104 through lead 1106.

Lead 1104 contains a contact 1MLA of relay 1ML and the forward contact of forward and reverse switch 1107. Line 1104 also includes normally closed contact 1MRA of relay 1MR. Contacts 1MRA are in turn joined to relay coil 1MF.

Lead 1106 includes the reverse contact of switch 1107 and normally closed contact 1MFA of relay 1MF. Contact 1MFA is in turn connected to relay 1MR. Another line 1108 is joined to line 1088 through contacts 26CRB and parallel connected contacts 1MHB and 1MLB. Line 1108 also contains a contact of selector switch 117SS. This line is connected to stationary contact strip 1110 of cross bar switch 327 as is explained below. A lead 1111 is taken from line 1108 between the 1MHB contact and the contact of selector switch 117SS. Line 1111 contains another contact of selector switch 117SS and is joined to wiper 1112 of the third deck of speed selector switch SSW and wiper 1113 of the fourth deck of this switch.

Figure 38:
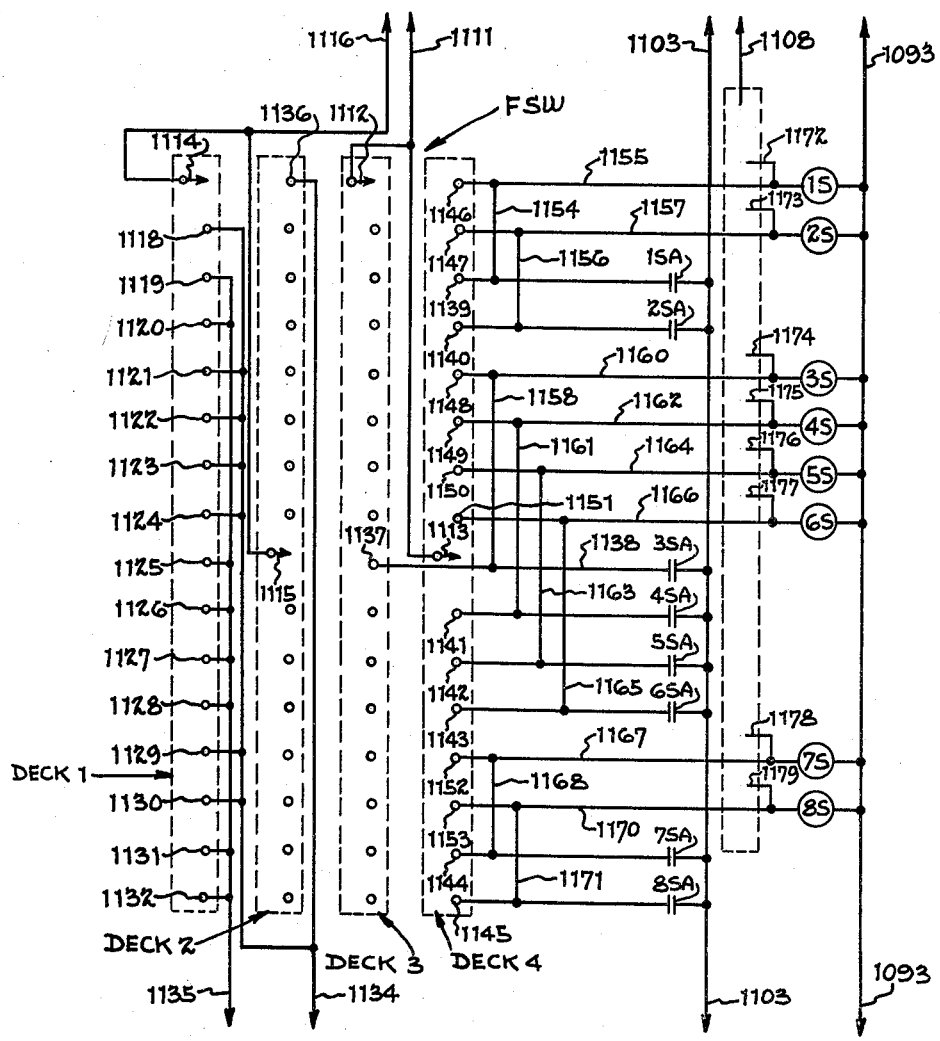

Manual speed selector switch SSW is a four deck switch, the first and second decks respectively being provided with wipers 1114 and 1115 (FIGURE 38). These wipers are joined to a lead 1116 adapted to be connected to power line 1088 through a contact of switch 117SS and a contact 26CRB of relay 26CR. Another lead 1117 is taken from lead 1116 between the contact 26CRB and the contact of switch 117SS. Lead 1117 is connected to stationary contact 1109 of cross bar switch 327.

Deck 1 of switch SSW is provided with contacts 1118–1132 adapted to cooperate with wiper 1114. Contacts 1118, 1121, 1122, 1123, 1124, 1129 and 1130 are connected to a lead 1134, while contacts 1119, 1120, 1125, 1126, 1127, 1128, 1131 and 1132 are connected to a lead 1135. Deck 2 of switch SSW has one contact 1136 which is also connected to lead 1134.

Deck 3 of selector switch SSW has one contact 1137 connected to a lead 1138 which is joined through a contact 3SA of relay 3S to line 1103. Other similar connections to lead 1103 are made from contacts 1139, 1140, 1141, 1142, 1143, 1144 and 1145 of the fourth deck of switch SSW through relay contacts 1SA, 2SA, 3SA, 4SA, 5SA, 6SA, 7SA, and 8SA, respectively. In addition to the above mentioned contacts, the fourth deck of selector switch SSW includes contacts 1146, 1147, 1148, 1149, 1150, 1151, 1152, and 1153. Contact 1139 is connected through conductor 1154 to contact 1146 and through conductor 1155 to relay 1S.

Contact 1140 is similarly connected through conductor 1156 to contact 1147 and through conductor 1157 to relay coil 2S. Contact 1137 is joined through conductor 1138 to line 1158 and through lead 1160 to relay coil 3S. In the same way, contact 1141 is connected through lead 1161 to contact 1149 and through lead 1162 to relay coil 4S. Similarly, contact 1142 is joined through lead 1163 to relay coil 5S and through lead 1164 to contact 1150. Contact 1143 is likewise joined through lead 1165 to relay coil 6S and through lead 1166 to contact 1113.

Relay coil 7S is connected through a lead 1167 to contact 1152, this contact in turn being joined to contact 1144 through a lead 1168. Relay coil 8S is connected to contact 1153 through lead 1170 and contact 1145 through a lead 1171 joining that contact to lead 1170. It is to be understood that selector switch SSW is utilized only when the speed and feed is manually controlled when the spindle speed and feed are tape controlled relays 1S, 2S, 3S, 4S, 5S, 6S, 7S and 8S are adapted to be energized through leads 1172–1179 respectively. These leads together with lead 1108 are connected to the contacts of cross bar switch 327 as is best shown in FIGURES 44 and 45. As there shown, one lead 1108 is adapted to be placed in circuit connection with parallel connected relays 1S–8S through cross bar switch contacts 1B51–8B51 of cross bar switch 327.

As will be explained in detail below, the contacts of relays 1S–8S respectively actuate the speed clutch transmission in such a manner that the spindle is rotated at either 30, 45, 120, 150, 180, 225, 600, or 900 r.p.m. in the low speed range or 60, 90, 240, 295, 360, 460, 1200, or 1800 r.p.m. in the high speed range respectively. The selection of the speed range is accomplished by circuits shown in FIGURES 39, 40, 41, and 49. As there shown, power line 1117 is adapted to be connected through contacts 9B61 and 0B61 to leads 1180 and 1181 respectively. These leads are in turn connected to the coil of high speed relay 1MH and low speed relay 1ML. Relays 1ML and 1MH are also adapted to be energized manually through leads 1134 and 1135 respectively. These relays can also be energized through their hold-in contacts 1MLF and 2HMF which interconnect power line 1103 with lines 1134 and 1135, respectively.

Figure 39:
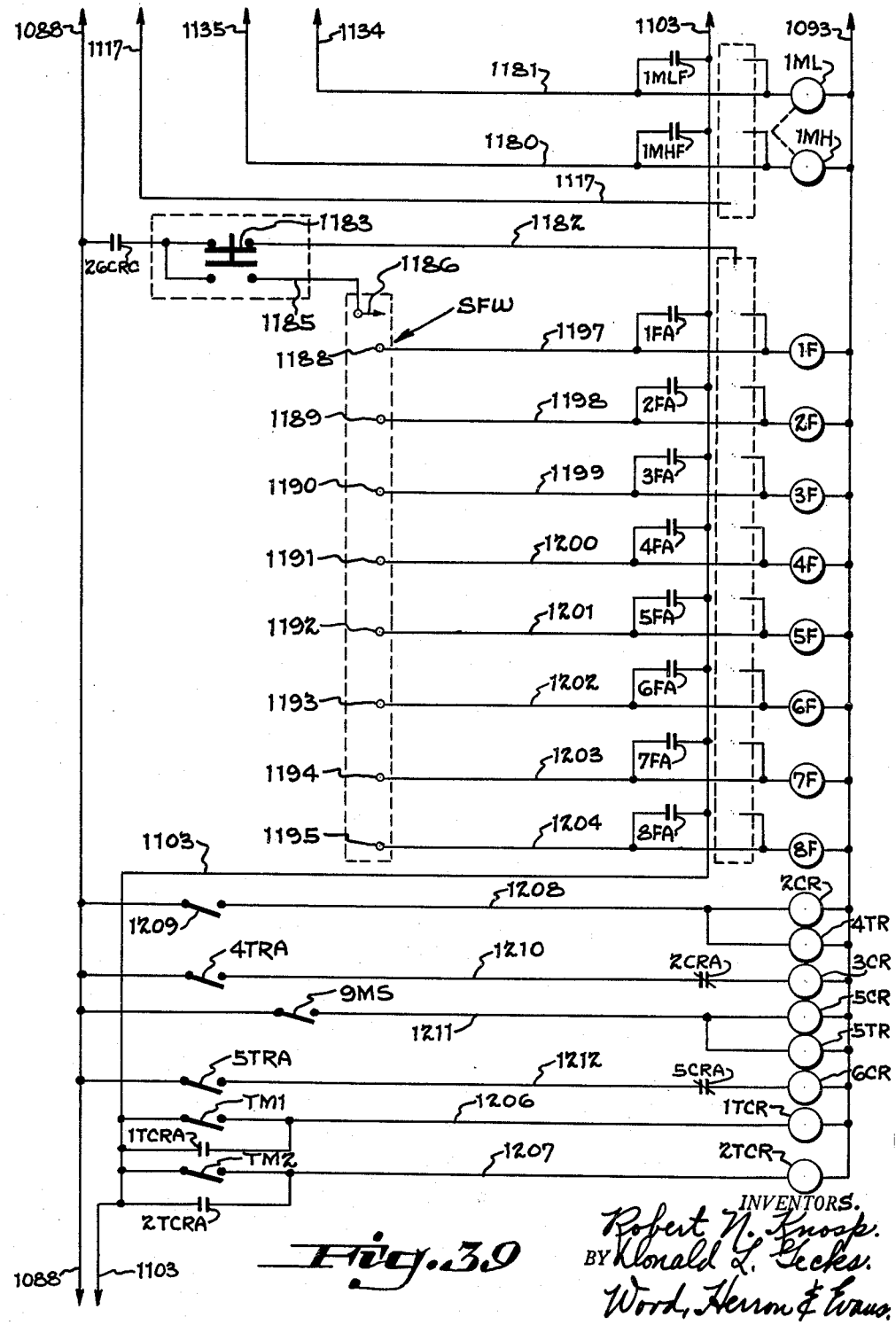

The control of feed rate is obtained through a circuit similar to that described for the speed control. More particularly, as is shown in FIGURE 39, the feed control circuit is powered from lines 1103, 1093, and 1088. A lead 1182 is connected to power line 1088 through contact 26CRC and switch 1183. Lead 1182 is connected to stationary contact strip 1184 of cross bar switch 327.

In order to provide for manual selection of the feed rate, a lead 1185 adapted to be closed upon the contact of switch 1183 is connected to wiper 1186 of feed selector switch FSW. This wiper is adapted to cooperate with contacts 1188–1195. Contacts 1188, 1189, 1190, 1191, 1192, 1193, 1194, and 1195 are respectively interconnected to feed select relays 1F–8F through leads 1197–1204 respectively. Leads 1197–1204 are also effective to respectively connect relays 1F–8F to contacts 1B71–8B71 of cross bar switch 327. Relays 1F–8F are thus adapted to be energized by these contacts when the feed is automatically controlled from a punched tape. Relays 1F–8F are each provided with a hold-in contact 1FA–8FA adapted to hold the relay energized by completing a circuit to the relay from power line 1103.

Power line 1103 is also connected to two time delay relays of the speed control circuit through leads 1206 and 1207. More particularly, lead 1206 is connected to power line 1103 through timer contact TM1 and hold-in contact 1TCRA of time delay relay 1TCR. Lead 1206 is connected to the coil of time delay relay 1TCR, the opposite lead of the relay being returned to power line 1093. In a similar manner, lead 1207 is connected through the parallel combination of hold-in contact 2TCRA and timer contact TM2 to power line 1103. Lead 1207 is effective to energize the coil of relay 2CTR.

Several additional relays in the feed control circuit are energized from power line 1093. More particularly, the coil of relay 2CR is connected in parallel with the coil of time delay relay 4TR and is connected through lead 1208 and brake micro switch 1209 to power line 1088. The coil of relay 3CR is similarly connected to line 1093 and power line 1088 through line 1210 containing normally closed contact 2CRA and contact 4TRA. The coils of relays 5CR and 5TR are connected to a lead 1211 containing jog switch 9MS. Lead 1211 is connected to this jog switch through power line 1088. In a similar manner, the coil of relay 6CR is connected to power line 1093 and lead 1212. This lead contains normally closed relay contact 5CRA and timer contact 5TRA.

Figure 40:
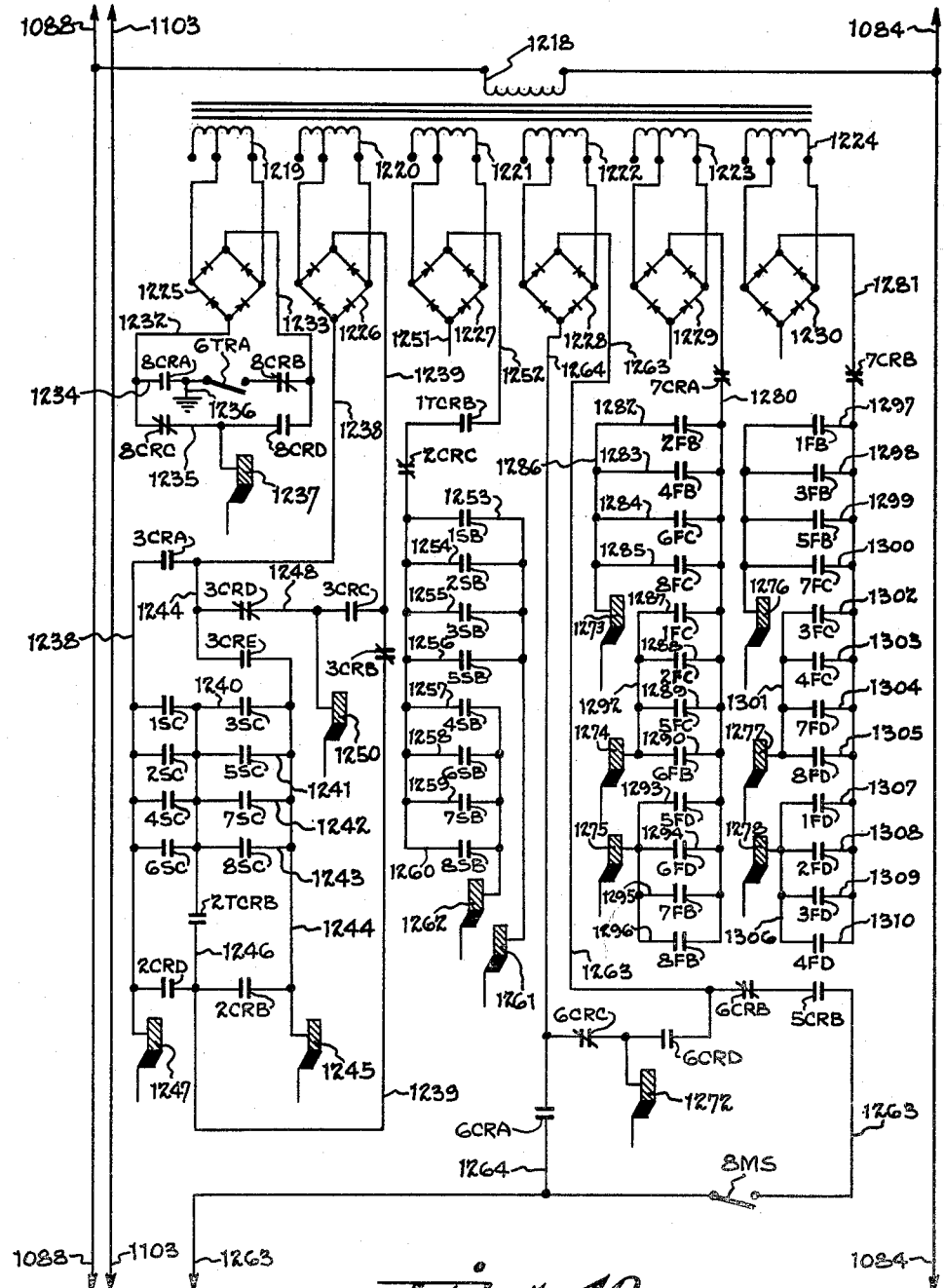
Figure 41:
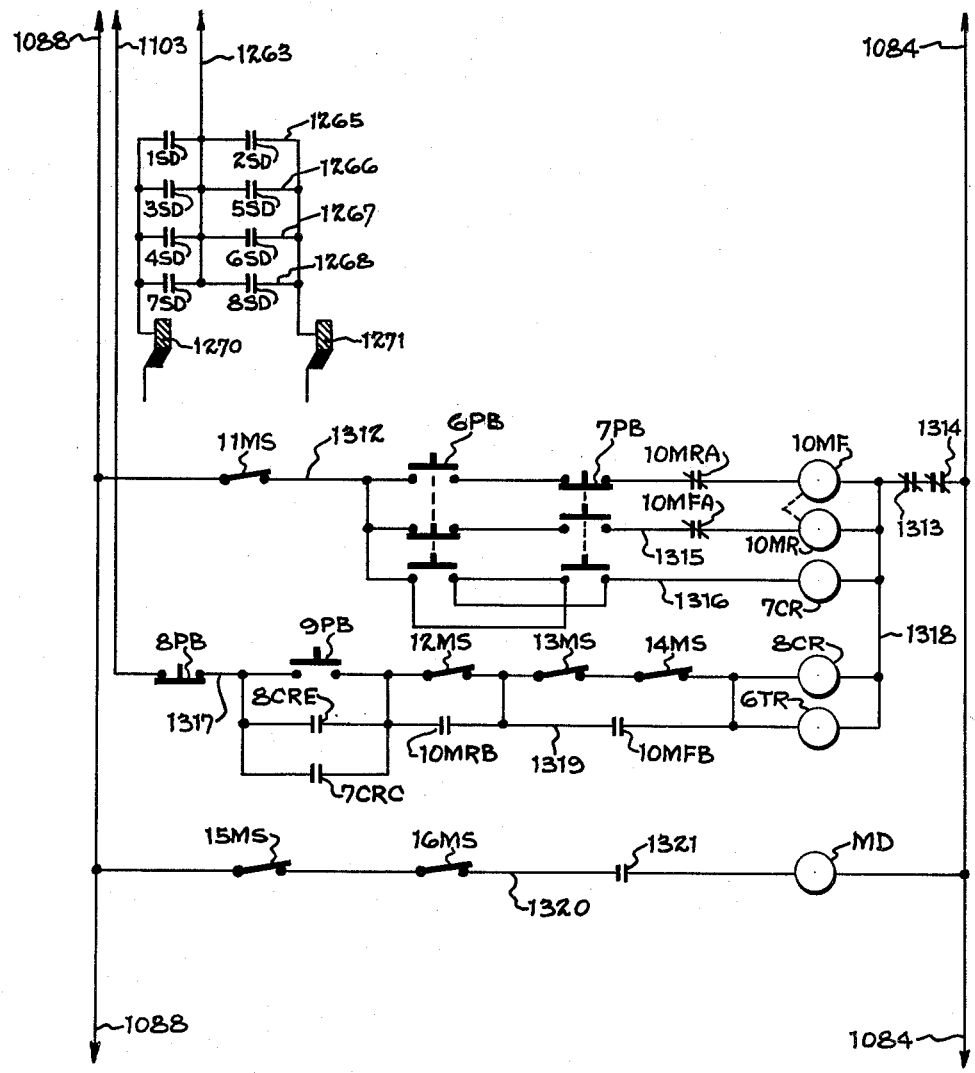

The contacts of the various feed control relays 1F–8F, speed control relays 1S–8S, and high and low relays 1ML and 1MH are shown in FIGURES 40, 41, and 50. As shown in FIGURE 50, the low speed relays have contacts in the spindle drive motor energization circuit 1MLC, 1MLD, 1MLE, 1MLF, and 1MLG. When these contacts are closed in response to the energization of relay 1ML the spindle motor 260 is driven in its slow speed range. In a similar manner, high speed relay 1MH has contacts 1MHC, 1MHD, and 1MHE in a spindle drive motor circuit. When these contacts are energized, the spindle motor is driven in its high speed range. In addition to these contacts, power lines 1214, 1215, and 1216 for the spindle drive motor are respectively provided with conventional forward and reverse contacts indicated generally at 1217. These contacts constitute no part of the present invention.

Power for energizing the electrical clutches of the speed clutch transmission 261 and the feed clutch transmission 262 are taken from power lines 1088 and 1084 (FIGURE 40). These lines are connected to the primary winding of a transformer 1218. This transformer is provided with center tapped secondary windings 1219–1224. These windings are respectively connected to rectifiers 1225–1230.

The output leads 1232 and 1233 of rectifier 1225 are connected to parallel leads 1234 and 1235. Parallel lead 1234 is grounded as at 1236 and contains normally open contacts 8CRA and normally closed contact 8CRB. This lead also contains timer contact 6TRA. Lead 1235 contains normally closed contact 8CRC and normally open contact 8CRD. A brush 1237 of the main clutch of the feed clutch transmission is connected between these leads.

Rectifier 1226 is provided with two output leads 1238 and 1239. Lead 1238 contains contact 3CRA of relay 3CR. This line is also connected to parallel leads 1240, 1241, 1242, and 1243. These leads are in series connection with contacts 1SC and 3SC, 2SC and 5SC, 4SC and 7SC, 6SC and 8SC. Leads 1240–1243 are joined to lead 1244 which in turn is connected to brush 1245 of the speed clutch transmission 261. Leads 1240–1243 are also interconnected by a line 1246 containing contact 2TCRB. This line is joined to line 1239 and is interconnected to line 1238 through contact 2CRD and to line 1244 through contact 2CRB. Line 1238 is connected to brush 1247 of speed clutch transmission 261.

Line 1239 contains normally closed contact 3CRB and is joined to line 1248 through normally open contact 3CRC. Line 1248 is in turn connected to line 1238 through normally closed contact 3CRD and at line 1244 to 3CRE. Line 1248 is also connected to brush 1250 of speed clutch transmission 261.

Rectifier 1227 is provided with two outlet lines 1251 and 1252. Line 1252 contains series connected contacts 1TCRB and 2CRC. This line is joined to a series of parallel connected lines 1253–1260, these lines respectively containing contacts 1SB–8SB. Lines 1253–1256 are joined to brush 1261 of the speed clutch transmission while lines 1257–1260 are joined to brush 1262 of the feed clutch transmission.

Rectifier 1228 is provided with two output leads 1263 and 1264. Lead 1264 is connected through contact 6CRA to four parallel conductors 1265–1268. Each of these conductors contains two contacts effective to join the conductors to one of two output lines respectively joined to brush 1270 of the speed clutch transmission and brush 1271 of the speed clutch transmission.

More particularly, leads 1265–1268 are respectively connected to brush 1270 through contacts 1SD, 3SD, 4SD and 7SD. The same leads are connected to brush 1271 through contacts 2SD, 5SD, 6SD and 8SD. Another brush 1272 of the speed clutch transmission is connected to line 1264 through normally closed contact 6CRC and to line 1263 through normally open contact 6CRD. Lines 1263 and 1264 are interconnected through series connected contacts 6CRB and 5CRB and switch 8MS.

Brushes 1273–1278 of the feed clutch transmission unit are energized from output leads 1280 and 1281 of rectifiers 1229 and 1230 respectively. More particularly, lead 1280 is connected through normally closed contact 7CRA to parallel leads 1282–1285 which respectively contain contacts 2FB, 4FB, 6FC and 8FC. These leads are joined through a common lead 1286 to brush 1273. Lead 1280 is also connected to parallel leads 1287–1290 respectively containing contacts 1FC, 2FC, 5FC and 6FB. Leads 1287–1290 are connected through lead 1292 to brush 1274. Line 1280 is joined in a similar manner to parallel leads 1293–1296. These leads are connected to brush 1275 through contacts 5FD, 6FD, 7FB and 8FB.

Line 1281 from rectifier 1230 is connected through normally closed contact 7CRB to a series of parallel leads 1297–1300. These leads which respectively contain contacts 1FB, 3FB, 5FB and 7FC, are connected to brush 1276. Brush 1277 is connected to line 1281 through lead 1301 and parallel leads 1302–1305 which respectively contain contacts 3FC, 4FC, 7FD and 8FD.

In a similar way, brush 1278 is connected through lead 1306 and parallel leads 1307–1310 respectively containing contacts 1FD, 2FD, 3FD, and 4FD to power lead 1281. It is to be understood that this speed and feed network functions to actuate the clutches of the spindle speed clutch transmission and spindle feed clutch transmission in such a way that when the relays shown in the following table are energized, the corresponding feeds and speeds are obtained:

*Spindle Speed*

| Relay: | Speed in r.p.m. |
|---|---|
| 1S | 30 or 60 |
| 2S | 45 or 90 |
| 3S | 120 or 240 |
| 4S | 150 or 295 |
| 5S | 180 or 360 |
| 6S | 225 or 460 |
| 7S | 600 or 1200 |
| 8S | 900 or 1800 |

*Spindle Speed*

| Relay: | Feed rate |
|---|---|
| 1F | .0005 |
| 2F | .0008 |
| 3F | .0012 |
| 4F | .0019 |
| 5F | .0028 |
| 6F | .0040 |
| 7F | .0070 |
| 8F | .0100 |

It will readily be appreciated by those skilled in the art that the spindle drive comprises additional components for effecting rapid traverse and limiting spindle traverse. These elements are shown in FIGURE 41. Since they are conventional and constitute no part of the present invention, they will be described only briefly.

As shown in FIGURE 41, a line 1312 is connected between power lines 1088 and 1084. This line contains a contact of "up" push button 6PB and "down" push button 7PB together with normally closed lock-out contact 10MRA of relay 10MR, relay coil 10MF and normally closed contacts 1313 and 1314. Two leads 1315 and 1316 are connected in parallel with lead 1312. Lead 1315 also contains contacts of "up" push button 6PB and "down" push button 7PB together with normally closed lock-out contact 10MFA and relay coil 10MR. Lead 1316 contains other contacts of push buttons 6PB and 7PB and a relay coil 7CR.

A lead 1317 is connected across power line 1103 and 1084, lead 1317 contains a contact of spindle "stop" push button 8PB and spindle "start" push button 9PB. This line also includes an upper safety switch 12MS, a lower safety switch 13MS, and a depth stop switch 14MS. Lead 1317 is also connected to relay coil 8CR, the other terminal of which is joined to conductor 1318. Conductor 1318 in turn is joined to power line 1084 through normally closed contacts 1313 and 1314.

A lead 1319 is connected in parallel with lead 1317 and contains contacts 8CRE and 10MRB, 10MFB and relay coil 6TR. Relay contact 8CRE is shunted by contact 7CRC. Finally, a lead 1320 is interconnected between the power lines 1088 and 1084. This lead contains indicator safety switches 15MS and 16MS, contact 1321 of a phase reversal relay and relay coil MD.

DESCRIPTION OF OPERATION

It is believed that it will assist in a fuller understanding of the present numerical control system to consider the manner in which the jig borer herein disclosed is programmed for specific operation. By way of example, consider operation number four or the workpiece shown in FIGURE 28. As was previously indicated, this operation is a counter boring or other finishing operation upon hole number 274.

In setting up the jig borer for automatic operation, the first step is to prepare a punched tape in which the instructions for each operation are serially placed. This is generally done by a methods man who takes a blue print of the piece to be machined and determines two arbitrary angulated axes by means of which any location on the workpiece can be described by denoting its coordinate distances from the two axes. Thus, in the workpiece shown in FIGURE 28, one axis is the left hand edge of the workpiece, while the second axis is the top piece of the workpiece.

After selecting the axes all distance measurements are reduced to coordinate distances representing the table position and saddle position. The methods man also selects the order in which the operations are performed and the correct speed and feed for each operation. Having determined this information, the coded data is punched on a punched tape as shown in FIGURE 29. This may be done by means of any suitable device, such as a Flexowriter Model FTC8.

It will be recalled that each set of instructions for performing a particular operation comprise a group of function indicators, each function indicator being followed by the numerical bits associated with the function. Thus, to carry out operation number four, the tape is punched with the letter "A" (indicating that the next numbers are operation numbers). This letter is followed by the operation number 004. Next appears a table position operation indicator "B" followed by the six digits of the table position 087414. The next indicator that is placed on the tape is the saddle indicator C which is followed by the six digits corresponding to the saddle position; i.e., 030000. Next there is placed on the tape the speed and feed indicator code "D" followed by the speed and feed code number 595. A comma is then placed on the tape following the "5" to indicate that a tool change must be made, and finally, an "H" is punched indicating that all the instructions for the operation have been recorded.

It is to be understood that the data does not have to be placed upon the tape in this order and the table information could precede the operation number or could be preceded by the saddle information or speed and feed code as desired. Also, if no change is to be made in a particular machine function; e.g., speed and feed, the data for that operation may be omitted entirely. Once the tape has been prepared, it can be stored until required at which time the tape is threaded through reader 264.

With the controls set for tape operation assume that the reader senses a tape food code "EL." This code is a hole in the eighth channel of the tape.

The pin in engagement with the "EL" hole will close contact RCEL. This contact will energize relays 109CR–1 and 109CR–2 (FIGURE 33). When relay coil 109CR–1 is energized, its contacts 109CR–1B close energizing the tape reader's half revolution clutch 278 causing the reader pins to be pulled from engagement with the tape. When the pins are retracted from the tape, cam actuated contact 285 is closed; this contact in turn energizes relay coil 112CR through contacts 109CR–2A.

When relay 112CR closes its normally closed contact 112CRB opens deenergizing relays 109CR–1 and 109CR–2. The 109CR–2A contacts are thus opened and in turn deenergize relay 112CR. With relays 109CR–1 and 112CR deenergized, the normally closed contacts 109CR–1A and 112CRA of these relays complete a circuit to the tape reader's half revolution clutch 278 (FIGURE 32).

This clutch when energized, causes the tape to be moved to the next position and raises, or advances, the pins into engagement with the tape. At this time the reader senses the next code.

Figure 34:
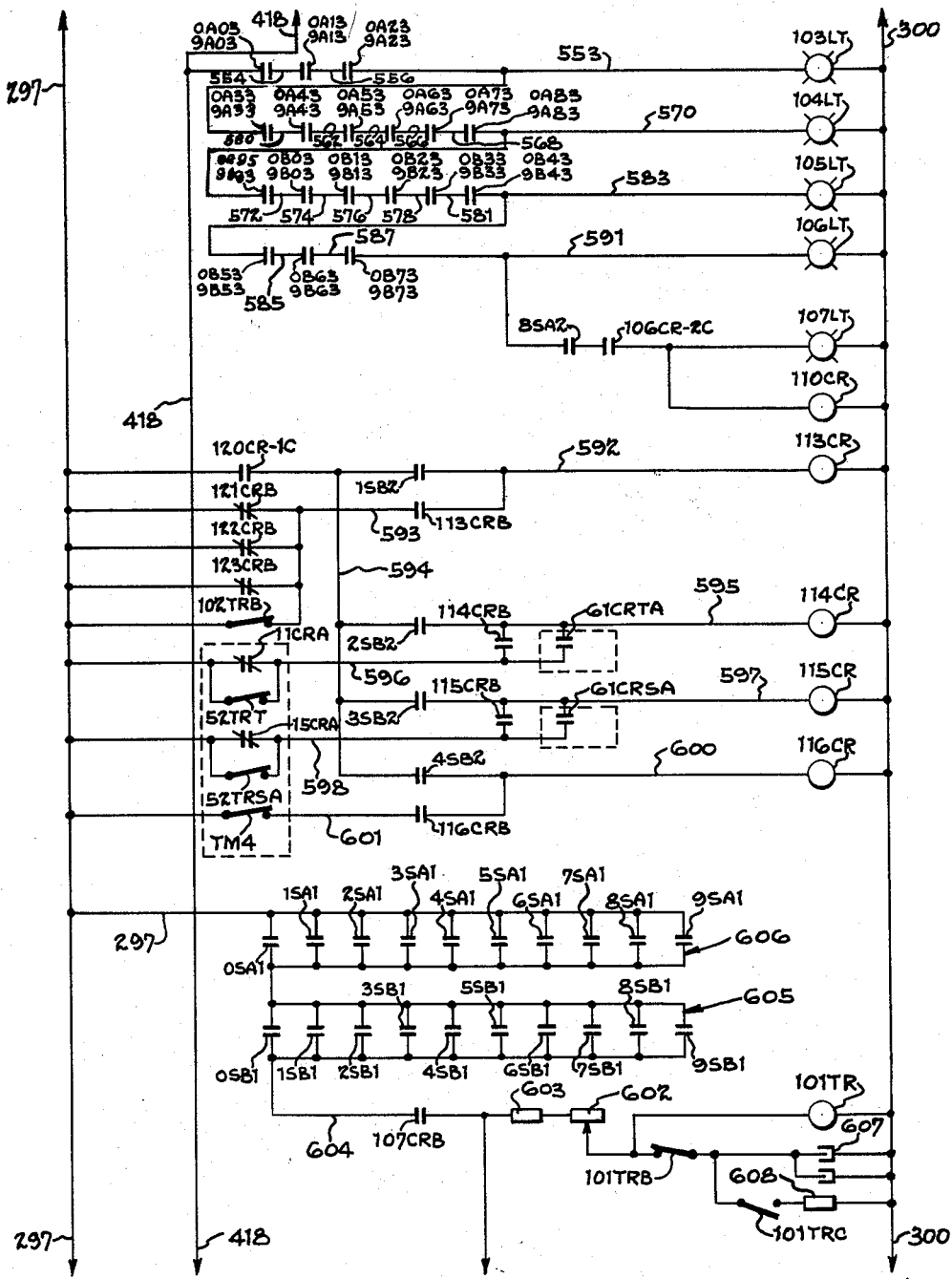

The first code usually read when setting up an operation and filling the memory storage unit is an "A" code consisting of holes punched in the tape in channels X, O, and 1. When an "A" code is sensed in the reader, the zero contact RCO energizes relay 105CR (FIGURE 33). The "X" contact in the reader RCX closes and energizes relays 106CR-1 and 106CR-2. The "1" contact RC1C is effective to cause the select magnets 1SA and 1SB of the cross bar switches 326 and 327 to be energized (FIGURE 32). Assuming that the tape reader has read the tape properly, there are an odd number of holes sensed so that the relays in parity check circuit 287 will cause relay 107CR (FIGURE 33) to be energized. Since select magnets 1SA and 1SB are closed, their respective off-normal contacts 1SA1 and 1SB1 are closed. These contacts in conjunction with contact 107CRB complete a circuit to time delay relay 101TR (FIGURE 34).

After a brief time delay, the contacts of this relay operate; contact 101TRD closes and in conjunction with contacts 106CR-2B and normally closed contact 104CR-2B, energizes relays 120CR-1 and 120CR-2 (FIGURE 35). These relays are energized whenever a letter "A" through "G" is read by the reader.

A second contact 101TRA closes and is effective to complete circuit through contact 120CR-1A and off-normal contact 1SA2 to contact 475 of level 2 of stepping switch relay 101SR (FIGURE 33). If the wiper 473 on level 2 of this stepping switch is not in registry with this contact point, stepping switch relay 101SR will operate self-interrupted through its own spring interrupter contacts 101SRA. This will cause the stepping switch to step around until wiper 473 arrives at 475 at which time relay 111CR will be energized. When this relay is energized, normally closed contacts 111CRA will open stopping the self-interrupted operation of stepping switch relay 101SR.

Previously, when cross bar select magnet 1S became energized, its normally closed contact 1SB opened. Subsequently, when relay 120CR-1 became energized, its normally closed contact 120CR-1D opened deenergizing hold magnets 0HA-2HA of cross bar switch 326 (FIGURE 35). This operation thus removed all of the information previously stored in vertical contact units 353-355 of cross bar switch 326 (FIGURE 34). It will be recalled that these three vertical contact units stored the three digit operation number. Thus, the cross bar switch is conditioned to receive the next operation number.

When the cross bar hold magnets 0HA-2HA became deenergized, their normally closed off-normal contacts 0HA1, 1HA1, and 2HA1 closed. These contacts are effective to complete a circuit to relay 108CR causing it to become energized and held in through its hold in contact 108CRC (FIGURE 33). Relay 108CR has a contact 108CRB in series with half revolution clutch 278 of the reader. When this clutch is energized, the reader pins are withdrawn from the tape at which time switch 415 is again closed. Stepping relay 101SR (FIGURE 33) becomes energized through contact 108CRE. When this stepping switch relay is energized, its normally closed contact 101SRB opens the hold circuit to 108CR deenergizing the relay. This in turn causes relay contact 108CRE to open, deenergizing stepping switch relay 101SR.

Upon deenergization of stepping switch relay 101SR, the wipers on all levels of this stepping switch advance one position. At the same time, normally closed contact 108CRA and contact 101SRA of the stepping switch close causing the tape reader one half revolution clutch 278 to advance to the next position and raise the pins into engagement with the tape. At this point, the next code is read. This code is the first digit of the operation number and can be any digit, 0–9. In the particular operation being described, the digit is a zero.

When a "zero" is read reader contact RCO closes, energizing select magnets 0SA and 0SB of cross bar switches 326 and 327 (FIGURE 32). The off-normal contacts 0SA1 and 0SB1 associated with these select magnets close and in conjunction with the parity check relay contact 107CRB again energize the delay relay 101TR (FIGURE 34). After a brief time delay, the contacts of relay 101TR operate so that contact 101TRD completes a circuit through normally closed contact 106CR-2A, wiper 494 and contact 497 to hold magnet 0HA. This magnet is held in through its own hold contact 0HA3. When the "zero" hold magnet 0HA closes, it closes and locks closed the top horizontal contact set in the vertical contact unit 353. These contacts are contacts 0A01-0A03 (FIGURE 44).

After a brief time delay, contact 101TRA of timer relay 101TR also closes and is effective to complete a circuit through off-normal contact 0HA2 and contact 427, level 1 of the stepping switch to energize relay 108CR again (FIGURE 33). When this relay coil is energized, it is held in through its own hold-in contact 108CRC. At the same time, contact 108CRB energizes half revolution clutch 278 causing the tape reader to withdraw the pins from the tape and close switch 415. The contact of relay 108CR in series with the stepping switch; i.e., contacts 108CRE, also closes, energizing the stepping switch magnet 101SR again. This magnet's interrupter springs will operate to open contact 101SRB deenergizing relay 108CR which in turn deenergizes the stepping switch 101SR.

The stepping switch 101SR then makes another step to the third position or point in engagement with contact 428. At this time, normally closed contacts 108CRA of relay 108CR and 101SRA energize the clutch coil 278. This operates the half revolution clutch moving the tape and advancing the pins to reading position at which time another code will be read.

Upon the sensing of the next code, a sequence of operations occurs as described above to energize the zero select magnet 0SA and hold magnet 1HA of cross bar switch 326 to store the second digit of the operation number in contacts 0A1A-0A13 of vertical contact unit 354 (FIGURE 44). In a similar manner, the third digit or "four" of the operation number is stored by the energization of select magnet 4SA and hold magnet 2HA closing contacts 4A21-4A23. This completes the storage of the operation number in the cross bar switch. During the storage of this number, contacts 0A03, 0A13, and 4A23 became closed completing a circuit to "operation indicator" lamp 103LT. This lamp provides a visual indication to the operator that the operation number has been read and stored.

When hold magnet 2HA becomes energized, the stepping switch will move to its fifth position (in registry with contact 429) in the manner explained above (FIGURE 33). At this time, the reader will read a "B" indicator code indicating that the digits following correspond to the six digits of table position (087414 in the example given). These six digits are stored in vertical contact units 356-361. More specifically, when the reader reads the first zero, the stepping switch is in its fifth position and when the zero select magnet 0SA and hold magnet 3HA are closed, the zero is stored in contacts 0A31-0A33 (FIGURE 44). The next digit stored is an eight which is stored in vertical contact unit 357 upon the closure of select magnet 8SA and hold magnet 4HA closing cross bar contacts 8A41-8A43. The seven is stored in vertical contact unit 358 by the energization of select magnet 7SA and hold magnet 5HA, closing contacts 7A51-7A53.

In a similar manner, the final three digits 414 are stored in vertical contact units 359-361. When the final four has been stored, the six digit table position number is stored in the cross bar switch. At that time, at least one of the contacts associated with the hold magnet of each of the vertical contact units 356–361 is closed. These contacts thus complete a circuit to the "table" light 104LT. Again, when this lamp is energized, it provides a visual indication to the operator that the table information has been read and stored.

In normal operation, when the tape is advanced in the reader, the reader will read and a "C" indicator signal indicating that the following numerical information pertains to saddle position. When a "C" is read, hold magnet 9HA of relay 326 and hold magnets 0HB–4HB of relay 327 are deenergized. When the next code is read, a zero in the example given, zero select magnet 0SA is energized in conjunction with hold magnet 9HA so that the first digit of saddle information is stored in vertical contact unit 362 in contacts 0A91–0A93 (FIGURE 44). The second digit "three" is stored in vertical contact unit 396 of cross bar switch 327 in contacts 3B01–3B03 by the closure of select magnet 3SB and hold magnet 0HB (FIGURE 45).

The final four zeros of the saddle position are stored in vertical contact units 397–400 by the successive closures of the zero select magnet 0SB with hold magnets 1HB–4HB. When the six digits of saddle information have been read and stored, a circuit is completed through the closed contacts of vertical contact units 362 and 396–400 to "saddle" lamp 106LT.

The next code read is the speed and feed indicator code "D." When this code is read, hold magnets 5HB–7HB are deenergized. When the next code or first digit of the speed and feed code is read, the stepping switch advances and when the five select magnet 5SB is energized, hold magnet 5HB is energized. The first digit of the speed and feed code is thus stored in contacts 5B51–5B53 (FIGURE 45). The second digit of the speed and feed code is a nine. This is stored by the closure of select magnet 9SB and hold magnet 6HB storing the digit nine in contacts 9B61–9B63 of vertical contact unit 402. The last digit of the speed and feed code is a five. This digit is stored in vertical contact unit 403 by the closure of select magnet 5SB and hold magnet 7HB. When the speed and feed code is read and stored, at least one set of horizontal contacts in vertical contact units 401–403 are closed completing a circuit to "speed and feed" code light 106LT.

In the specific operation being described, the next signal is a comma or "tool change" code. The tool change code comprises holes punched 1, 2, 8, and O (the O having no significance in the present circuit). When the reader senses a hole in channel 1, reader contact RC1D energizes relay 101CR (FIGURE 32). In a similar manner, relay contact RC2D energizes relay 102CR; and relay contact RC8B energizes relays 104CR–1 and 104CR–2. These relays have series connected contacts 101CRE, 102CRE, and 104CRE in circuit with tool change indicator light 102LT. This light signals to the operator that a change in tools is required. Since the operation number is visually displayed as described above, the operator can readily determine what tool is required. In order to affect completion of the reading, the operator must press the tool change position button 101PB. When he pushes this button, relays 109CR1 and 109CR2 are energized. These relays are effective to energize the half revolution clutch 278 of the tape reader to advance the tape as explained above.

The last signal read on the tape is an "H" code or "reading complete" code. This code consists of a hole punched in channel 8, a hole punched in channel O, and a hole punched in channel "X." When the reader senses an 8 code, reader contact RC8A will energize select magnets 8SA and 8SB. In a similar manner, reader contact RCO will energize relay 105CR; and reader contact RCX will energize relays 106CR–1 and 106CR–2. When relay coil 106CR–1 is energized (FIGURE 32), it opens its normally closed contact 106CR–A to prevent energization of select magnets 0SA and 0SB. At the same time, off-normal contact 8SA2 and contact 106CR–2C close to complete a circuit to "reading complete" light 107LT. These same contacts also complete a circuit to relay 110CR (FIGURE 34), the reading complete relay.

It may be noted at this time that when a code "A" was read, relay contact 120CR–1C and off-normal contact 1SB2 of select magnet 1SB were closed, energizing relay 113CR (FIGURE 34) which functions as an operation indicator lock-out relay (FIGURE 34). Relay 113CR holds in through its own hold-in contact 113CRB. In a similar manner, when a "B" was read, relay contact 120CR–1C and off-normal contact 2SB2 of select magnet 2SB were closed and energized relay 114CR. This relay, too, is held in by its own hold-in contact 114CRB. Relay 114CR is a table position change lock-out relay. In a similar manner, when a "C" code is read, relay contact 120CR–1C and off-normal contact 3SB2 close to energize relay 115CR, the saddle position change lock-out relay. This relay is held in through its own hold-in contact 115CRB. When a "D" is read, relay contact 120CR–1C and off-normal contact 4SB2 close to energize relay 116CR. This relay is a speed and feed change lock-out relay and is held in through its own hold-in contact 116CRB.

Figure 37:
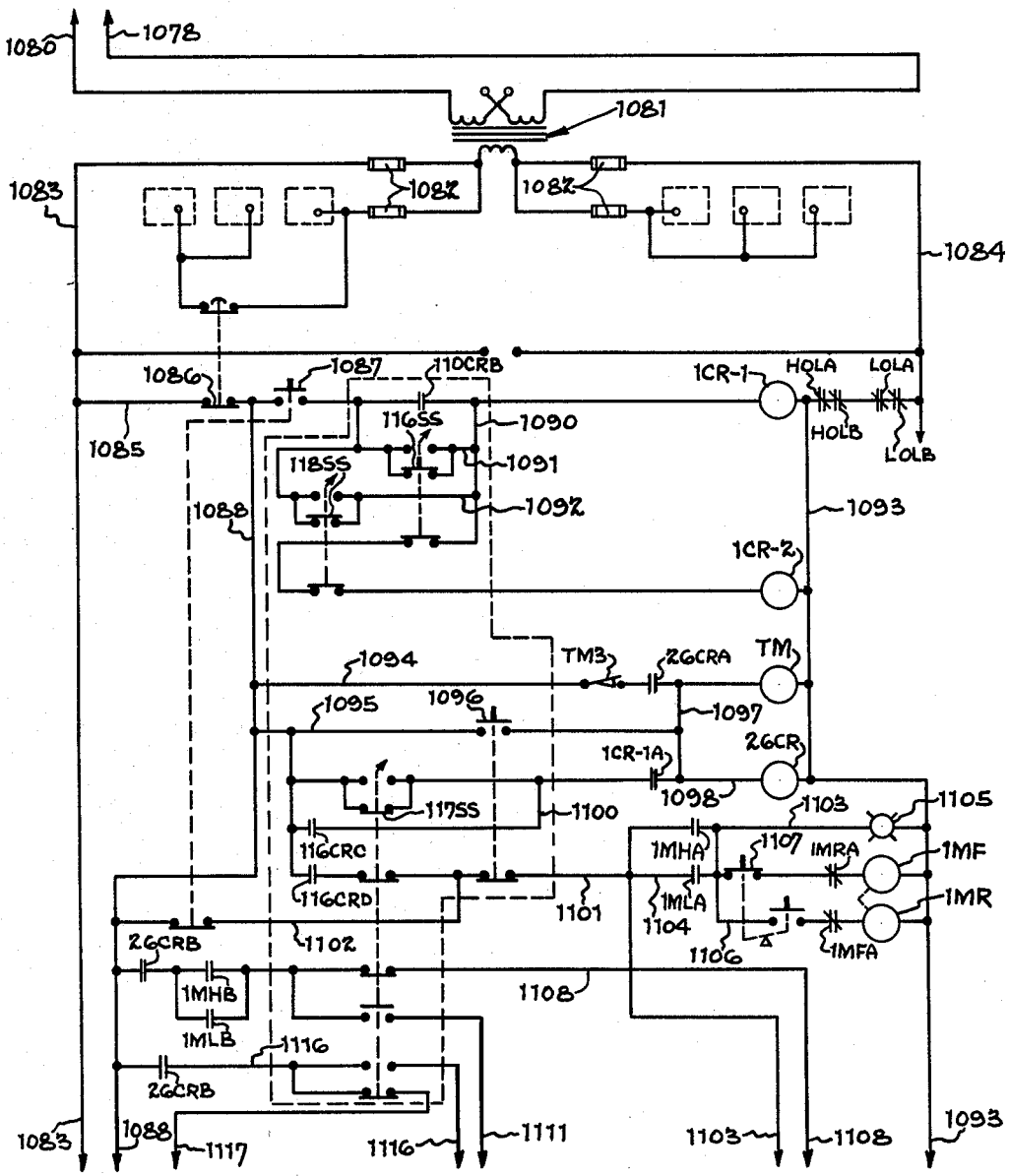

The cross bar switch has now completed storing of information for the next operation of the jig borer. When the jig borer has completed its previous operation, and is ready to receive a new set of instructions, the operator presses the start shift button 1087 (FIGURE 37).

When this button is pushed, relays 1CR–1 and 1CR–2 are energized, closing contact 1CR–2A and energizing relay 102TR (FIGURE 36). When relay 102TR is energized, its time contact 102TRA is closed, energizing stepping switch relays 102SR, 103SR, and 104SR, of the operation number indicator. These stepping relays operate self-interrupted causing them to step around one position at a time until their wipers on level 1 engage the respective switch contacts energized through the closed contacts of the cross bar switch.

For the present operation number 004, stepping switch 102SR will operate until wiper 646 engages contact 624 which is energized through cross bar contact 0A01. When the wiper engages this contact, relay 121CR is energized and its normally closed contact 121CRA is opened to deenergize stepping switch relay 102SR. In a similar manner, when wiper 649 of the stepping switch 103SR engages contact 651 which is energized through cross bar contact 0A11, stop relay 122CR is energized and its normally closed contact 122CRA is opened. This de-energizes stepping relay 103SR. In the same way, when wiper 674 of stepping switch 104SR engages contact 681 which is energized through cross bar contact 4A21, stop relay 12CR is energized opening relay contact 123CRA, deenergizing stepping relay 104SR.

When relays 121CR, 122CR, and 123CR become energized together with time delay relay 102CR, relay 113CR is deenergized and its contact 113CRC opens and deenergizes relay 102TR. It will be noted that the second levels of stepping switches 102SR–104SR are positioned in accordance with the position of level 1 of the switches and thus energize operation indicator lights as determined by their respective positions.

If, for some reason, relays 121CR–123CR are not effective to stop stepping switches 102SR, 103SR, and 104SR respectively, the time on 102TR will run out, opening contact 102TRA and deenergizing the three stepping switches to prevent their repeated recycling.

When the start shift button is pushed, suitable relays (not shown) are energized to complete circuits to lines 927 and 782 of the table dial drive circuit (FIGURES 42 and 31). In the specific example given, the zero "tens" digit signal is transmitted through closed contact 0A32 and lead 790 to the zero contact of dial commutator 1TDS. This commutator rotates to zero position and positions no ten inch measuring rods.

The "units inch" signal is conducted through closed contact 8A41 to lead 810 joined to the 8 contact of the one inch measuring dial commutator switch 2TDS. This switch positions the 8 inch measuring rod. The "tenths inch" signal is conducted through contact 7A51 to lead 833 joined to the 7 contact of tenths inch dial positioning unit 3TDS. Thus, seven tenths inch measuring rod is positioned.

In a similar manner, the hundredths, thousandths, and ten thousandths information signals are conducted through contacts 4A61, 1A71, and 4A81, and leads 854, 875, and 902 to the 4, 1, and 4 contacts of dial drive commutator switches 4TDS-6TDS respectively. When each of these dials have been set to their proper position, the table will start to position and a relay 11CR (not shown) will be energized, opening its normally closed contact 11CRA deenergizing the table position change lock-out relay 115CR.

The saddle dial drive unit functions in exactly the same manner. More particularly, when the start shift push button is actuated, potentials are applied to power lines 934 and 1069 (FIGURE 43). As explained previously, in the present example the saddle information is stored in closed cross bar contacts 0A91, 3B01, 0B11, 0B21, 0B31, and 0B41 (FIGURE 45). Thus, circuits are completed through these contacts and leads 936, 947, 970, 994, 1018, and 1042 to the appropriate contacts of the saddle dial drive units. These dial drive units function in the same way as the table dial drive units to position no ten inch rods and the three inch rod for controlling saddle movement. When the saddle dial drive units are properly positioned, the saddle starts to position and the circuit is broken to saddle lock-out relay 115CR (FIGURE 34).

When the start shift button 1087 (FIGURE 37) is pushed, relay 26CR is energized. Contact 26CRB of this relay closes and energizes lead 1117. In the specific example given, this lead completes a circuit through closed cross bar contact 9B61 to lead 1180 energizing high speed relay 1MH (FIGURE 39). This relay is held in through its hold in contact 1MHF and also closes the high speed contacts 1MHC, 1MHD, and 1MHE in the spindle motor drive (FIGURE 50).

When contact 1MHB (FIGURE 37) of relay 1MH is closed, it completes a circuit to line 1108. A circuit is in turn completed through this line and closed cross bar contact 5B51 to lead 1176 and speed selector relay coil 5S (FIGURES 45, 49 and 38). As explained previously, relay 5S has a hold-in contact 5SA and contacts 5SB and 5SD. These contacts, when closed, complete circuits to appropriate brushes in the spindle speed clutch transmission 261 so that the spindle is driven at 360 r.p.m. (FIGURE 40).

Another contact of relay 26CR, contact 26CRC completes a circuit to lead 1182. This lead is in turn connected through closed contact 5B71 and lead 1201 to feed control relay 5F (FIGURE 39). This relay is held in through its hold-in contact 5FA and closes relay contacts 5FB, 5FC, and 5FD to energize suitable brushes in the spindle feed clutch transmission 262 so that the spindle is fed at .0028 inch per spindle revolution (FIGURE 40).

When the spindle speed and feed clutches are shifted, a contact TM4 opens and deenergizes speed and feed lock-out relay 116CR (FIGURE 34). With relay 110CR being energized, as explained previously, and lock-out relays 113CR-116CR becoming deenergized, their contacts 110CRA, 113CRA, 114CRA, 115CRA, and 116CRA energize relays 109CR1 and 109CR2. When these relays are energized, their contacts energize the tape reader half revolution clutch causing the tape reader to withdraw its pins and advance the tape to read another code. During the period that the jig borer is performing the previous operation, the tape reader proceeds to read a new set of instructions for the machine and causes the information to be stored in the cross bar switches in the manner previously explained.

APPENDIX "A"

*Table of Principal Relays and Contacts*

| Relay | 101CR | 102CR | 103CR |
|---|---|---|---|
| Contacts | 101CRA<br>101CRB<br>101CRC<br>101CRD<br>101CRE | 102CRA<br>102CRB<br>102CRC<br>102CRD<br>102CRE | 103CRA<br>103CRB<br>103CRC<br>103CRD<br>103CRE<br>103CRF |
| Relay | 104CR-1 | 104CR-2 | 105CR |
| Contacts | 104CR-1A<br>104CR-1B<br>104CR-1C<br>104CR-1D | 104CR-2A<br>104CR-2B | 105CRA<br>105CRB<br>105CRC<br>105CRD<br>105CRE |
| Relay | 106CR-1 | 106CR-2 | 107CR |
| Contacts | 106CR-1A<br>106CR-1B<br>106CR-1C<br>106CR-1D | 106CR-2A<br>106CR-2B<br>106CR-2C | 107CRA<br>107CRB |
| Relay | 108CR | 109CR-1 | 109CR-2 |
| Contacts | 108CRA<br>108CRB<br>108CRC<br>108CRD<br>108CRE | 109CR-1A<br>109CR-1B | 109CR-2A<br>109CR-2B |
| Relay | 110CR | 111CR | 112CR |
| Contacts | 110CRA<br>110CRB | 111CRA | 112CRA<br>112CRB |
| Relay | 113CR | 114CR | 115CR |
| Contacts | 113CRA<br>113CRB<br>113CRC | 114CRA<br>114CRB | 115CRA<br>115CRB |
| Relay | 116CR | 120CR-1 | 120CR-2 |
| Contacts | 116CRA<br>116CRB<br>116CRC<br>116CRD | 120CR-1A<br>120CR-1B<br>120CR-1C<br>120CR-1D | 120CR-2A<br>120CR-2B<br>120CR-2C |
| Relay | 121CR | 122CR | 123CR |
| Contacts | 121CRA<br>121CRB | 122CRA<br>122CRB | 123CRA<br>123CRB |

APPENDIX "B"

*List of Off-Normal Contacts*

| Magnet | 0SA | 1SA | 2SA | 3SA | 4SA |
|---|---|---|---|---|---|
| Off-Normal Contacts | 0SA1 | 1SA1<br>1SA2<br>1SA3 | 2SA1<br>2SA2<br>2SA3 | 3SA1<br>3SA2<br>3SA3 | 4SA1<br>4SA2<br>4SA3 |
| Magnet | 5SA | 6SA | 7SA | 8SA | 9SA |
| Off-Normal Contacts | 5SA1 | 6SA1 | 7SA1 | 8SA1 | 9SA1 |
| Magnet | 0HA | 1HA | 2HA | 3HA | 4HA |
| Off-Normal Contacts | 0HA1<br>0HA2<br>0HA3 | 1HA1<br>1HA2<br>1HA3 | 2HA1<br>2HA2<br>2HA3 | 3HA1<br>3HA2<br>3HA3 | 4HA1<br>4HA2<br>4HA3 |
| Magnet | 5HA | 6HA | 7HA | 8HA | 9HA |
| Off-Normal Contacts | 5HA1<br>5HA2<br>5HA3 | 6HA1<br>6HA2<br>6HA3 | 7HA1<br>7HA2<br>7HA3 | 8HA1<br>8HA2<br>8HA3 | 9HA1<br>9HA2<br>9HA3 |
| Magnet | 0SB | 1SB | 2SB | 3SB | 4SB |
| Off-Normal Contacts | 0SB1 | 1SB1<br>1SB2 | 2SB1<br>2SB2 | 3SB1<br>3SB2 | 4SB1<br>4SB2 |
| Magnet | 5SB | 6SB | 7SB | 8SB | 9SB |
| Off-Normal Contacts | 5SB1 | 6SB1 | 7SB1 | 8SB1 | 9SB1 |
| Magnet | 0HB | 1HB | 2HB | 3HB | 4HB |
| Off-Normal Contacts | 0HB1<br>0HB2<br>0HB3 | 1HB1<br>1HB2<br>1HB3 | 2HB1<br>2HB2<br>2HB3 | 3HB1<br>3HB2<br>3HB3 | 4HB1<br>4HB2<br>4HB3 |
| Magnet | 5HB | 6HB | 7HB | | |
| Off-Normal Contacts | 5HB1<br>5HB2<br>5HB3 | 6HB1<br>6HB2<br>6HB3 | 7HB1<br>7HB2<br>7HB3 | | |

Having described our invention, we claim:

1. In a numerically controlled machine tool system, the combination of a machine tool having a plurality of components adapted for automatic operation in response to predetermined electrical input signals carrying digital information and a cross bar switch having a plurality of vertical contact units, each of said components having a plurality of input leads, each of said vertical contact units comprising a plurality of horizontal contact sets, each of the horizontal contact sets of a vertical contact unit comprising spring urged electrical contacts corresponding to one digit and being connected to a different input lead of one of said machine tool components, a plurality of intersecting hold bars and select bars associated with said horizontal contact sets, said cross bar switch further comprising a plurality of select magnets for actuating said select bars to condition horizontal contact sets for actuation, a hold magnet associated with each hold bar for actuating said hold bars to close the contacts of said set conditioned for closure by said select magnets, means for energizing said hold magnets and said select magnets in accordance with coded data, means for applying a potential to one contact of each of said horizontal contact sets, whereby the energized hold magnet and select magnet determine the component and the input lead of said component which is energized by said potential.

2. Means for programming a machine tool having a movable member and electrically responsive components each having a plurality of input leads for positioning said movable member to inches and decimal fractions thereof, said means comprising a reader for scanning a coded record and producing electrical signals corresponding to the coded signals thereon, a cross bar switch connected to receive signals from said reader, said cross bar switch having a plurality of vertical contact units, a like plurality of hold magnets and ten select magnets, a plurality of select bars and hold bars disposed along mutually perpendicular axes, each of said hold bars being actuated by one of said hold magnets and each of said select bars being actuated by one of said select magnets, each of said vertical contact units having a plurality of contact pairs adapted to be closed by the actuation of one of said select bars and the hold bar associated with said vertical contact unit, one of the contacts of each contact pair being connected to a different input lead of one of said electrically responsive components of said machine tool, means for applying a potential to one contact of each contact pair, whereby a potential is applied through the closed contacts of said cross bar switch to the positioning components of said machine tool, and whereby the hold magnet associated with the closed contact determines the decimal value of the dimension controlled by the signal from that contact and the select magnet determines the digital value of the decimal controlled by said signal.

3. In a numerically controlled machine tool system, the combination of a machine tool having a movable member, a plurality of components for automatically positioning said member to decimal fractions of an inch in response to corresponding electrical input signals representing the inch digit and decimal fraction digits, each of said components having a plurality of input leads each corresponding to a different digit, means for producing digital electrical signals corresponding to the desired position of said movable member, and a cross bar switch having hold magnets and select magnets, a plurality of hold bars and select bars respectively actuated by said hold magnets and select magnets, and a plurality of contact pairs actuated by the concurrent actuation of one of said hold bars and one of said select bars, a cross bar loading circuit for applying said electrical signals to said select magnets whereby one of said select magnets is energized and one of said select bars is actuated in accordance with the digit value of said signal, and means for sequentially energizing said hold magnets and thereby actuating said hold bars, and electrical circuit means interconnecting one contact of each contact pair of said cross bar switch with a different input lead of one of said components for positioning the movable member for said machine tool, and means for applying a potential to the other contact of each of said contact pairs.

4. In an automatic control system for controlling a machine tool adapted for automatic operation in response to predetermined electrical input signals, said machine tool having a plurality of components for controlling a machine function, each of said components having a plurality of input leads corresponding to digits, a reader for scanning a record and sensing coded data indicating the digit input for said control function, said reader producing electrical signals corresponding to said coded data, a cross bar switch, loading circuit means interconnecting said cross bar switch and said reader, said cross bar switch having a plurality of vertical contact units each containing a plurality of movable contacts adapted for engagement with a stationary contact strip, a plurality of intersecting hold bars and select bars associated with said contacts, select magnets adapted to respectively actuate said select bars to condition said contacts for engagement with said stationary contact strip, a plurality of hold magnets effective to actuate said hold bars for urging said contacts against said contact strip, each of said movable contacts being respectively connected to a different one of the input leads of one of said machine tool components, and means for applying a potential to said contact strip and through the closed contact to said machine tool component.

5. In an automatic control system for controlling a machine tool adapted for automatic operation in response to predetermined electrical input signals, said machine tool having a plurality of components for controlling a machine function, each of said components having ten input leads corresponding to digits 0–9, a reader for scanning a record and sensing coded data indicating the digit input for said control function, said reader producing electrical signals corresponding to said coded data, a cross bar switch, loading circuit means interconnecting said cross bar switch and said reader, said cross bar switch having a plurality of vertical contact units each containing ten movable contacts adapted for engagement with a stationary contact strip, a plurality of intersecting hold bars and select bars associated with said contacts, ten select magnets adapted to respectively actuate said select bars to condition said ten contacts for engagement with said stationary contact strip, a plurality of hold magnets effective to actuate said hold bars for urging said contacts against said contact strip, each of said ten movable contacts being respectively connected to the ten input leads of one of said machine tool components, and means for applying a potential to said contact strip and through the closed contact to said machine tool component.

6. In an automatic control system for controlling a machine tool adapted for automatic operation in response to predetermined electrical input signals, said machine tool having a plurality of components for controlling a machine function, each of said components having ten input leads corresponding to digits, a reader for scanning a record and sensing coded data indicating the digit input to be energized for said control function, said reader producing electrical signals corresponding to said coded data, a cross bar switch, loading circuit means interconnecting said cross bar switch and said reader, said cross bar switch having a plurality of vertical contact units each containing a plurality of contacts, a plurality of intersecting hold bars and select bars associated with said contacts, select magnets adapted to respectively actuate said select bars to condition said contacts for closure, a plurality of hold magnets effective to actuate said hold bars for closing said contacts, each of said contacts being respectively connected to one of the ten input leads of said machine tool components, and means for applying a potential through said closed contacts to said machine tool component.

7. In an automatic control system for controlling a machine tool having a movable element adapted for automatic positioning in response to predetermined electrical input signals, said machine tool having a plurality of components for positioning said movable element, each of said components having a plurality of input leads corresponding to position digits, a reader for scanning a record and sensing coded data indicating the position digit and providing an electrical signal corresponding thereto, a cross bar switch, loading circuit means interconnecting said cross bar switch and said reader, said cross bar switch having a plurality of vertical contact units containing movable contacts adapted for engagement with a stationary contact strip, a plurality of intersecting hold bars and select bars associated with said contacts, select magnets adapted to respectively actuate said select bars to condition said contacts for engagement with said stationary contact strip, a plurality of hold magnets effective to actuate said hold bars for urging said contacts against said contact strip, each of said movable contacts being respectively connected to a different input lead of one component of said movable element positioning means, and means for applying a potential to said contact strip and through the closed contact to one component of said movable element positioning means.

8. In an automatic control system for controlling a machine tool having a movable element adapted for automatic positioning in response to predetermined electrical input signals, said machine tool having a plurality of components for positioning said movable element, each of said components having a plurality of input leads corresponding to position digits, a reader for scanning a record and sensing coded data indicating the position digit and producing an electrical signal corresponding thereto, a cross bar switch, loading circuit means interconnecting said cross bar switch and said reader, said cross bar switch having a plurality of vertical contact units containing a plurality of contacts, a plurality of intersecting hold bars and select bars associated with said contacts, select magnets adapted to respectively actuate said select bars to condition said contacts for closure, a plurality of hold magnets effective to actuate said hold bars for closing said contacts, each of said contacts being respectively connected to a different one of the input leads of one component of said movable element positioning means, and means for applying a potential through the closed contact to one component of said movable element positioning means.

9. An automatic numerically controlled machine tool system comprising a machine tool, said machine tool having a base member, a slide member carried by the base member for lineal motion thereon, said slide member having reversible power means connected therewith for shifting the same in a forward direction, said slide member residing in a retracted back-off position at the start of a cycle of operation, a plurality of shiftable measuring elements providing additive lineal measurements, an electrically operated selector mechanism mechanically connected to said measuring elements for shifting the same to an active measuring position, programming means for generating an electrical measurement signal in accordance with coded dimensional data stored in a record medium, said programming means comprising a reader adapted to scan a coded record and produce electrical signals corresponding to the data stored thereon, and a cross bar switch interconnected to said reader and to said electrically operated selector mechanism, said programming means including means for initiating a measurement selection cycle, said means electrically connected to the selector mechanism and energizing the same to shift the measuring elements to an active measuring position in response to the said electrical measurement signal and providing a lineal measurement corresponding to the said signal, said programming means electrically connected to said power means and energizing the same for shifting the slide member in a forward direction after said measuring elements are shifted to said active position, said measuring elements being effective to stop the slide member at a selected position along the base member upon said forward motion of the slide member.

10. In a numerically controlled machine tool system, the combination of a machine tool having a movable member, a first component for positioning the movable member to units of an inch, a second component for positioning the movable member to tenths of an inch, and a third component for positioning the movable member to one hundredths of an inch, each of said first, second and third components including a plurality of input leads, signal means for producing electrical signals corresponding to the units inches position of the movable member, the tenths inches position of the movable member and the one hundredths inches position of the movable member, a cross bar switch in electrical circuit connection with said signal generating means, said cross bar switch having a first vertical contact unit, a second vertical contact unit, and a third vertical contact unit, each of said vertical contact units comprising spring activated contact pairs, a plurality of intersecting hold bars and select bars associated with said contact units, hold magnets causing movement of each of said hold bars, select magnets for causing movement of each of said select bars, each of said select bars when activated being effective to condition certain of said vertical contact units for closure upon actuation of the associated hold bar, said hold magnet being effective when actuated to close the contacts so conditioned and to hold said contacts closed, means for applying an electrical potential to one contact of each said contact pair, and means interconnecting one contact pair of said first, second and third vertical contact units respectively to a different input lead of said first, second and third components.

11. A numerically controlled machine tool system comprising a machine tool having a plurality of components each including a plurality of input leads, said components being adapted for automatic operation in response to predetermined electrical input signals, a reader for sensing a record medium containing coded control data and producing electrical signals therefrom, a cross bar switch having a plurality of vertical contact units, each of said vertical contact units comprising a plurality of spring urged contact, a plurality of intersecting hold bars and select bars associated with said contact units, a plurality of hold magnets and select magnets for actuating said hold bars and select bars respectively, said select bars when actuated being effective to condition certain of said contacts for closure upon actuation of the associated hold bar, said hold bar being effective when actuated to close the associated contact so conditioned and to hold said contacts closed, a loading circuit interconnecting said hold magnets and said select magnets with said reader, electrical circuit means for interconnecting one contact of each vertical contact unit to a different input lead of one of said machine tool components.

12. A numerically controlled machine tool system comprising a machine tool having a plurality of components each including a plurality of input leads, said components being adapted for automatic operation in response to predetermined electrical input signals, a reader for sensing a record medium containing coded control data and producing electrical signals therefrom, a cross bar switch having a plurality of vertical contact units, each of said vertical contact units comprising a plurality of spring urged contacts, a plurality of intersecting hold bars and select bars associated with said contact units, a plurality of hold magnets and select magnets for actuating said hold bars and select bars respectively, said select bars when actuated being effective to condition certain of said contacts for closure upon actuation of the associated hold bar, said hold bar being effective when actuated to close the associated contact so conditioned and to hold said contacts closed, a loading circuit interconnecting said hold magnets and said select magnets with said reader, electrical circuit means for interconnecting one contact of each vertical contact unit to a different input lead of one of said machine tool components, and means for applying a potential through said contacts to said components.

13. A numerically controlled machine tool system comprising a machine tool having a plurality of components each including a plurality of input leads, said components being adapted for automatic operation in response to predetermined electrical input signals, a reader for sensing a record medium containing coded control data and producing electrical signals therefrom, a cross bar switch having a plurality of vertical contact units, each of said vertical contact units comprising a plurality of spring urged contacts, a plurality of intersecting hold bars and select bars associated with said contact units, a plurality of hold magnets and select magnets for actuating said hold bars and select bars respectively, said select bars when actuated being effective to condition certain of said contacts for closure upon actuation of the associated hold bar, said hold bar being effective when actuated to close the associated contact to condition and to hold said contacts closed, a loading circuit interconnecting said hold magnets and said select magnets with said reader, electrical circuit means for interconecting one contact of each vertical contact set to a different lead of one of said machine tool components, and means for applying a potential through said contacts to said components, said last named means including a circuit completion member adapted for actuation when the machine tool is ready to receive signals from said cross bar switch.

References Cited in the file of this patent

UNITED STATES PATENTS

| | | |
|---|---|---|
| 2,021,329 | Reynolds | Nov. 19, 1935 |
| 2,038,222 | King | Apr. 21, 1936 |
| 2,117,702 | Burwell | May 17, 1938 |
| 2,341,029 | Field | Feb. 8, 1944 |
| 2,377,762 | Daly | June 5, 1945 |
| 2,540,226 | Williams | Feb. 6, 1951 |
| 2,748,665 | Senn | June 5, 1956 |
| 2,775,298 | Rubidge et al. | Dec. 25, 1956 |
| 2,820,187 | Parsons | Jan. 14, 1958 |
| 2,866,176 | Durfee | Dec. 23, 1958 |
| 2,867,790 | Durfee | Jan. 6, 1959 |
| 2,991,460 | Hill | July 4, 1961 |
| 3,000,555 | Innes | Sept. 19, 1961 |
| 3,002,115 | Johnson et al. | Sept. 26, 1961 |

FOREIGN PATENTS

| | | |
|---|---|---|
| 767,539 | Great Britain | Feb. 6, 1957 |

OTHER REFERENCES

"Control Engineering" magazine, January 1958 (page 93 relied on).

"Control Engineering" magazine, February 1958 (pages 115 to 117 relied on).